United States Patent
Miyagawa

(10) Patent No.: US 11,611,857 B2
(45) Date of Patent: Mar. 21, 2023

(54) VEHICLE-MOUNTED TRANSMISSION SYSTEM

(71) Applicant: SUMITOMO ELECTRIC INDUSTRIES, LTD., Osaka (JP)

(72) Inventor: Yuta Miyagawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 355 days.

(21) Appl. No.: 16/757,334

(22) PCT Filed: May 16, 2018

(86) PCT No.: PCT/JP2018/018889
§ 371 (c)(1),
(2) Date: Apr. 17, 2020

(87) PCT Pub. No.: WO2019/087441
PCT Pub. Date: May 9, 2019

(65) Prior Publication Data
US 2021/0195388 A1    Jun. 24, 2021

(30) Foreign Application Priority Data
Nov. 6, 2017 (JP) .............................. JP2017-213988

(51) Int. Cl.
*H04B 1/40* (2015.01)
*H04W 4/40* (2018.01)
*H04W 72/0453* (2023.01)

(52) U.S. Cl.
CPC ............... *H04W 4/40* (2018.02); *H04B 1/40* (2013.01); *H04W 72/0453* (2013.01)

(58) Field of Classification Search
CPC ....... H04W 4/40; H04W 72/0453; H04B 1/40
See application file for complete search history.

(56) References Cited

U.S. PATENT DOCUMENTS

| 5,905,468 A | 5/1999 | Ikawa et al. |
| 6,229,992 B1 * | 5/2001 | McGeehan ............ H04B 1/408 |
| | | 455/24 |
| 2003/0214447 A1 * | 11/2003 | Sasagawa .............. H01Q 25/00 |
| | | 342/52 |
| 2010/0246694 A1 | 9/2010 | Tsutsui et al. |

(Continued)

FOREIGN PATENT DOCUMENTS

| JP | H10-079615 A | 3/1998 |
| JP | 2003-025927 A | 1/2003 |

(Continued)

*Primary Examiner* — Brian P Cox
(74) *Attorney, Agent, or Firm* — Oliff PLC

(57) ABSTRACT

An on-vehicle transmission system includes: an antenna-side circuit unit including a plurality of wireless circuits connected in series and configured to receive radio signals in frequency bands different from each other, the antenna-side circuit unit configured to combine the radio signals received by the respective wireless circuits and output a resultant radio signal; and a path part configured to transmit the radio signal resulting from the combination and received from the antenna-side circuit unit, to an on-vehicle device side mounted on the vehicle, wherein, in the antenna-side circuit unit, each wireless circuit is connected according to an order determined for each wireless circuit.

22 Claims, 36 Drawing Sheets

(56) References Cited

U.S. PATENT DOCUMENTS

| | | | | |
|---|---|---|---|---|
| 2016/0006112 A1* | 1/2016 | Kagaya | ................ | H01Q 1/1278 343/712 |
| 2016/0020813 A1* | 1/2016 | Pilat | ................... | G07C 9/00857 455/66.1 |
| 2017/0294947 A1* | 10/2017 | Little | ................... | H04B 1/0064 |

FOREIGN PATENT DOCUMENTS

| JP | 2003-209478 A | 7/2003 |
|---|---|---|
| JP | 2003-332957 A | 11/2003 |
| JP | 2009-1/1/85 A | 8/2009 |
| JP | 2010-259041 A | 11/2010 |

* cited by examiner

VEHICLE-MOUNTED TRANSMISSION SYSTEM

TECHNICAL FIELD

The present invention relates to an on-vehicle transmission system.

The present application claims priority based on Japanese Patent Application No. 2017-213988 filed on Nov. 6, 2017, the entire contents of which are incorporated herein by reference.

BACKGROUND ART

For example, PATENT LITERATURE 1 (Japanese Laid-Open Patent Publication No. 2009-177785) discloses the following technology. Specifically, an on-vehicle wireless communication apparatus includes a plurality of antennas having different frequencies, a multiplexing circuit, a demultiplexing circuit, and a plurality of wireless devices corresponding to the plurality of antennas having different frequencies. The plurality of antennas are connected to one of the multiplexing circuit and the demultiplexing circuit, and further installed on any of the roof, an upper portion of the windshield, and an upper portion of the rear glass of a vehicle together with the connected multiplexing circuit or demultiplexing circuit, the plurality of wireless devices are connected to the other of the demultiplexing circuit and the multiplexing circuit to which the antennas are not connected, by a wireless device-side antenna cable, and the multiplexing circuit and the demultiplexing circuit are connected to each other by an antenna device-side antenna cable routed through the inside of a pillar.

CITATION LIST

Patent Literature

PATENT LITERATURE 1: Japanese Laid-Open Patent Publication No. 2009-177785

SUMMARY OF INVENTION (1) An on-vehicle transmission system according to the present disclosure includes: an antenna-side circuit unit including a plurality of wireless circuits connected in series and configured to receive radio signals in frequency bands different from each other, the antenna-side circuit unit configured to combine the radio signals received by the respective wireless circuits and output a resultant radio signal; and a path part configured to transmit the radio signal resulting from the combination and received from the antenna-side circuit unit, to an on-vehicle device side mounted on the vehicle, wherein, in the antenna-side circuit unit, each wireless circuit is connected according to an order determined for each wireless circuit.

(14) An on-vehicle transmission system according to the present disclosure includes: a path part configured to transmit a radio signal received from an antenna side mounted on the vehicle, to an on-vehicle device side mounted on the vehicle; and an on-vehicle-device-side circuit unit including a plurality of wireless circuits connected in series and configured to receive radio signals in frequency bands different from each other, the on-vehicle-device-side circuit unit configured to split the radio signal from the path part and provide resultant radio signals to the respective wireless circuits, wherein, in the on-vehicle-device-side circuit unit, each wireless circuit is connected according to an order determined for each wireless circuit.

One mode of the present disclosure can be realized as a semiconductor integrated circuit that realizes a part or the entirety of an on-vehicle transmission system.

DESCRIPTION OF EMBODIMENTS

Figure 1:
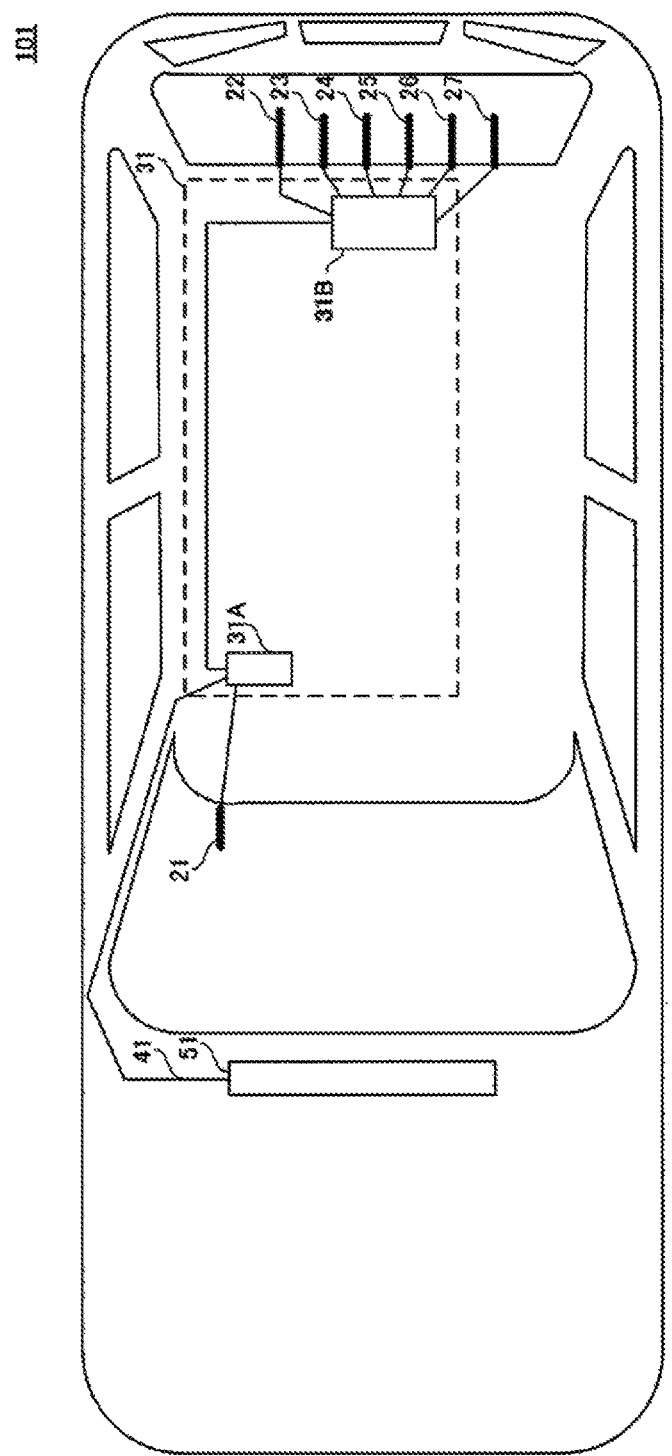
FIG. 1 shows an example of the configuration of an on-vehicle transmission system according to a first embodiment of the present invention.

Problems to be Solved by the Present Disclosure

A technology capable of realizing an excellent configuration for transmitting radio signals between an antenna side and an on-vehicle device side of a vehicle is desired beyond such a technology described in PATENT LITERATURE 1.

The present disclosure has been made in order to solve the above problem, and an object of the present disclosure is to provide an on-vehicle transmission system capable of realizing an excellent configuration for transmitting radio signals between an antenna side and an on-vehicle device side of a vehicle.

Effects of the Present Disclosure

According to the present disclosure, an excellent configuration for transmitting radio signals between an antenna side and an on-vehicle device side of a vehicle can be realized.

Description of Embodiments of the Present Disclosure

First, contents of embodiments of the present disclosure are listed and described.

(1) An on-vehicle transmission system according to an embodiment of the present invention includes: an antenna-side circuit unit including a plurality of wireless circuits connected in series and configured to receive radio signals in frequency bands different from each other, the antenna-side circuit unit configured to combine the radio signals received by the respective wireless circuits and output a resultant radio signal; and a path part configured to transmit the radio signal resulting from the combination and received from the antenna-side circuit unit, to an on-vehicle device side mounted on the vehicle, wherein, in the antenna-side circuit unit, each wireless circuit is connected according to an order determined for each wireless circuit.

Owing to the configuration in which the radio signals received by the plurality of wireless circuits are combined and transmitted as described above, the configuration for transmission can be simplified. Furthermore, owing to the configuration in which each of the wireless circuits which receive radio signals in different frequency bands is connected in the order determined for each of the wireless circuits, from various viewpoints such as signal characteristics and design, the respective wireless circuits can be appropriately arranged in accordance with corresponding services. Therefore, an excellent configuration for transmitting radio signals between the antenna side and the on-vehicle device side of the vehicle can be realized.

(2) Preferably, in the antenna-side circuit unit, the wireless circuit capable of receiving radio signals in a plurality of frequency bands is connected at an end farthest from the path part.

For a radio signal using a plurality of frequency bands, it is necessary to provide filters corresponding to the respective frequency bands, and thus the size of the circuit is increased. Owing to the configuration in which a component in another frequency band can be extracted at a side closer to the path part as described above, a radio signal mainly including a desired frequency component can be obtained, and thus the filter design can be simplified.

(3) More preferably, in the antenna-side circuit unit, the wireless circuit, other than the wireless circuit connected at the farthest end, for which the frequency band of the radio signal is higher is connected at a side closer to the path part.

Owing to the configuration in which a wireless circuit compatible with a radio signal having a high frequency is disposed at a side close to the path part as described above, the distance for which a high-frequency radio signal having a high degree of attenuation propagates through a cable or the like can be shortened.

(4) Preferably, at least one of the plurality of wireless circuits in the antenna-side circuit unit is a wireless transmission/reception circuit configured to transmit a radio signal, and, in the antenna-side circuit unit, the wireless transmission/reception circuit is connected at an end nearest to the path part.

Owing to such a configuration, at a side closer to the path part, a transmission signal can be separated to an antenna, and thus the transmission signal can be inhibited from being transmitted to the wireless circuit at a rear stage from the path part. Accordingly, the transmission signal can be prevented from propagating to the antenna connected to the wireless circuit at the rear stage.

(5) Preferably, at least one of the plurality of wireless circuits in the antenna-side circuit unit is a wireless transmission/reception circuit configured to transmit a radio signal, and, in the antenna-side circuit unit, the wireless circuit other than the wireless transmission/reception circuit is connected at an end nearest to the path part.

Owing to such a configuration, for example, even when the radio signals received by the wireless circuits are weak signals, the transmission path can be made shorter, and thus signal deterioration can be inhibited.

(6) More preferably, in the antenna-side circuit unit, the wireless circuit, other than the wireless circuit connected at the nearest end, for which the frequency band of the radio signal is higher is connected at a side closer to the path part.

Owing to the configuration in which a wireless circuit compatible with a radio signal having a high frequency is disposed at a side close to the path part as described above, the distance for which a high-frequency radio signal having a high degree of attenuation propagates through a cable or the like can be shortened.

(7) Preferably, in the antenna-side circuit unit, the wireless circuit for which the frequency band of the radio signal is higher is connected at a side closer to the path part.

Owing to the configuration in which a wireless circuit compatible with a radio signal having a high frequency is disposed at a side close to the path part as described above, the distance for which a high-frequency radio signal having a high degree of attenuation propagates through a cable or the like can be shortened.

(8) Preferably, at least one of the plurality of wireless circuits in the antenna-side circuit unit is a wireless transmission/reception circuit configured to transmit a radio signal, and the wireless transmission/reception circuit includes a diplexer.

Owing to the configuration using a diplexer as described above, in an own wireless circuit, for example, a radio signal in a frequency band not to be transmitted can be inhibited from propagating to an antenna, and a radio signal received at the own wireless circuit can be prevented from propagating to another wireless circuit at the side opposite to the path part.

(9) Preferably, at least one of the plurality of wireless circuits in the antenna-side circuit unit is a wireless transmission/reception circuit configured to transmit a radio signal, and the wireless circuit other than the wireless transmission/reception circuit includes a directional coupling circuit.

Owing to the configuration using a directional coupling circuit as described above, as compared to the case of using a diplexer, the direction of a signal in the wireless circuit is restricted, and thus, for example, a transmission radio signal in a frequency band not to be used can be more reliably prevented from propagating through an own wireless circuit to an antenna, and a radio signal received at another wireless circuit can be more reliably prevented from propagating to the antenna corresponding to the own wireless circuit.

(10) Preferably, at least one of the plurality of wireless circuits in the antenna-side circuit unit is a wireless reception circuit configured not to transmit a radio signal, and the wireless reception circuit includes an LNA (Low Noise Amplifier).

Owing to such a configuration, in the wireless reception circuit, the signal noise characteristics of a received radio signal can be improved, and isolation from a radio signal from another wireless circuit is ensured. For example, a radio signal from another wireless circuit can be inhibited from propagating to an antenna connected to an own wireless circuit.

(11) Preferably, the on-vehicle transmission system further includes: a diversity wireless circuit unit connected to a plurality of antennas; and a diversity path part configured to transmit radio signals at the plurality of antennas, to the on-vehicle device side mounted on the vehicle.

Owing to such a configuration, the space in the vehicle can be used more efficiently by passing a path through which radio signals are combined and transmitted between the antenna side and the on-vehicle device side of the vehicle and a path through which signals not suitable to be combined are transmitted, for example, through the inside of the same pillar.

(12) Preferably, the on-vehicle transmission system further includes a diversity wireless circuit unit connected to a plurality of antennas, and the antenna-side circuit unit further combines at least one of radio signals at the plurality of antennas.

Owing to the configuration in which the radio signals received at the plurality of antennas are combined as described above, for example, the number of cables passed through the inside of a pillar can be reduced, and thus the space in the vehicle can be used more efficiently.

(13) Preferably, the on-vehicle transmission system further includes a diversity wireless circuit unit connected to a plurality of antennas and configured to output a signal generated on the basis of radio signals received at the plurality of antennas, and the antenna-side circuit unit further combines the signal received from the diversity wireless circuit unit.

Owing to the configuration in which a signal is generated on the basis of radio signals received at the plurality of antennas and is combined as described above, for example, the number of cables passed through the inside of a pillar can be reduced, and thus the space in the vehicle can be used more efficiently.

(14) An on-vehicle transmission system according to an embodiment of the present invention is an on-vehicle transmission system mounted on a vehicle, the on-vehicle transmission system including: a path part configured to transmit a radio signal received from an antenna side mounted on the vehicle, to an on-vehicle device side mounted on the vehicle; and an on-vehicle-device-side circuit unit including a plurality of wireless circuits connected in series and configured to receive radio signals in frequency bands different from each other, the on-vehicle-device-side circuit unit configured to split the radio signal from the path part and provide resultant radio signals to the respective wireless circuits, wherein, in the on-vehicle-device-side circuit unit, each wireless circuit is connected according to an order determined for each wireless circuit.

Owing to the configuration in which the radio signals received by the plurality of wireless circuits are combined and transmitted as described above, the configuration for transmission can be simplified. Furthermore, owing to the configuration in which each of the wireless circuits which receive radio signals in different frequency bands is connected in the order determined for each of the wireless circuits, from various viewpoints such as signal characteristics and design, the respective wireless circuits can be appropriately arranged in accordance with corresponding services. Therefore, an excellent configuration for transmitting radio signals between the antenna side and the on-vehicle device side of the vehicle can be realized.

(15) Preferably, in the on-vehicle-device-side circuit unit, the wireless circuit capable of receiving radio signals in a plurality of frequency bands is connected at an end farthest from the path part.

For a radio signal using a plurality of frequency bands, it is necessary to provide filters corresponding to the respective frequency bands, and thus the size of the circuit is increased. Owing to the configuration in which a component in another frequency band can be extracted at a side closer to the path part as described above, a radio signal mainly including a desired frequency component can be obtained, and thus the filter design can be simplified.

(16) More preferably, in the on-vehicle-device-side circuit unit, the wireless circuit, other than the wireless circuit connected at the farthest end, for which the frequency band of the radio signal is higher is connected at a side closer to the path part.

Owing to the configuration in which a wireless circuit compatible with a radio signal having a high frequency is disposed at a side close to the path part as described above, the distance for which a high-frequency radio signal having a high degree of attenuation propagates through a cable or the like can be shortened.

(17) Preferably, at least one of the plurality of wireless circuits in the on-vehicle-device-side circuit unit is a wireless transmission/reception circuit configured to transmit a radio signal, and, in the on-vehicle-device-side circuit unit, the wireless transmission/reception circuit is connected at an end nearest to the path part.

Owing to such a configuration, a reception signal from an antenna can be separated at a side closer to the path part, and thus the reception signal can be inhibited from being transmitted to the wireless circuit at a rear stage from the path part. Accordingly, saturation of the wireless circuit at the rear stage can be prevented.

(18) Preferably, at least one of the plurality of wireless circuits in the on-vehicle-device-side circuit unit is a wireless transmission/reception circuit configured to transmit a radio signal, and, in the on-vehicle-device-side circuit unit, the wireless circuit other than the wireless transmission/reception circuit is connected at an end nearest to the path part.

Owing to such a configuration, for example, even when the radio signals received by the wireless circuits are weak signals, the transmission path can be made shorter, and thus signal deterioration can be inhibited.

(19) More preferably, in the on-vehicle-device-side circuit unit, the wireless circuit, other than the wireless circuit connected at the nearest end, for which the frequency band of the radio signal is higher is connected at a side closer to the path part.

Owing to the configuration in which a wireless circuit compatible with a radio signal having a high frequency is disposed at a side close to the path part as described above, the distance for which a high-frequency radio signal having a high degree of attenuation propagates through a cable or the like can be shortened.

(20) Preferably, in the on-vehicle-device-side circuit unit, the wireless circuit for which the frequency band of the radio signal is higher is connected at a side closer to the path part.

Owing to the configuration in which a wireless circuit compatible with a radio signal having a high frequency is disposed at a side close to the path part as described above, the distance for which a high-frequency radio signal having a high degree of attenuation propagates through a cable or the like can be shortened.

(21) Preferably, at least one of the plurality of wireless circuits in the on-vehicle-device-side circuit unit is a wireless transmission/reception circuit configured to transmit a radio signal, and the wireless transmission/reception circuit includes a diplexer.

Owing to the configuration using a diplexer as described above, for example, a transmitted radio signal can be prevented from propagating to an on-vehicle device not compatible with the radio signal and interfering in a reception circuit compatible with the on-vehicle device or saturating the reception circuit.

(22) Preferably, at least one of the plurality of wireless circuits in the on-vehicle-device-side circuit unit is a wireless transmission/reception circuit configured to transmit a radio signal, and the wireless circuit other than the wireless transmission/reception circuit includes a directional coupling circuit.

Owing to the configuration using a directional coupling circuit as described above, as compared to the case of using a diplexer, the direction of a signal in the wireless circuit is restricted, and thus a radio signal transmitted from a transmission circuit compatible with another on-vehicle device can be more reliably prevented from interfering in an own reception circuit or saturating the own reception circuit.

(23) Preferably, at least one of the plurality of wireless circuits in the on-vehicle-device-side circuit unit is a wireless reception circuit configured not to transmit a radio signal, and the wireless reception circuit includes an LNA.

Owing to such a configuration, in the wireless reception circuit, by amplifying a received radio signal, transmission loss can be compensated for and signal noise characteristics can be improved.

Hereinafter, embodiments of the present disclosure will be described with reference to the drawings. In the drawings, the same or corresponding parts are denoted by the same reference characters, and description thereof is not repeated. At least some parts of the embodiments described below may be combined together as desired.

First Embodiment

FIG. 1 shows an example of the configuration of an on-vehicle transmission system according to a first embodiment of the present invention. FIG. 1 shows an on-vehicle transmission system compatible with communication services in Japan.

With reference to FIG. 1, an on-vehicle transmission system 101 includes antennas 21 to 27, an antenna-side circuit unit 31, a path part 41, and an on-vehicle-device-side circuit unit 51. The antenna-side circuit unit 31 includes a front-side circuit unit 31A and a rear-side circuit unit 31B. Hereinafter, each of the antennas 21 to 27 is also referred to as an antenna 20.

The antennas 21 to 27 are provided so as to correspond to radio signals in different frequency bands described later.

In the on-vehicle transmission system 101, for example, the antennas 20 other than the antenna 21 are installed on a rear glass, or are collectively stored as a shark fin antenna in one casing and installed. The antenna 21 is installed on a front part of a vehicle.

The front-side circuit unit 31A is installed, for example, in the space between a sheet metal and a lining in a front part of the roof of the vehicle.

The rear-side circuit unit 31B is installed, for example, in the space between the sheet metal and the lining in a rear part of the roof of the vehicle.

The path part 41 is installed, for example, through the inside of a right front pillar of the vehicle.

The on-vehicle-device-side circuit unit 51 is installed, for example, in the space in a dashboard at the front part of the vehicle.

The front-side circuit unit 31A and the rear-side circuit unit 31B combine radio signals in different communication services, in other words, radio signals in different media, that is, radio signals in frequency bands different from each other, that are received via the antennas 20, and output the resultant radio signal to the path part 41.

The path part 41 is, for example, an antenna cable, and transmits the radio signal resulting from the combination and received from the front-side circuit unit 31A and the rear-side circuit unit 31B, to the on-vehicle-device-side circuit unit 51.

The on-vehicle-device-side circuit unit 51 splits the radio signal resulting from the combination and received from the path part 41, separates the resultant radio signals for the respective communication services, and outputs a plurality of separated radio signals to a plurality of on-vehicle devices that are not shown, respectively.

Moreover, the on-vehicle-device-side circuit unit 51 receives radio signals transmitted from the respective on-vehicle devices, combines the received radio signals, and outputs the resultant radio signal to the path part 41.

The path part 41 transmits the radio signal resulting from the combination and received from the on-vehicle-device-side circuit unit 51, to the antenna-side circuit unit 31.

The antenna-side circuit unit 31 splits the radio signal resulting from the combination and received from the path part 41, separates the resultant radio signals for the respective communication services, and transmits the separated radio signals via the corresponding antennas 20.

[Problems]

Here, the antenna-side circuit unit 31 and the on-vehicle-device-side circuit unit 51 combine or split radio signals. In general, the difference between the transmission power of a radio signal and the reception power of a radio signal is great. Thus, for example, in order to prevent the transmission power of a transmission signal from an on-vehicle device corresponding to another wireless circuit from affecting an on-vehicle device or an antenna connected to an own wireless circuit, it is required to increase the attenuation in the attenuation band of a filter.

In the case where there is a service using a plurality of adjacent frequency bands, a filter that separates the adjacent frequency bands is required to have steep passband characteristics.

For a radio signal using a plurality of discrete frequency bands in one communication service, for example, as in mobile communication such as 3G and LTE, it is difficult to design a filter.

A radio signal using a plurality of discrete frequency bands is likely to saturate another reception circuit or deteriorate the reception characteristics of another reception circuit when being transmitted. In addition, when being received, such a radio signal is likely to be interfered with by a radio signal having a different phase and received by an antenna different from an antenna to be used.

In the vehicle, for example, a radio signal propagates through a cable between the antenna-side circuit unit 31 and the on-vehicle-device-side circuit unit 51. When the radio signal propagating through the cable is a higher frequency signal, the attenuation of the signal is larger.

Therefore, in the on-vehicle transmission system according to the first embodiment of the present invention, such problems are solved by the following configurations and operations.

Figure 2:
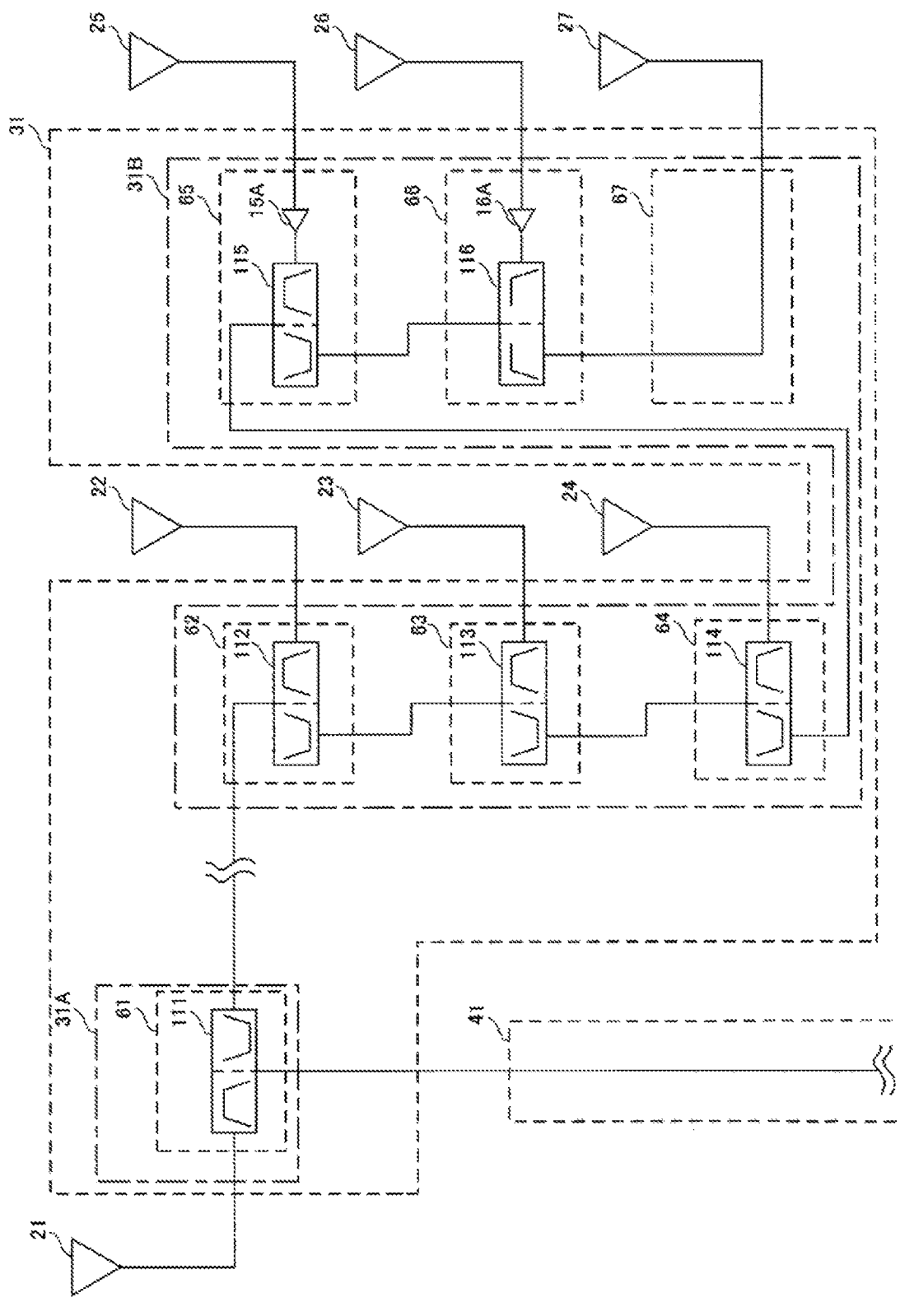
FIG. 2 shows an example of the configuration of an antenna-side circuit unit in the on-vehicle transmission system according to the first embodiment of the present invention.

FIG. 2 shows an example of the configuration of the antenna-side circuit unit in the on-vehicle transmission system according to the first embodiment of the present invention.

With reference to FIG. 2, the front-side circuit unit 31A includes a wireless circuit 61. The rear-side circuit unit 31B includes wireless circuits 62 to 67. The wireless circuits 62 to 67 are connected in series, that is, subordinately connected (connected in cascade), and receive radio signals in frequency bands different from each other. Hereinafter, each of the wireless circuits 61 to 67 is also referred to as a wireless circuit 60.

In the front-side circuit unit 31A and the rear-side circuit unit 31B, each wireless circuit 60 is connected according to an order determined for each wireless circuit 60.

In the front-side circuit unit 31A and the rear-side circuit unit 31B, each wireless circuit 60 is connected according to an order determined for each wireless circuit 60.

Figure 3:
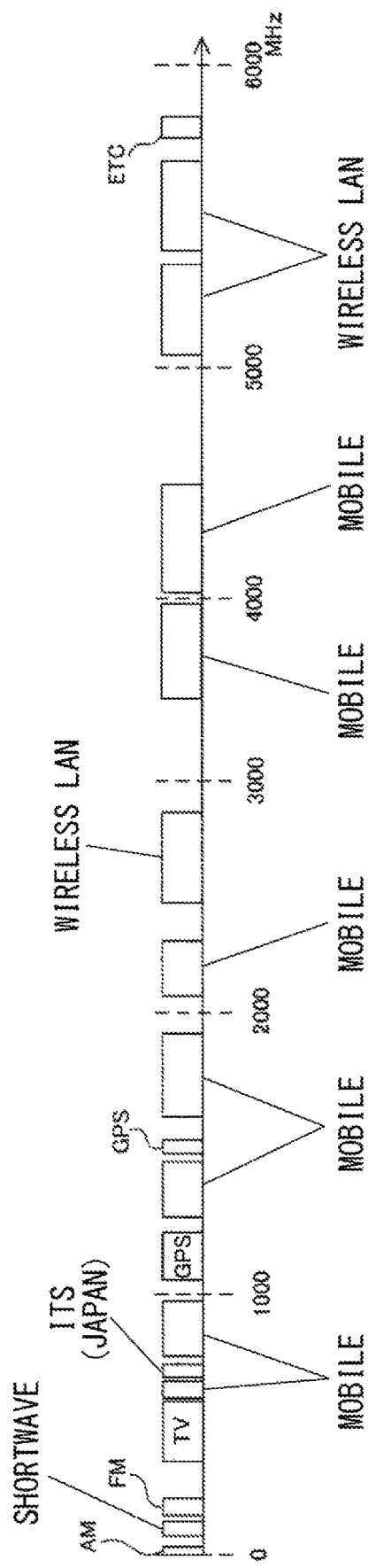
FIG. 3 shows the assignment of frequency bands of radio waves in Japan.

FIG. 3 shows the assignment of frequency bands of radio waves in Japan.

With reference to FIG. 3, in Japan, AM radio is assigned 526.5 kHz to 1606.5 kHz; shortwave radio is assigned 3.3775 MHz to 15.260 MHz; FM radio is assigned 76 MHz to 108 MHz; television broadcasting is assigned 470 MHz to 710 MHz; ITS radio is assigned 755 MHz to 765 MHz; GPS is assigned 1176.45 MHz, 1227.60 MHz, 1278.75 MHz, and 1563.4 MHz to 1578.4 MHz; wireless LAN of 2.4 GHz band is assigned 2400 MHz to 2483.5 MHz; wireless LAN of 5 GHz band is assigned 5150 MHz to 5725 MHz; and ETC is assigned 5770 MHz to 5850 MHz.

In addition, the frequency bands assigned to mobile communication such as 3G and LTE are 718 MHz to 748 MHz, 815 MHz to 845 MHz, 860 MHz to 890 MHz, 900 MHz to 915 MHz, 945 MHz to 960 MHz, 1427.9 MHz to 1462.9 MHz, 1475.9 MHz to 1510.9 MHz, 1749.9 MHz to 1784.9 MHz, 1844.9 MHz to 1879.9 MHz, 1920 MHz to 1980 MHz, 2110 MHz to 2170 MHz, and 3600 MHz to 4380 MHz. That is, in mobile communication, the frequency bands are arranged on the frequency axis so as to be spaced apart from each other, that is, are arranged discretely on the frequency axis.

In the antenna-side circuit unit 31, the wireless circuit 67 compatible with mobile communication is capable of transmitting and receiving radio signals in a plurality of frequency bands, is connected at an end farthest from the path part 41, that is, at the rearmost position, and is located at the rearmost stage among the respective wireless circuits 60, that is, at the rearmost part.

In the antenna-side circuit unit 31, the wireless circuits 61 to 64 are wireless transmission/reception circuits, are connected at an end nearest to the path part 41, that is, at the foremost position, and are located at the foremost stage among the respective wireless circuits 60, that is, at the foremost part.

In the antenna-side circuit unit 31, the wireless circuit 60 compatible with a radio signal in a higher frequency band is connected at a side closer to the path part 41.

Specifically, the wireless circuit 61 is a wireless transmission/reception circuit compatible with ETC, which is a service using a radio signal having a highest frequency, in the on-vehicle transmission system 101, and is connected at the end nearest to the path part 41.

The wireless circuit 62 which is a wireless transmission/reception circuit compatible with wireless LAN of 5 GHz band is connected to the wireless circuit 61, the wireless circuit 63 compatible with wireless LAN of 2.4 GHz band is connected to the wireless circuit 62, and the wireless circuit 64 compatible with ITS is connected to the wireless circuit 63.

In the antenna-side circuit unit 31, the wireless circuit 65 and the wireless circuit 66 which are wireless reception circuits are connected between the wireless circuit 64 and the wireless circuit 67.

The wireless circuit 65 is compatible with GPS, and the wireless circuit 66 is compatible with AM radio and FM radio (hereinafter, also referred to as AM/FM radio).

Of the wireless circuit 65 and the wireless circuit 66, the wireless circuit 65 which receives a radio signal having a higher frequency is connected at a side closer to the path part 41, that is, connected to the wireless circuit 64.

The wireless circuit 66 is connected between the wireless circuit 65 and the wireless circuit 67.

Each wireless circuit 60 may be mounted on a printed circuit board (PCB) of about 30 mm×30 mm per circuit, and each printed circuit board may be connected, for example, by a cable.

Some or all of the respective wireless circuits 60 may be mounted on one printed circuit board.

The front-side circuit unit 31A and the rear-side circuit unit 31B combine radio signals received by the respective wireless circuits 60, and output the resultant radio signal to the path part 41.

More specifically, in the antenna-side circuit unit 31, the wireless circuits 61 to 66 include diplexers 111 to 116, respectively.

The diplexer 111 in the wireless circuit 61 receives a radio signal received at the antenna 21 and corresponding to ETC, and outputs the received radio signal to the path part 41. In addition, the diplexer 111 outputs a radio signal received from the wireless circuit 62 in the rear-side circuit unit 31B, to the path part 41. The diplexer 111 combines the radio signal received at the antenna 21 and corresponding to ETC and the radio signal received from the wireless circuit 62, and outputs the resultant radio signal to the path part 41.

Meanwhile, the diplexer 111 separates a frequency component in a signal band including 5.8 GHz that is a radio signal corresponding to ETC, from a radio signal received from the path part 41. The diplexer 111 outputs the separated radio signal including the frequency component in the signal band including 5.8 GHz, to the antenna 21. The diplexer 111 outputs a radio signal including frequency components outside the signal band including 5.8 GHz, in the radio signal received from the path part 41, to the wireless circuit 62 in the rear-side circuit unit 31B.

The diplexer 112 in the wireless circuit 62 receives a radio signal received at the antenna 22 and corresponding to wireless LAN of 5 GHz band, and outputs the received radio signal to the wireless circuit 61. In addition, the diplexer 112 outputs a radio signal received from the wireless circuit 63, to the wireless circuit 61. The diplexer 112 combines the radio signal received at the antenna 22 and corresponding to wireless LAN of 5 GHz band and the radio signal received from the wireless circuit 63, and outputs the resultant radio signal to the wireless circuit 61.

Meanwhile, the diplexer 112 separates a frequency component in a signal band including 5.2 GHz to 5.6 GHz that is a radio signal corresponding to wireless LAN of 5 GHz band, from a radio signal received from the wireless circuit 61. The diplexer 112 outputs the separated radio signal including the frequency component in the signal band including 5.2 GHz to 5.6 GHz, to the antenna 22. The diplexer 112 outputs a radio signal including frequency components outside the signal band including 5.2 GHz to 5.6 GHz, in the radio signal received from the wireless circuit 61, to the wireless circuit 63.

The diplexer 113 in the wireless circuit 63 receives a radio signal received at the antenna 23 and corresponding to wireless LAN of 2.4 GHz band, and outputs the received radio signal to the wireless circuit 62. In addition, the diplexer 113 outputs a radio signal received from the wireless circuit 64, to the wireless circuit 62. The diplexer 113 combines the radio signal received at the antenna 23 and corresponding to wireless LAN of 2.4 GHz band and the radio signal received from the wireless circuit 64, and outputs the resultant radio signal to the wireless circuit 62.

Meanwhile, the diplexer 113 separates a frequency component in a signal band including 2.4 GHz that is a radio signal corresponding to wireless LAN of 2.4 GHz band, from a radio signal received from the wireless circuit 62. The diplexer 113 outputs the separated radio signal including the frequency component in the signal band including 2.4 GHz, to the antenna 23. The diplexer 113 outputs a radio signal including frequency components outside the signal band including 2.4 GHz, in the radio signal received from the wireless circuit 62, to the wireless circuit 64.

The diplexer 114 in the wireless circuit 64 receives a radio signal received at the antenna 24 and corresponding to ITS radio, and outputs the received radio signal to the wireless circuit 63. In addition, the diplexer 114 outputs a radio signal received from the wireless circuit 65, to the wireless circuit 63. The diplexer 114 combines the radio signal received at the antenna 24 and corresponding to ITS radio and the radio signal received from the wireless circuit 65, and outputs the resultant radio signal to the wireless circuit 63.

Meanwhile, the diplexer 114 separates a frequency component in a signal band including 760 MHz that is a radio signal corresponding to ITS radio, from a radio signal received from the wireless circuit 63. The diplexer 114 outputs the separated radio signal including the frequency component in the signal band including 760 MHz, to the antenna 24. The diplexer 114 outputs a radio signal including frequency components outside the signal band including 760 MHz, in the radio signal received from the wireless circuit 63, to the wireless circuit 65.

The diplexer 115 in the wireless circuit 65 receives a radio signal received at the antenna 25 and corresponding to GPS, and outputs the received radio signal to the wireless circuit 64. In addition, the diplexer 115 outputs a radio signal received from the wireless circuit 66, to the wireless circuit 64. The diplexer 115 combines the radio signal received at the antenna 25 and corresponding to GPS and the radio signal received from the wireless circuit 66, and outputs the resultant radio signal to the wireless circuit 64.

Meanwhile, the diplexer 115 outputs a radio signal including frequency components other than a frequency component in a signal band including 1.2 GHz to 1.5 GHz corresponding to GPS, in a radio signal received from the wireless circuit 64, to the wireless circuit 66.

The diplexer 116 in the wireless circuit 66 receives a radio signal received at the antenna 26 and corresponding to AM/FM radio, and outputs the received radio signal to the wireless circuit 65. In addition, the diplexer 116 outputs a radio signal received from the wireless circuit 67, to the wireless circuit 65. The diplexer 116 combines the radio signal received at the antenna 26 and corresponding to AM/FM radio and the radio signal received from the wireless circuit 67, and outputs the resultant radio signal to the wireless circuit 65.

Meanwhile, the diplexer 116 in the wireless circuit 66 outputs a radio signal including frequency components other than a frequency component in or below a signal band including 120 MHz corresponding to AM/FM radio, in a radio signal received from the wireless circuit 65, to the wireless circuit 67.

The wireless circuit 65 and the wireless circuit 66 also include an LNA 15A and an LNA 16A, respectively.

In the case where the reception power of a corresponding radio signal is low, the LNAs 15A and 16A are provided to increase a signal-to-noise ratio.

The LNA 15A is connected between the diplexer 115 and the antenna 25. The LNA 16A is connected between the diplexer 116 and the antenna 26.

The wireless circuit 67 receives a radio signal corresponding to mobile communication, via the antenna 27, and outputs the received radio signal to the wireless circuit 66.

In addition, the wireless circuit 67 transmits a radio signal received from the wireless circuit 66, via the antenna 27.

As described above, each wireless circuit 60 selectively extracts a frequency component required for the corresponding service, and outputs the extracted frequency component to the corresponding antenna 20. Accordingly, unnecessary frequency components can be prevented from being transmitted from the corresponding antenna 20.

In addition, each wireless circuit 60 selectively extracts a frequency component required for the corresponding service, from a radio signal received via the antenna 20, and outputs the extracted frequency component to the path part 41 side. Accordingly, interference by the radio signal received by the antenna 20 can be prevented.

Moreover, the antenna-side circuit unit 31 separates wireless transmission signals at the path part 41 side, whereby transmission power is not transmitted to the wireless circuits 60 at the rear stage and unnecessary frequency components can be reliably prevented from being transmitted via the antenna 20 corresponding to each wireless circuit 60.

Figure 4:
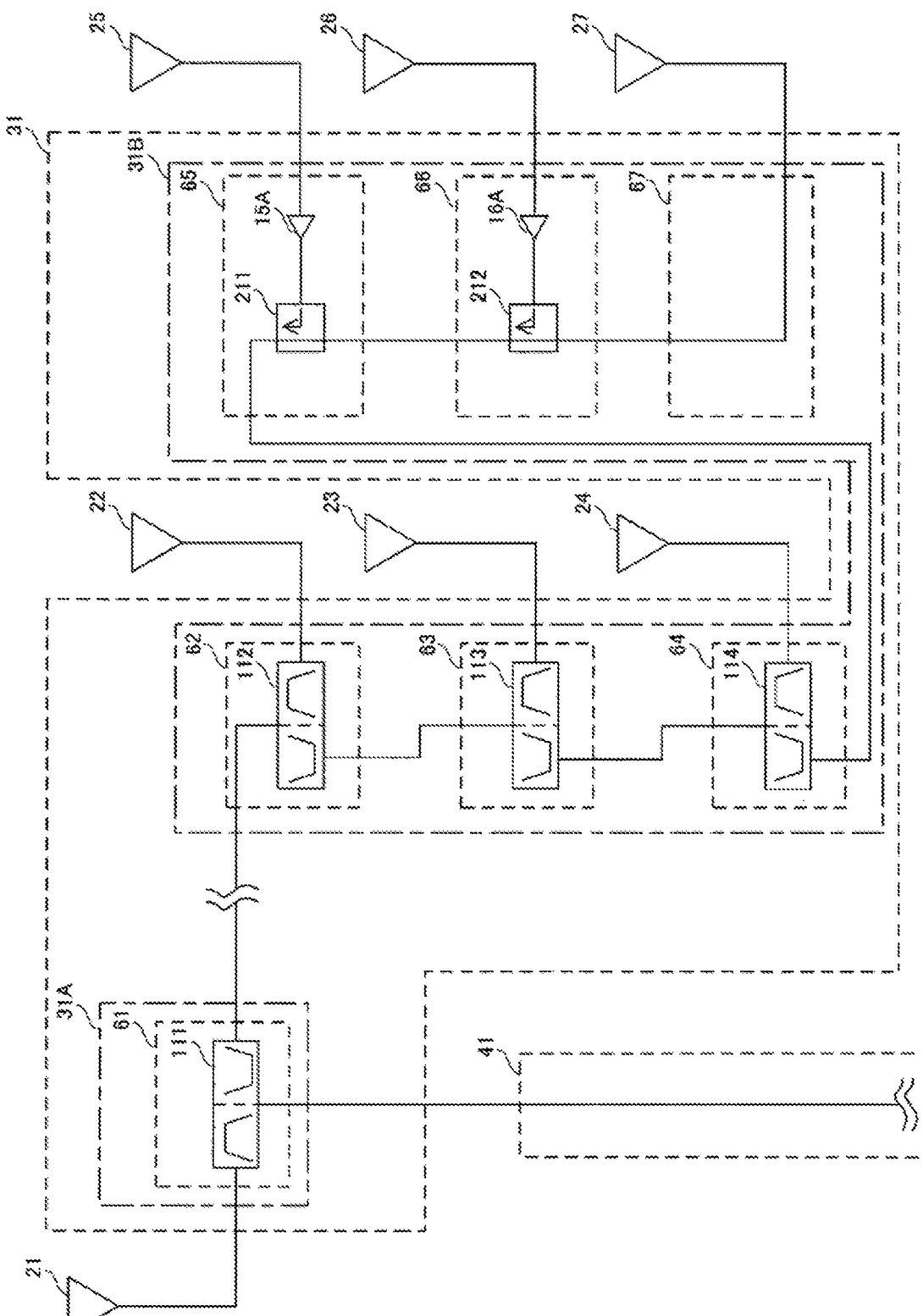
FIG. 4 shows another example of the configuration of the antenna-side circuit unit in the on-vehicle transmission system according to the first embodiment of the present invention.

FIG. 4 shows another example of the configuration of the antenna-side circuit unit in the on-vehicle transmission system according to the first embodiment of the present invention.

With reference to FIG. 4, as compared to the wireless circuit 65 and the wireless circuit 66 shown in FIG. 2, a wireless circuit 65 and a wireless circuit 66 include a directional coupling circuit 211 and a directional coupling circuit 212 instead of the diplexer 115 and the diplexer 116, respectively.

The directional coupling circuit 211 in the wireless circuit 65 receives a radio signal received at the antenna 25 and corresponding to GPS, and outputs the received radio signal to the wireless circuit 64.

In addition, the directional coupling circuit 211 outputs a radio signal received from the wireless circuit 66, to the wireless circuit 64. The directional coupling circuit 211 combines the radio signal received at the antenna 25 and corresponding to GPS and the radio signal received from the wireless circuit 66, and outputs the resultant radio signal to the wireless circuit 64.

The directional coupling circuit 212 in the wireless circuit 66 receives a radio signal received at the antenna 26 and corresponding to AM/FM radio, and outputs the received radio signal to the wireless circuit 65.

In addition, the directional coupling circuit 212 outputs a radio signal received from the wireless circuit 67, to the wireless circuit 65. The directional coupling circuit 212 combines the radio signal received at the antenna 26 and corresponding to AM/FM radio and the radio signal received from the wireless circuit 67, and outputs the resultant radio signal to the wireless circuit 65.

Figure 5:
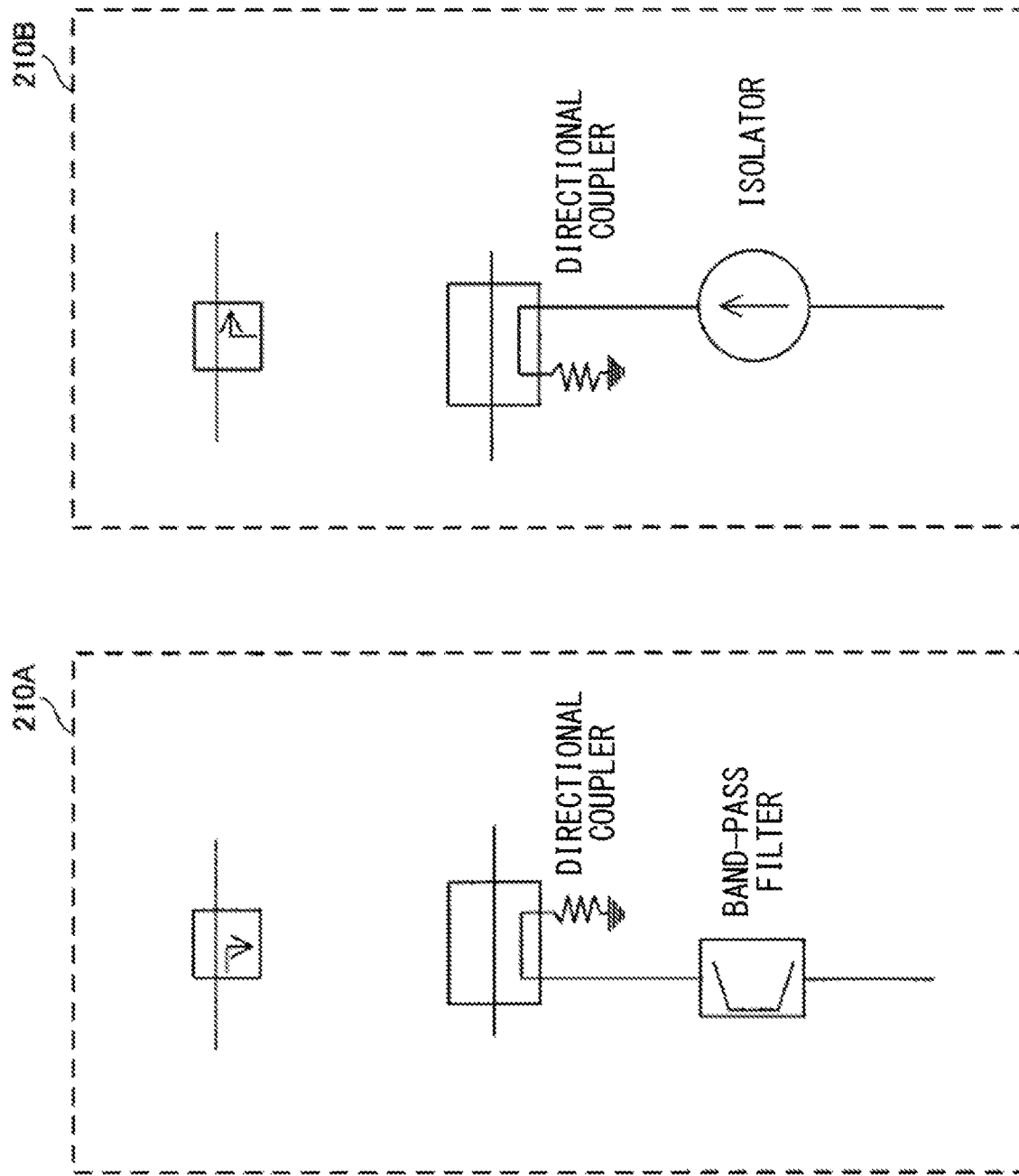
FIG. 5 shows examples of the configurations of directional coupling circuits in wireless circuits according to the first embodiment of the present invention.

FIG. 5 shows examples of the configurations of the directional coupling circuits in the wireless circuits according to the first embodiment of the present invention.

With reference to FIG. 5, a directional coupling circuit 210A includes a directional coupler and a band-pass filter. A directional coupling circuit 210B includes a directional coupler and an isolator.

The directional coupling circuit 210A and the directional coupling circuit 210B each extract or combine a signal including a desired frequency component in a specific direction, by using the wavelength characteristics, the phase characteristics, etc., of high-frequency signals.

The directional coupling circuit 210A and the directional coupling circuit 210B each allow signals in a direction other than the specific direction and signals including frequency components other than the desired frequency component to pass therethrough.

Figure 6:
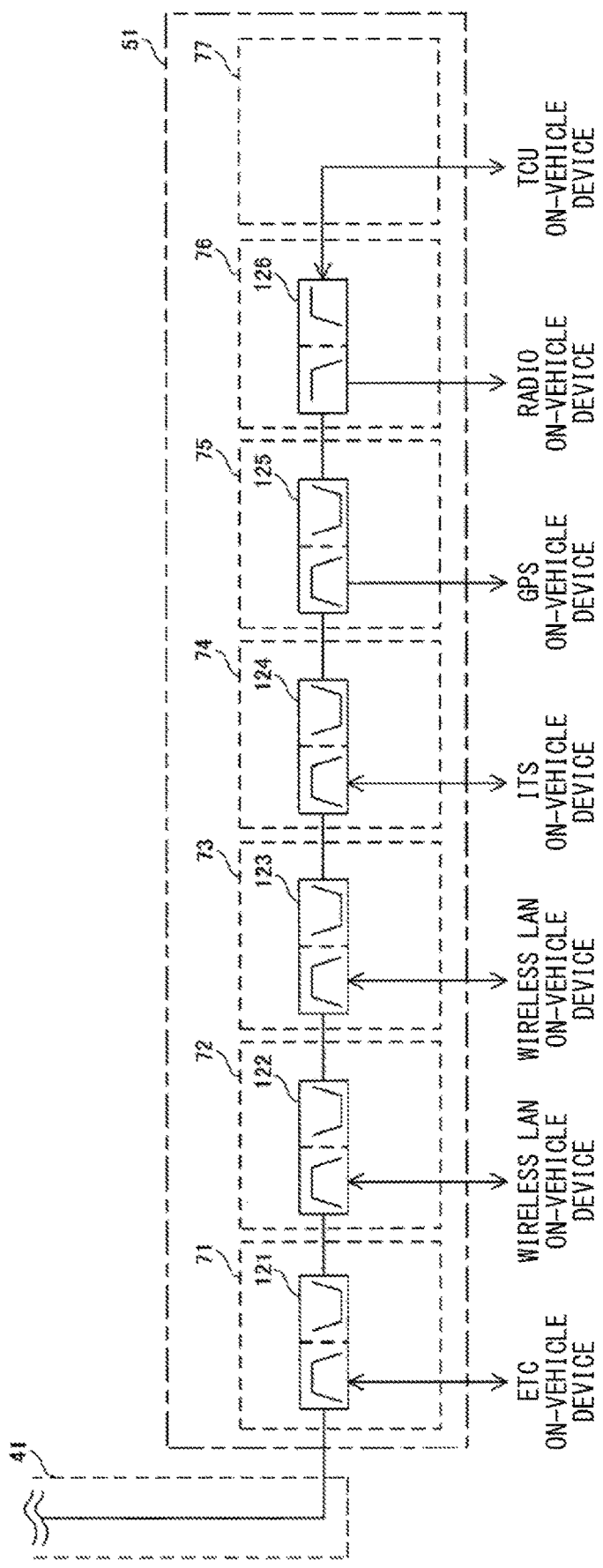
FIG. 6 shows an example of the configuration of an on-vehicle-device-side circuit unit in the on-vehicle transmission system according to the first embodiment of the present invention.

FIG. 6 shows an example of the configuration of the on-vehicle-device-side circuit unit in the on-vehicle transmission system according to the first embodiment of the present invention.

With reference to FIG. 6, the on-vehicle-device-side circuit unit 51 includes wireless circuits 71 to 77. The wireless circuits 71 to 77 are connected in series, that is, subordinately connected (connected in cascade), and receive radio signals in frequency bands different from each other. Hereinafter, each of the wireless circuits 71 to 77 is also referred to as a wireless circuit 70.

Each wireless circuit 70 is connected to an on-vehicle device that is not shown and that is capable of providing a service using a radio signal in a corresponding frequency band. For example, the wireless circuit 71 is connected to an on-vehicle device compatible with ETC (hereinafter, also referred to as an ETC on-vehicle device); the wireless circuit 72 and the wireless circuit 73 are connected to on-vehicle devices compatible with wireless LAN (hereinafter, also referred to as wireless LAN on-vehicle devices); the wireless circuit 74 is connected to an on-vehicle device compatible with ITS (hereinafter, also referred to as an ITS on-vehicle device); the wireless circuit 75 is connected to an on-vehicle device compatible with GPS such as a car navigation device (hereinafter, also referred to as a GPS on-vehicle device); the wireless circuit 76 is connected to an on-vehicle device compatible with AM/FM radio such as a radio tuner (hereinafter, also referred to as a radio on-vehicle device); and the wireless circuit 77 is connected to an on-vehicle device compatible with TCU (Telematics Communication Unit) using mobile communication (hereinafter, also referred to as a TCU on-vehicle device).

In the on-vehicle-device-side circuit unit 51, each wireless circuit 70 is connected according to an order determined for each wireless circuit 70.

In the on-vehicle-device-side circuit unit 51, the wireless circuit 77 compatible with mobile communication is capable of transmitting and receiving radio signals in a plurality of frequency bands, is connected at an end farthest from the path part 41, that is, at the rearmost position, and is located at the rearmost stage among the respective wireless circuits 70, that is, at the rearmost part.

In the on-vehicle-device-side circuit unit 51, the wireless circuits 71 to 74 are wireless transmission/reception circuits, are connected at an end nearest to the path part 41, that is, at the foremost position, and are located at the foremost stage among the respective wireless circuits 70, that is, at the foremost part.

In the on-vehicle-device-side circuit unit 51, the wireless circuit 70 compatible with a radio signal in a higher frequency band is connected at a side closer to the path part 41.

Specifically, the wireless circuit 71 is a wireless transmission/reception circuit compatible with ETC, which is a service using a radio signal having a highest frequency, in the on-vehicle transmission system 101, and is connected at the end nearest to the path part 41.

The wireless circuit 72 which is a wireless transmission/reception circuit compatible with wireless LAN of 5 GHz band is connected to the wireless circuit 71, the wireless circuit 73 compatible with wireless LAN of 2.4 GHz band is connected to the wireless circuit 72, and the wireless circuit 74 compatible with ITS is connected to the wireless circuit 73.

In the on-vehicle-device-side circuit unit 51, the wireless circuit 75 and the wireless circuit 76 which are wireless reception circuits are connected between the wireless circuit 74 and the wireless circuit 77.

The wireless circuit 75 is compatible with GPS, and the wireless circuit 76 is compatible with AM/FM radio.

Of the wireless circuit 75 and the wireless circuit 76, the wireless circuit 75 which receives a radio signal in a higher frequency band is connected at a side closer to the path part 41, that is, connected to the wireless circuit 74.

The wireless circuit 76 is connected between the wireless circuit 75 and the wireless circuit 77.

Each wireless circuit 70 may be mounted on a printed circuit board of about 30 mm×30 mm per circuit, and each printed circuit board may be connected, for example, by a cable.

Some or all of the respective wireless circuits 70 may be mounted on one printed circuit board.

In the on-vehicle-device-side circuit unit 51, the wireless circuits 71 to 76 include diplexers 121 to 126, respectively.

The on-vehicle-device-side circuit unit 51 splits a radio signal received from the path part 41 and provides the resultant radio signals to the respective wireless circuits 70.

More specifically, the diplexer 121 in the wireless circuit 71 receives a radio signal obtained by combining a plurality of frequency components, from the path part 41, and separates a frequency component in the signal band including 5.8 GHz that is a radio signal corresponding to ETC. The diplexer 121 outputs the separated radio signal including the frequency component in the signal band including 5.8 GHz, to the ETC on-vehicle device. The diplexer 121 outputs a radio signal including frequency components other than the frequency component in the signal band including 5.8 GHz, in the radio signal received from the path part 41, to the wireless circuit 72.

Meanwhile, the diplexer 121 outputs a radio signal received from the ETC on-vehicle device, to the path part 41. The diplexer 121 outputs a radio signal received from the wireless circuit 72, to the path part 41. The diplexer 121 combines the radio signal received from the ETC on-vehicle device and the radio signal received from the wireless circuit 72, and outputs the resultant radio signal to the path part 41.

The diplexer 122 in the wireless circuit 72 receives a radio signal obtained by combining a plurality of frequency components, from the wireless circuit 71, and separates a frequency component in the signal band including 5.2 GHz to 5.6 GHz that is a radio signal corresponding to wireless LAN of 5 GHz band. The diplexer 122 outputs the separated radio signal including the frequency component in the signal band including 5.2 GHz to 5.6 GHz, to the wireless LAN on-vehicle device. The diplexer 122 outputs a radio signal including frequency components other than the frequency component in the signal band including 5.2 GHz to 5.6 GHz, in the radio signal received from the wireless circuit 71, to the wireless circuit 73.

Meanwhile, the diplexer 122 outputs a radio signal received from the wireless LAN on-vehicle device, to the wireless circuit 71. The diplexer 122 outputs a radio signal received from the wireless circuit 73, to the wireless circuit 71. The diplexer 122 combines the radio signal received from the wireless LAN on-vehicle device and the radio signal received from the wireless circuit 73, and outputs the resultant radio signal to the wireless circuit 71.

The diplexer 123 in the wireless circuit 73 receives a radio signal obtained by combining a plurality of frequency components, from the wireless circuit 72, and separates a frequency component in the signal band including 2.4 GHz that is a radio signal corresponding to wireless LAN of 2.4 GHz band. The diplexer 123 outputs the separated radio signal including the frequency component in the signal band including 2.4 GHz, to the wireless LAN on-vehicle device. The diplexer 123 outputs a radio signal including frequency components other than the frequency component in the signal band including 2.4 GHz, in the radio signal received from the wireless circuit 72, to the wireless circuit 74.

Meanwhile, the diplexer 123 outputs a radio signal received from the wireless LAN on-vehicle device, to the wireless circuit 72. The diplexer 123 outputs a radio signal received from the wireless circuit 74, to the wireless circuit 72. The diplexer 123 combines the radio signal received from the wireless LAN on-vehicle device and the radio signal received from the wireless circuit 74, and outputs the resultant radio signal to the wireless circuit 72.

The diplexer 124 in the wireless circuit 74 receives a radio signal obtained by combining a plurality of frequency components, from the wireless circuit 73, and separates a frequency component in the signal band including 760 MHz that is a radio signal corresponding to ITS radio. The diplexer 124 outputs the separated radio signal including the frequency component in the signal band including 760 MHz, to the ITS on-vehicle device. The diplexer 124 outputs a radio signal including frequency components other than the frequency component in the signal band including 760 MHz, in the radio signal received from the wireless circuit 73, to the wireless circuit 75.

Meanwhile, the diplexer 124 outputs a radio signal received from the ITS on-vehicle device, to the wireless circuit 73. The diplexer 124 outputs a radio signal received from the wireless circuit 75, to the wireless circuit 73. The diplexer 124 combines the radio signal received from the ITS on-vehicle device and the radio signal received from the wireless circuit 75, and outputs the resultant radio signal to the wireless circuit 73.

The diplexer 125 in the wireless circuit 75 receives a radio signal obtained by combining a plurality of frequency components, from the wireless circuit 74, and separates a frequency component in the signal band including 1.2 GHz to 1.5 GHz that is a radio signal corresponding to GPS. The diplexer 125 outputs the separated radio signal including the frequency component in the signal band including 1.2 GHz to 1.5 GHz, to the GPS on-vehicle device. The diplexer 125 outputs a radio signal including frequency components other than the frequency component in the signal band including 1.2 GHz to 1.5 GHz, in the radio signal received from the wireless circuit 74, to the wireless circuit 76.

The diplexer 126 in the wireless circuit 76 receives a radio signal obtained by combining a plurality of frequency components, from the wireless circuit 75, and separates a frequency component in or below the signal band including 120 MHz that is a radio signal corresponding to AM/FM radio. The diplexer 126 outputs the separated radio signal including the frequency component in or below the signal band including 120 MHz, to the radio on-vehicle device. The diplexer 126 outputs a radio signal including frequency components other than the frequency component in or below the signal band including 120 MHz, in the radio signal received from the wireless circuit 75, to the wireless circuit 77.

The wireless circuit 77 receives a radio signal including a frequency component corresponding to mobile communication, from the TCU on-vehicle device, and outputs the received radio signal to the wireless circuit 76.

In addition, the wireless circuit 77 outputs a radio signal received from the wireless circuit 76, to the TCU on-vehicle device.

Figure 7:
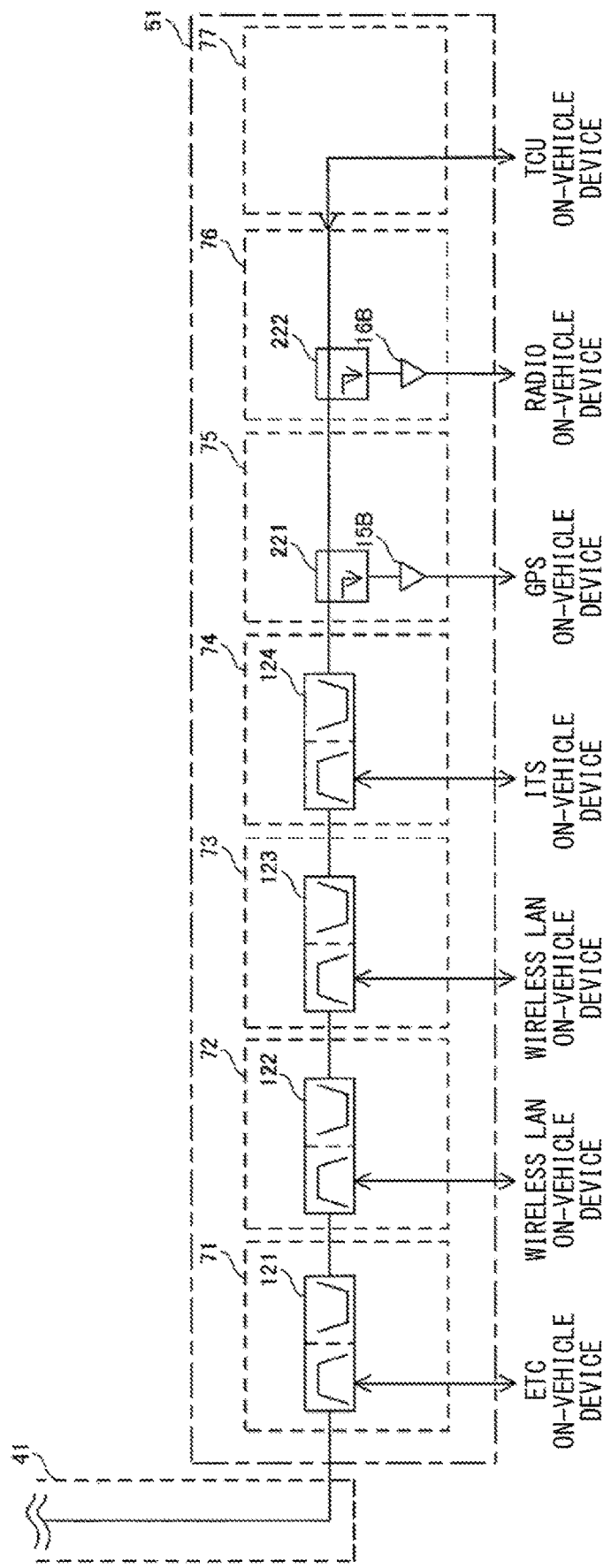
FIG. 7 shows another example of the configuration of the on-vehicle-device-side circuit unit in the on-vehicle transmission system according to the first embodiment of the present invention.

FIG. 7 shows another example of the configuration of the on-vehicle-device-side circuit unit in the on-vehicle transmission system according to the first embodiment of the present invention.

With reference to FIG. 7, as compared to the wireless circuit 75 shown in FIG. 6, a wireless circuit 75 includes a directional coupling circuit 221 instead of the diplexer 125, and includes an LNA 15B. The LNA 15B is connected between the directional coupling circuit 221 and the GPS on-vehicle device.

As compared to the wireless circuit 76 shown in FIG. 6, a wireless circuit 76 includes a directional coupling circuit 222 instead of the diplexer 126, and includes an LNA 16B. The LNA 16B is connected between the directional coupling circuit 222 and the radio on-vehicle device.

The directional coupling circuit 221 in the wireless circuit 75 receives a radio signal obtained by combining a plurality of frequency components, from the wireless circuit 74, and separates a frequency component in the signal band including 1.2 GHz to 1.5 GHz that is a radio signal corresponding to GPS.

In addition, the directional coupling circuit 221 outputs the separated radio signal including the frequency component in the signal band including 1.2 GHz to 1.5 GHz, to the GPS on-vehicle device. The directional coupling circuit 221 outputs a radio signal including frequency components other than the frequency component in the signal band including 1.2 GHz to 1.5 GHz, in the radio signal received from the wireless circuit 74, to the wireless circuit 76.

The directional coupling circuit 222 in the wireless circuit 76 receives a radio signal obtained by combining a plurality of frequency components, from the wireless circuit 75, and separates a frequency component in or below the signal band including 120 MHz that is a radio signal corresponding to AM/FM radio.

In addition, the directional coupling circuit 222 outputs the separated radio signal including the frequency component in or below the signal band including 120 MHz, to the radio on-vehicle device. The directional coupling circuit 222 outputs a radio signal including frequency components other than the frequency component in or below the signal band including 120 MHz, in the radio signal received from the wireless circuit 75, to the wireless circuit 77.

[Modification 1]

Modification 1 of the on-vehicle transmission system 101 includes a diversity wireless circuit connected to a plurality of antennas such as a television antenna, and a diversity path part that transmits radio signals received via the plurality of antennas, to the on-vehicle device side.

Figure 8:
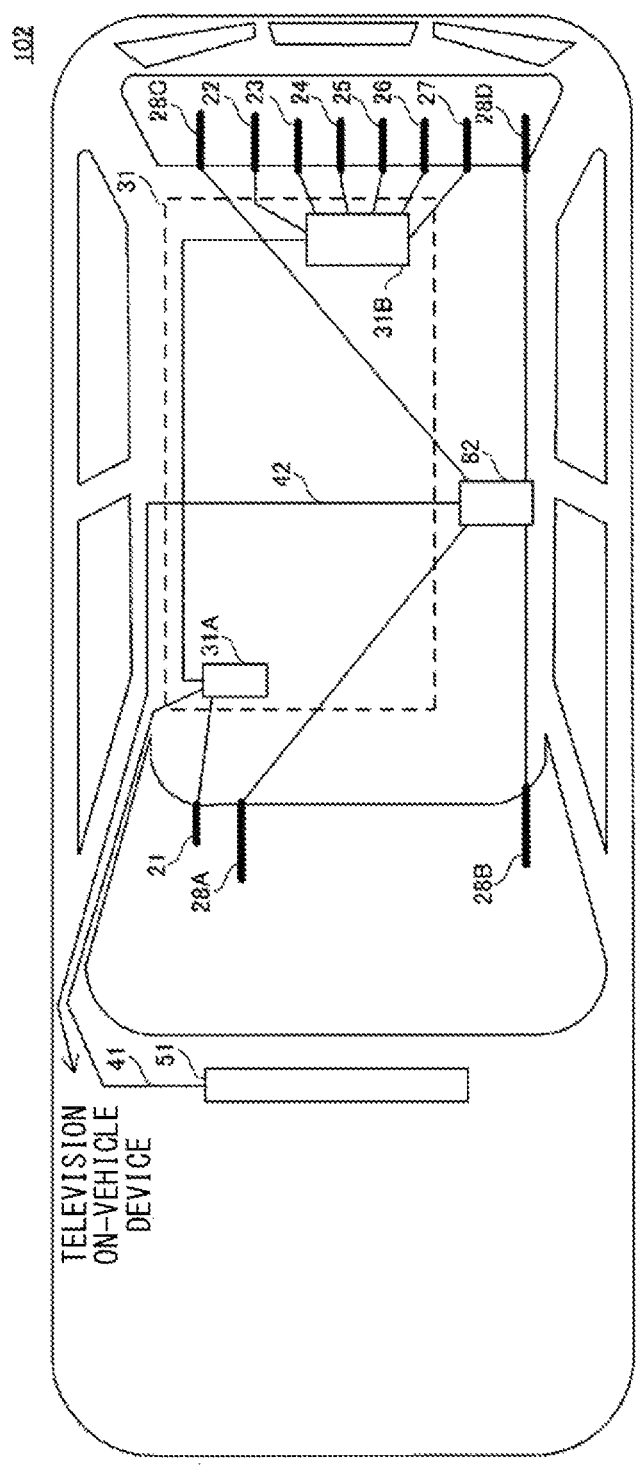
FIG. 8 shows the configuration of Modification 1 of the on-vehicle transmission system according to the first embodiment of the present invention.

FIG. 8 shows the configuration of Modification 1 of the on-vehicle transmission system according to the first embodiment of the present invention.

With reference to FIG. 8, as compared to the on-vehicle transmission system 101, an on-vehicle transmission system 102 further includes antennas 28A, 28B, 28C, and 28D, a diversity wireless circuit unit 82, and a diversity path part 42. Hereinafter, each of the antennas 28A, 28B, 28C, and 28D is also referred to as an antenna 28.

The diversity wireless circuit unit 82 in the on-vehicle transmission system 102 is installed, for example, in the space between the sheet metal and the lining in the roof of the vehicle.

The antennas 28 are, for example, distributed and installed on the windshield and the rear glass, or collectively stored as a shark fin antenna in one casing and installed.

The antennas 28A, 28B, 28C, and 28D are connected to the diversity wireless circuit unit 82.

The diversity wireless circuit unit 82 performs analog signal processing and digital signal processing such as down conversion on each of radio signals received via the antennas 28A, 28B, 28C, and 28D and corresponding to television broadcasting, converts a signal resulting from up conversion of the signal resulting from the processing, for example, into a signal for television such as RGB or HDMI (High-Definition Multimedia Interface) (registered trademark), and outputs the signal resulting from the conversion, to the diversity path part 42.

The diversity path part 42 is installed through the inside of the right front pillar of the vehicle, and outputs a signal received from the diversity wireless circuit unit 82, for example, to a television on-vehicle device that is not shown.

Moreover, in the on-vehicle transmission system according to the first embodiment of the present invention, the diversity wireless circuit unit 82 is configured to be connected to the antennas 28A, 28B, 28C, and 28D, to receive radio signals via the antennas 28A, 28B, 28C, and 28D, and to output the received radio signals to the diversity path part 42, but the diversity wireless circuit unit 82 is not limited thereto. For example, the diversity wireless circuit unit 82 may be configured to receive a radio signal transmitted from the on-vehicle device, via the diversity path part 42, and transmit the received radio signal via the antennas 28A, 28B, 28C, and 28D connected to the diversity wireless circuit unit 82.

[Modification 2]

Modification 2 of the on-vehicle transmission system 101 includes a diversity wireless circuit connected to a plurality of antennas such as a television antenna. An antenna-side circuit unit in Modification 2 of the on-vehicle transmission system 101 further combines any one of radio signals received via the plurality of antennas.

Figure 9:
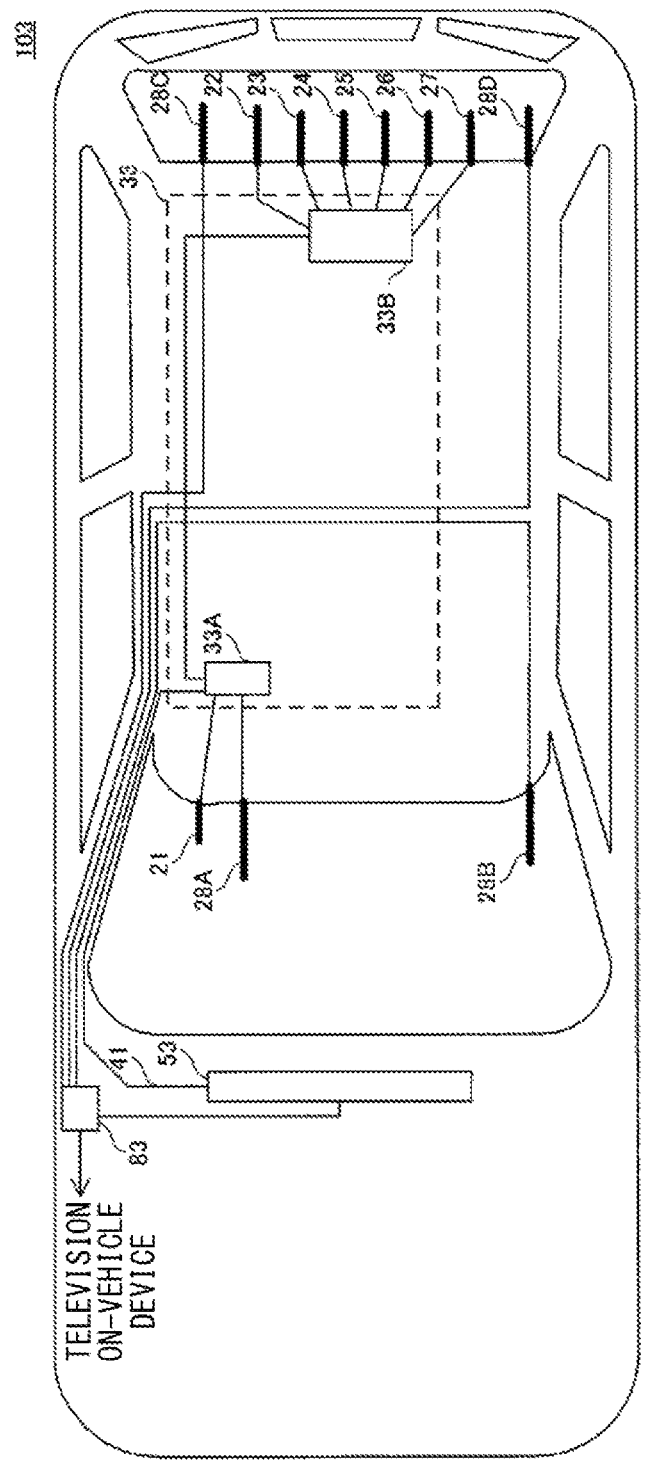
FIG. 9 shows the configuration of Modification 2 of the on-vehicle transmission system according to the first embodiment of the present invention.

FIG. 9 shows the configuration of Modification 2 of the on-vehicle transmission system according to the first embodiment of the present invention.

With reference to FIG. 9, an on-vehicle transmission system 103 includes antennas 21 to 27, an antenna-side circuit unit 33, a path part 41, and an on-vehicle-device-side circuit unit 53. The on-vehicle transmission system 103 further includes antennas 28A, 28B, 28C, and 28D and a diversity wireless circuit unit 83.

The antenna-side circuit unit 33 includes a front-side circuit unit 33A and a rear-side circuit unit 33B.

The diversity wireless circuit unit 83 is installed, for example, in the space in the dashboard at the front part of the vehicle.

The antennas 28 are, for example, installed on the windshield or the rear glass, or collectively stored as a shark fin antenna in one casing and installed.

Figure 10:
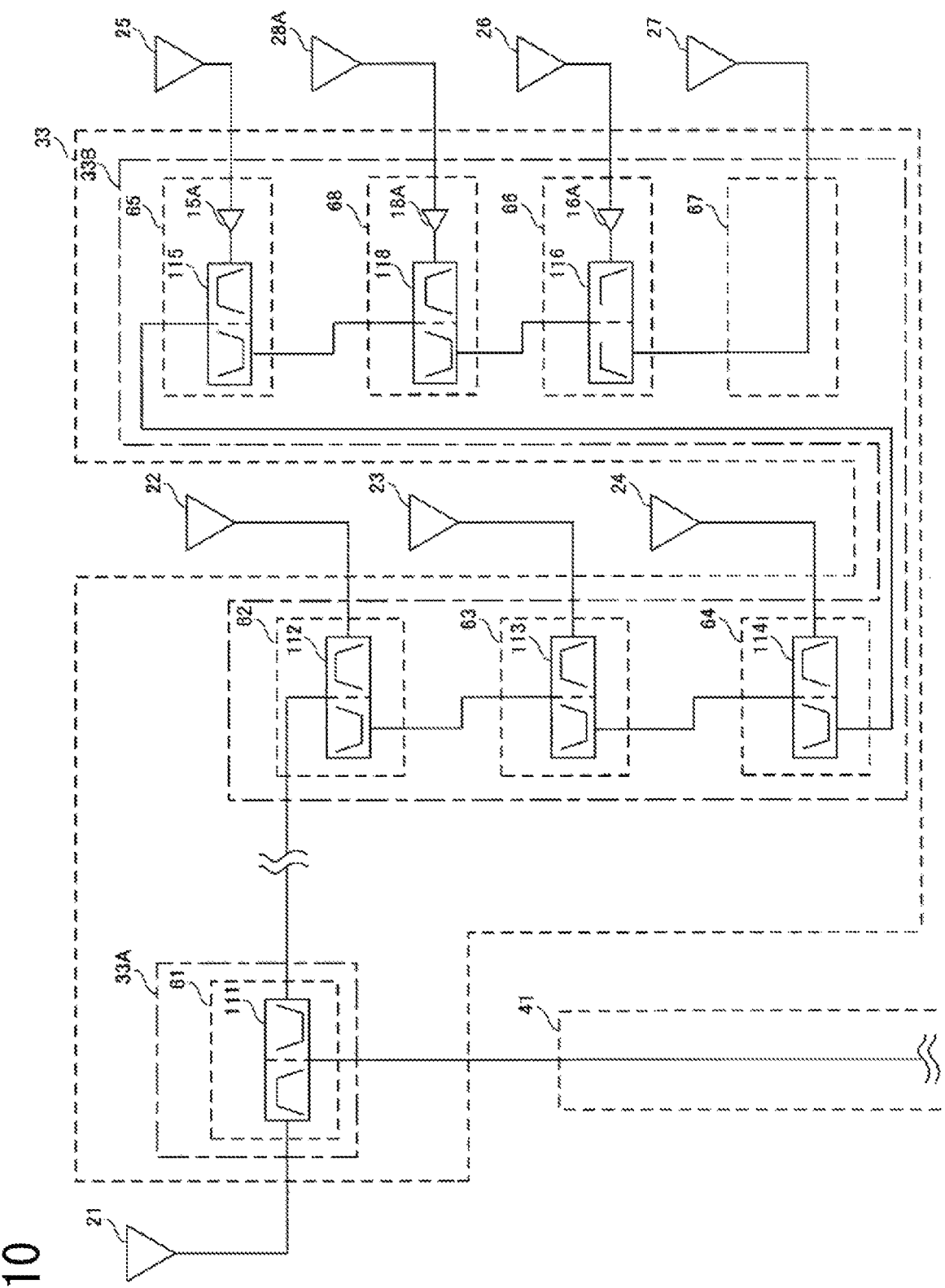
FIG. 10 shows an example of the configuration of an antenna-side circuit unit in Modification 2 of the on-vehicle transmission system according to the first embodiment of the present invention.

FIG. 10 shows an example of the configuration of the antenna-side circuit unit in Modification 2 of the on-vehicle transmission system according to the first embodiment of the present invention.

With reference to FIG. 10, as compared to the antenna-side circuit unit 31 shown in FIG. 2, the antenna-side circuit unit 33 further includes a wireless circuit 68.

The wireless circuit 68 is connected between the wireless circuit 65 and the wireless circuit 66. The wireless circuit 68 includes a diplexer 118 and an LNA 18A.

The LNA 18A is connected between the antenna 28A and the diplexer 118.

The diplexer 118 in the wireless circuit 68 outputs a radio signal received via the antenna 28A, to the wireless circuit 65. In addition, the diplexer 118 outputs a radio signal received from the wireless circuit 66, to the wireless circuit 65. The diplexer 118 combines the radio signal received via the antenna 28A and the radio signal received from the wireless circuit 66, and outputs the resultant radio signal to the wireless circuit 65.

Meanwhile, the diplexer 118 outputs a radio signal including frequency components other than a frequency component in a signal band including 470 MHz to 710 MHz corresponding to television broadcasting, in a radio signal received from the wireless circuit 65, to the wireless circuit 66.

Figure 11:
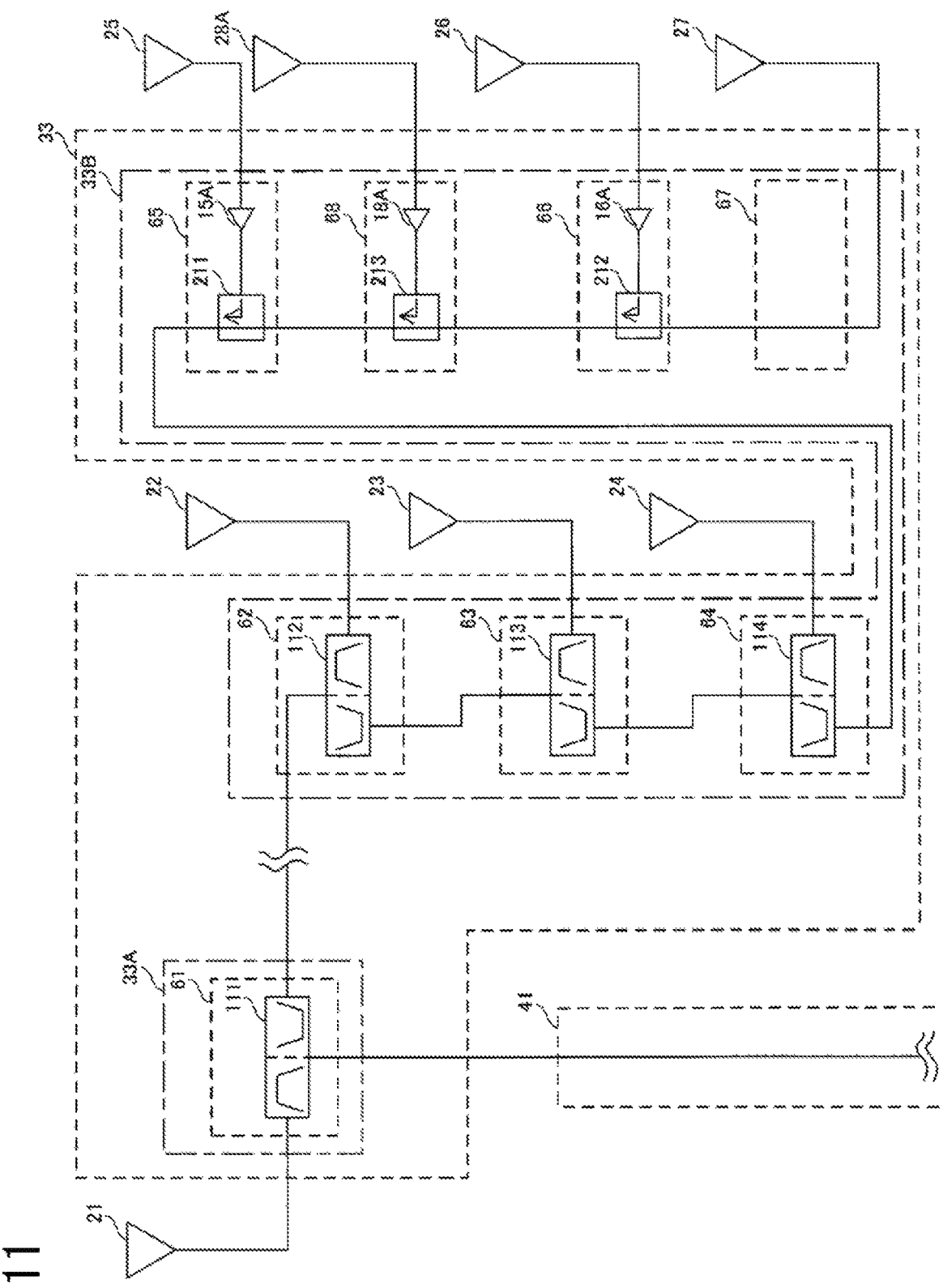
FIG. 11 shows another example of the configuration of the antenna-side circuit unit in Modification 2 of the on-vehicle transmission system according to the first embodiment of the present invention.

FIG. 11 shows another example of the configuration of the antenna-side circuit unit in Modification 2 of the on-vehicle transmission system according to the first embodiment of the present invention.

With reference to FIG. 11, as compared to the antenna-side circuit unit 31 shown in FIG. 4, the antenna-side circuit unit 33 further includes a wireless circuit 68 including a directional coupling circuit 213.

The directional coupling circuit 213 in the wireless circuit 68 receives a radio signal received at the antenna 28A and corresponding to television broadcasting, and outputs the received radio signal to the wireless circuit 65.

In addition, the directional coupling circuit 213 outputs a radio signal received from the wireless circuit 66, to the wireless circuit 65. The directional coupling circuit 213 combines the radio signal received at the antenna 28A and corresponding to television broadcasting and the radio signal received from the wireless circuit 66, and outputs the resultant radio signal to the wireless circuit 65.

Figure 12:
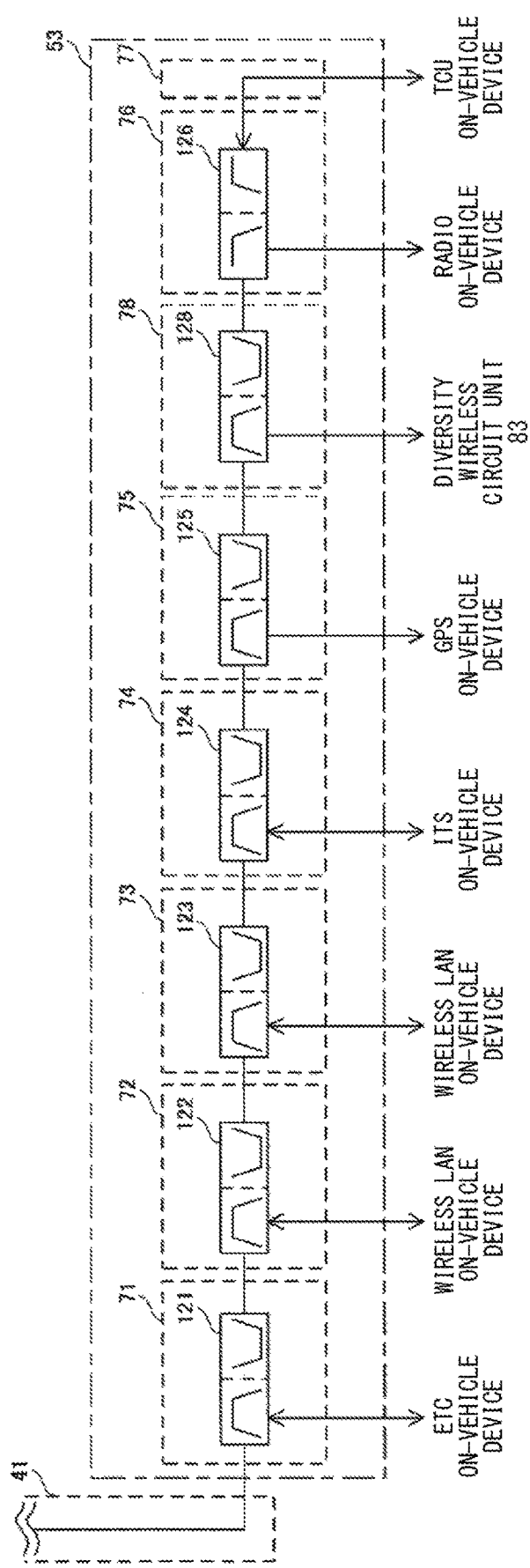
FIG. 12 shows an example of the configuration of an on-vehicle-device-side circuit unit in Modification 2 of the on-vehicle transmission system according to the first embodiment of the present invention.

FIG. 12 shows an example of the configuration of the on-vehicle-device-side circuit unit in Modification 2 of the on-vehicle transmission system according to the first embodiment of the present invention.

With reference to FIG. 12, as compared to the on-vehicle-device-side circuit unit 51 in FIG. 6, the on-vehicle-device-side circuit unit 53 further includes a wireless circuit 78.

The wireless circuit 78 is connected between the wireless circuit 75 and the wireless circuit 76. The wireless circuit 78 includes a diplexer 128.

The diplexer 128 receives a radio signal obtained by combining a plurality of frequency components, from the wireless circuit 75, and separates a frequency component in the signal band including 470 MHz to 710 MHz that is a radio signal corresponding to television broadcasting. The diplexer 128 outputs the separated radio signal including the frequency component in the signal band including 470 MHz to 710 MHz, to the diversity wireless circuit unit 83. The diplexer 128 outputs a radio signal including frequency components other than the frequency component in the signal band including 470 MHz to 710 MHz, in the radio signal received from the wireless circuit 75, to the wireless circuit 76.

Figure 13:
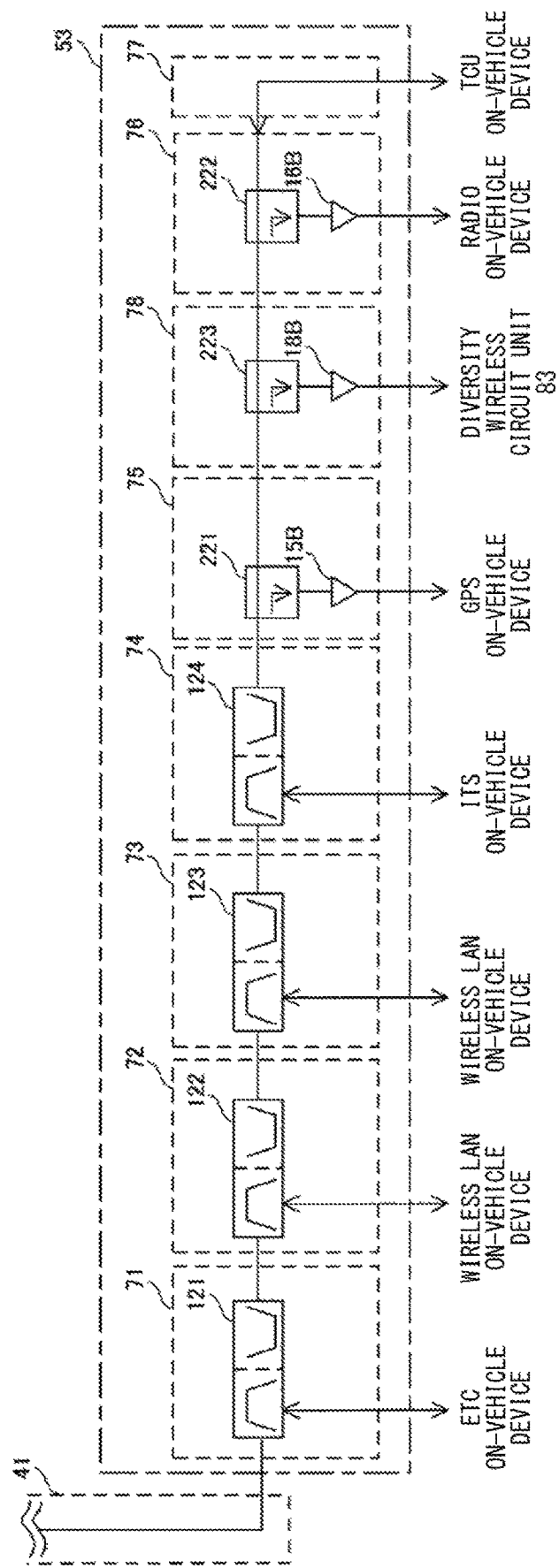
FIG. 13 shows another example of the configuration of the on-vehicle-device-side circuit unit in Modification 2 of the on-vehicle transmission system according to the first embodiment of the present invention.

FIG. 13 shows another example of the configuration of the on-vehicle-device-side circuit unit in Modification 2 of the on-vehicle transmission system according to the first embodiment of the present invention.

With reference to FIG. 13, as compared to the on-vehicle-device-side circuit unit 51 in FIG. 7, the on-vehicle-device-side circuit unit 53 further includes a wireless circuit 78 including a directional coupling circuit 223.

The directional coupling circuit 223 in the wireless circuit 78 receives a radio signal obtained by combining a plurality of frequency components, from the wireless circuit 75, and separates a frequency component in the signal band including 470 MHz to 710 MHz that is a radio signal corresponding to television broadcasting.

In addition, the directional coupling circuit 223 outputs the separated radio signal including the frequency component in the signal band including 470 MHz to 710 MHz, to the diversity wireless circuit unit 83. The directional coupling circuit 223 outputs a radio signal including frequency components other than the frequency component in the signal band including 470 MHz to 710 MHz, in the radio signal received from the wireless circuit 75, to the wireless circuit 76.

Referring back to FIG. 9, the antennas 28B, 28C, and 28D are connected to the diversity wireless circuit unit 83.

The diversity wireless circuit unit 83 performs analog signal processing and digital signal processing such as down conversion on a radio signal received from the wireless circuit 78 and each of radio signals received via the antennas 28B, 28C, and 28D, converts a signal resulting from up conversion of the signal resulting from the processing, for example, into a signal for television such as RGB or HDMI, and outputs the signal resulting from the conversion, for example, to the television on-vehicle device.

Regarding the on-vehicle transmission system according to the first embodiment of the present invention, the on-vehicle transmission system 103 is configured to perform reception diversity using the diversity wireless circuit unit 83, the wireless circuit 68, the wireless circuit 78, and the antennas 28A, 28B, 28C, and 28D, but is not limited thereto. The on-vehicle transmission system 103 may be configured to perform transmission diversity.

More specifically, for example, the diversity wireless circuit unit 83 receives a signal transmitted from the on-vehicle device, processes the received signal to generate a plurality of radio signals, outputs one of the generated radio signals to the on-vehicle-device-side circuit unit 53, and transmits the other radio signals via the antennas 28A, 28B, 28C, and 28D connected to the diversity wireless circuit unit 83.

The wireless circuit 78 is a wireless transmission/reception circuit, and outputs a radio signal received from the diversity wireless circuit unit 83, to the wireless circuit 75. The wireless circuit 78 outputs a radio signal received from the wireless circuit 76, to the wireless circuit 75. The wireless circuit 78 combines the radio signal received from the diversity wireless circuit unit 83 and the radio signal received from the wireless circuit 76, and outputs the resultant radio signal to the wireless circuit 75.

The wireless circuit 68 is a wireless transmission/reception circuit, separates a frequency component in the signal band of the radio signal transmitted from the diversity wireless circuit unit 83, from a radio signal received from the wireless circuit 65, and outputs the separated radio signal to the antenna 28A. The wireless circuit 68 outputs a radio signal including frequency components outside the signal band of the radio signal transmitted from the diversity wireless circuit unit 83, in the radio signal received from the wireless circuit 65, to the wireless circuit 66.

[Modification 3]

Modification 3 of the on-vehicle transmission system 101 includes a diversity wireless circuit that is connected to a plurality of antennas such as a television antenna and that outputs a radio signal generated on the basis of radio signals received at the plurality of antennas.

An antenna-side circuit unit in Modification 3 of the on-vehicle transmission system 101 further combines a radio signal received from the diversity wireless circuit.

Figure 14:
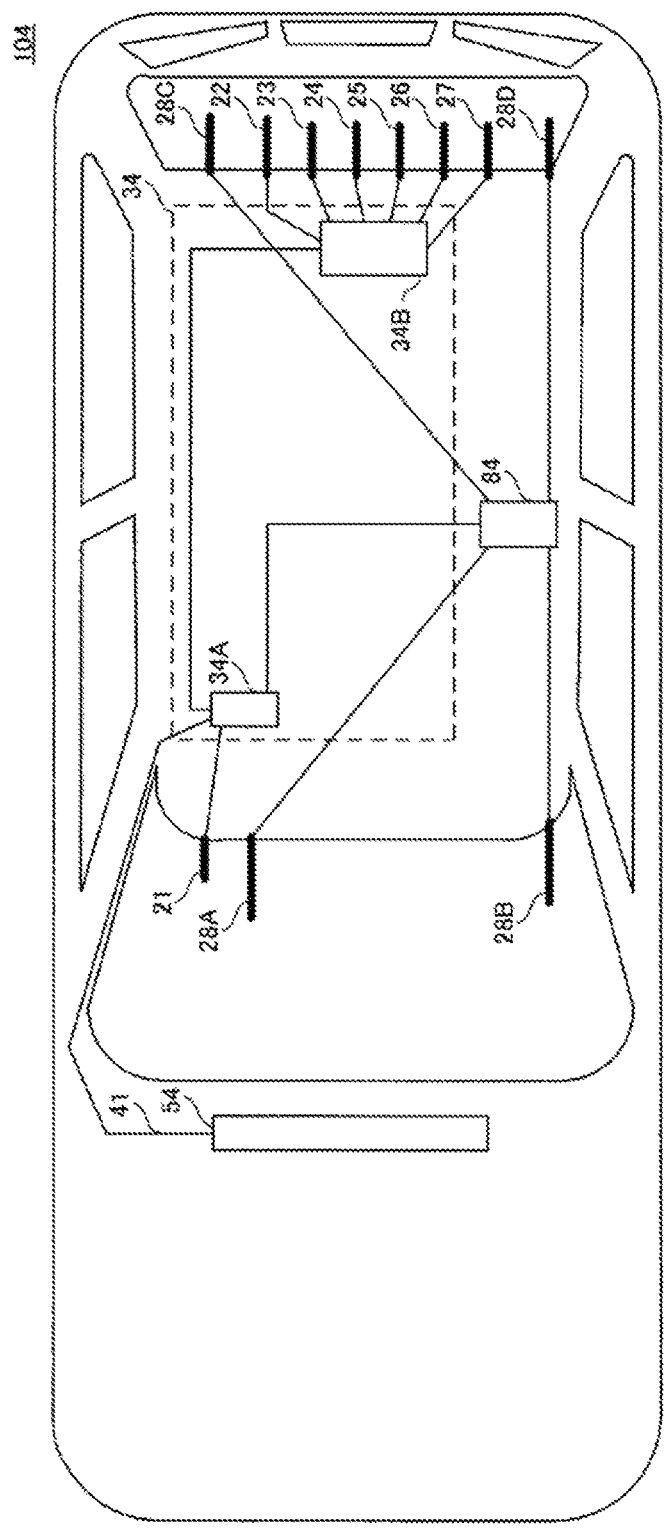
FIG. 14 shows the configuration of Modification 3 of the on-vehicle transmission system according to the first embodiment of the present invention.

FIG. 14 shows the configuration of Modification 3 of the on-vehicle transmission system according to the first embodiment of the present invention.

With reference to FIG. 14, an on-vehicle transmission system 104 includes antennas 21 to 27, an antenna-side circuit unit 34, a path part 41, and an on-vehicle-device-side circuit unit 54. The on-vehicle transmission system 104 further includes antennas 28A, 28B, 28C, and 28D and a diversity wireless circuit unit 84.

The antenna-side circuit unit 34 includes a front-side circuit unit 34A and a rear-side circuit unit 34B.

The diversity wireless circuit unit 84 in the on-vehicle transmission system 104 is installed, for example, in the space between the sheet metal and the lining in the roof of the vehicle.

The antennas 28 are, for example, installed on the windshield or the rear glass, or collectively stored as a shark fin antenna in one casing and installed.

The diversity wireless circuit unit 84 is connected to the multiple antennas 28A, 28B, 28C, and 28D, performs analog signal processing and digital signal processing such as down conversion on each of radio signals received at the respective antennas 28 and corresponding to television broadcasting, generates a signal obtained by up-converting the signal resulting from the processing, and outputs the generated signal to the antenna-side circuit unit 34.

Figure 15:
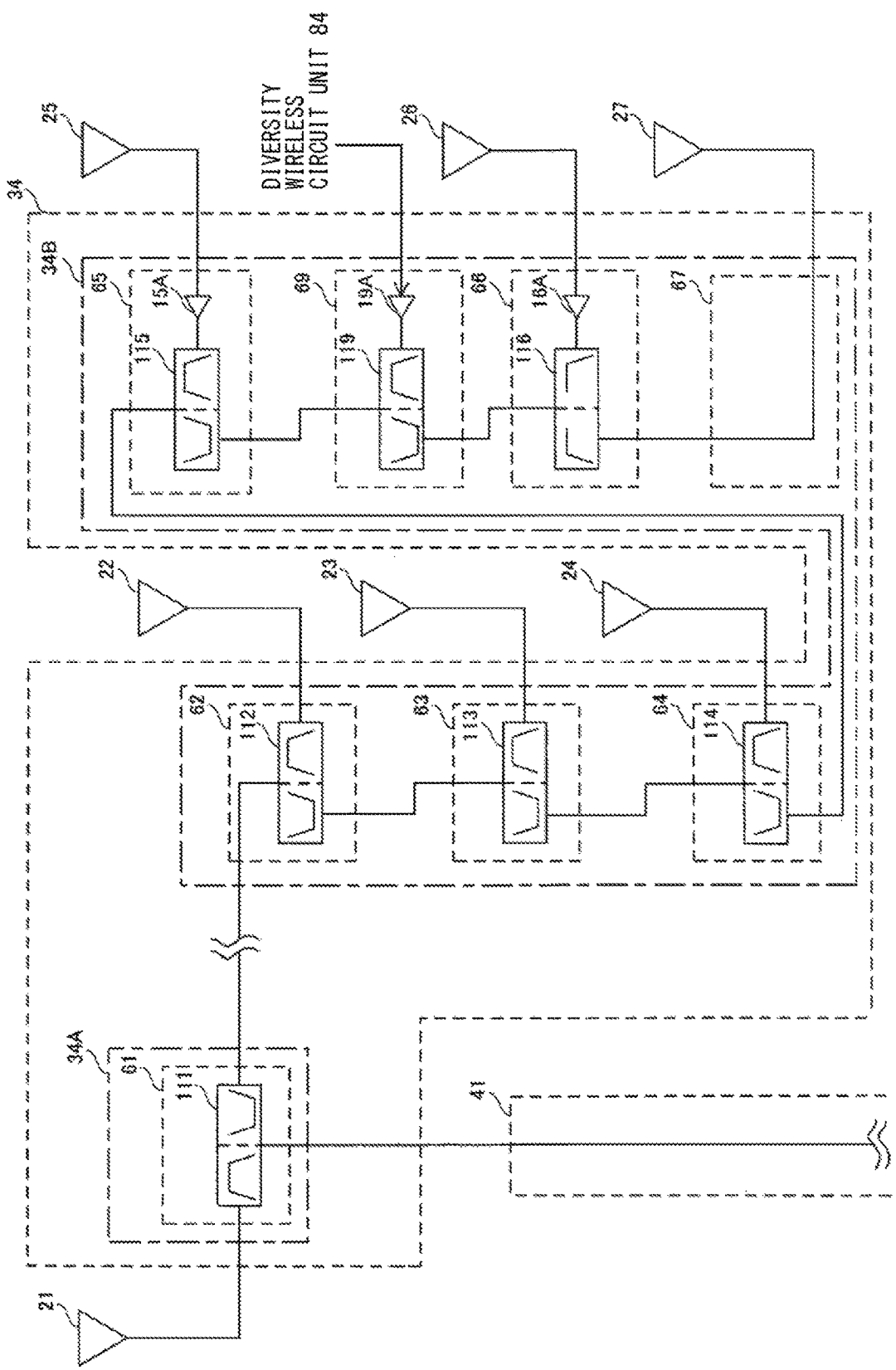
FIG. 15 shows an example of the configuration of an antenna-side circuit unit in Modification 3 of the on-vehicle transmission system according to the first embodiment of the present invention.

FIG. 15 shows an example of the configuration of the antenna-side circuit unit in Modification 3 of the on-vehicle transmission system according to the first embodiment of the present invention.

With reference to FIG. 15, as compared to the antenna-side circuit unit 31 in FIG. 2, the antenna-side circuit unit 34 further includes a wireless circuit 69.

The wireless circuit 69 is connected between the wireless circuit 65 and the wireless circuit 66. The wireless circuit 69 includes a diplexer 119 and an LNA 19A.

The LNA 19A is connected between the diversity wireless circuit unit 84 and the diplexer 119.

The diplexer 119 in the wireless circuit 69 outputs a signal received from the diversity wireless circuit unit 84, to the wireless circuit 65. In addition, the diplexer 119 outputs a radio signal received from the wireless circuit 66, to the wireless circuit 65. The diplexer 119 combines the signal received from the diversity wireless circuit unit 84 and the radio signal received from the wireless circuit 66, and outputs the resultant radio signal to the wireless circuit 65.

Meanwhile, the diplexer 119 outputs a radio signal including frequency components other than a frequency component in the signal band including 470 MHz to 710 MHz corresponding to television broadcasting, in the radio signal received from the wireless circuit 65, to the wireless circuit 66.

Figure 16:
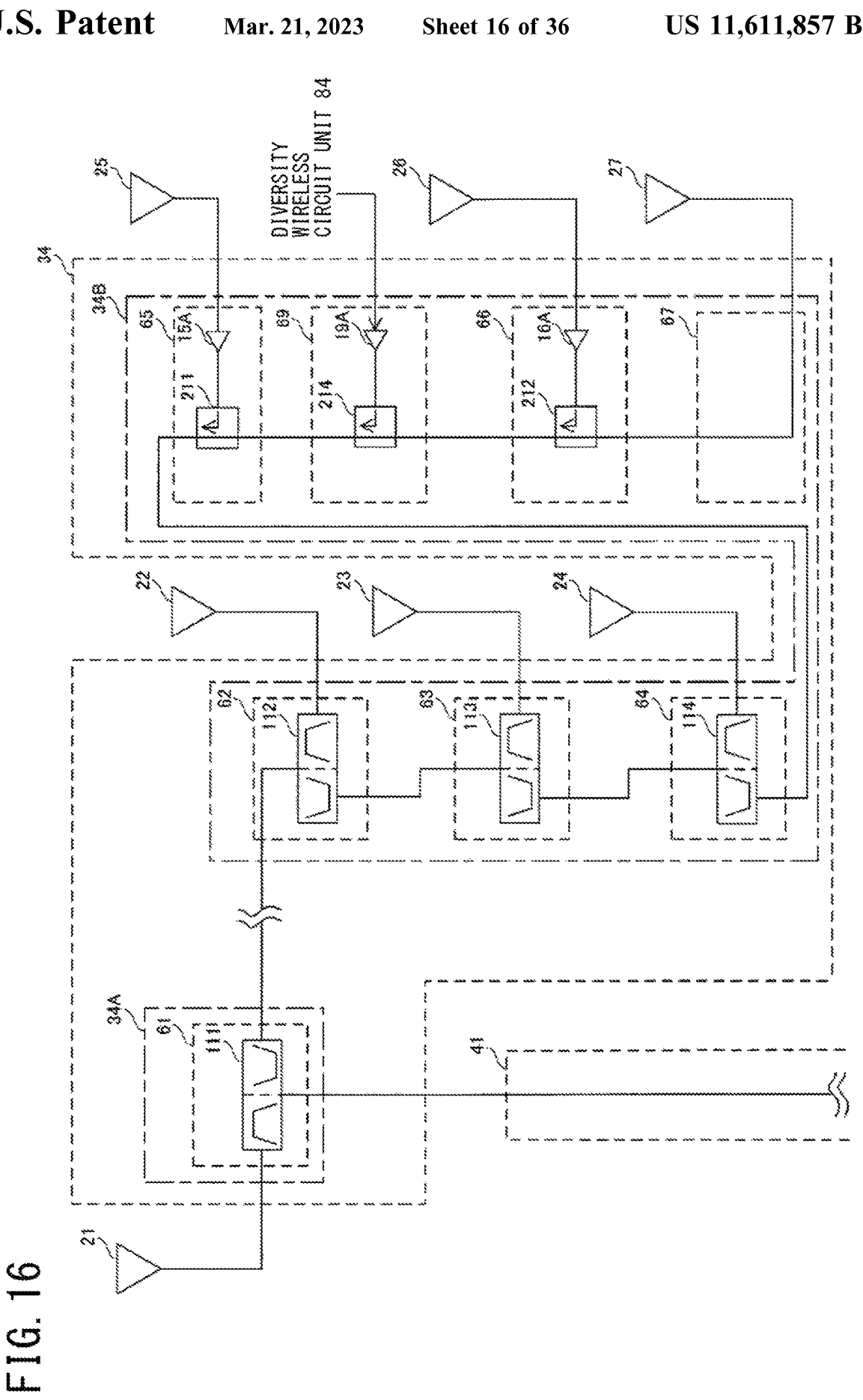
FIG. 16 shows another example of the configuration of the antenna-side circuit unit in Modification 3 of the on-vehicle transmission system according to the first embodiment of the present invention.

FIG. 16 shows another example of the configuration of the antenna-side circuit unit in Modification 3 of the on-vehicle transmission system according to the first embodiment of the present invention.

With reference to FIG. 16, as compared to the antenna-side circuit unit 31 in FIG. 4, the antenna-side circuit unit 34 further includes a wireless circuit 69 including a directional coupling circuit 214.

The directional coupling circuit 214 in the wireless circuit 69 receives a radio signal received at the antenna 28A and corresponding to television broadcasting, and outputs the received radio signal to the wireless circuit 65.

In addition, the directional coupling circuit 214 outputs a radio signal received from the wireless circuit 66, to the wireless circuit 65. The directional coupling circuit 214 combines the radio signal received at the antenna 28A and corresponding to television broadcasting and the radio signal received from the wireless circuit 66, and outputs the resultant radio signal to the wireless circuit 65.

Figure 17:
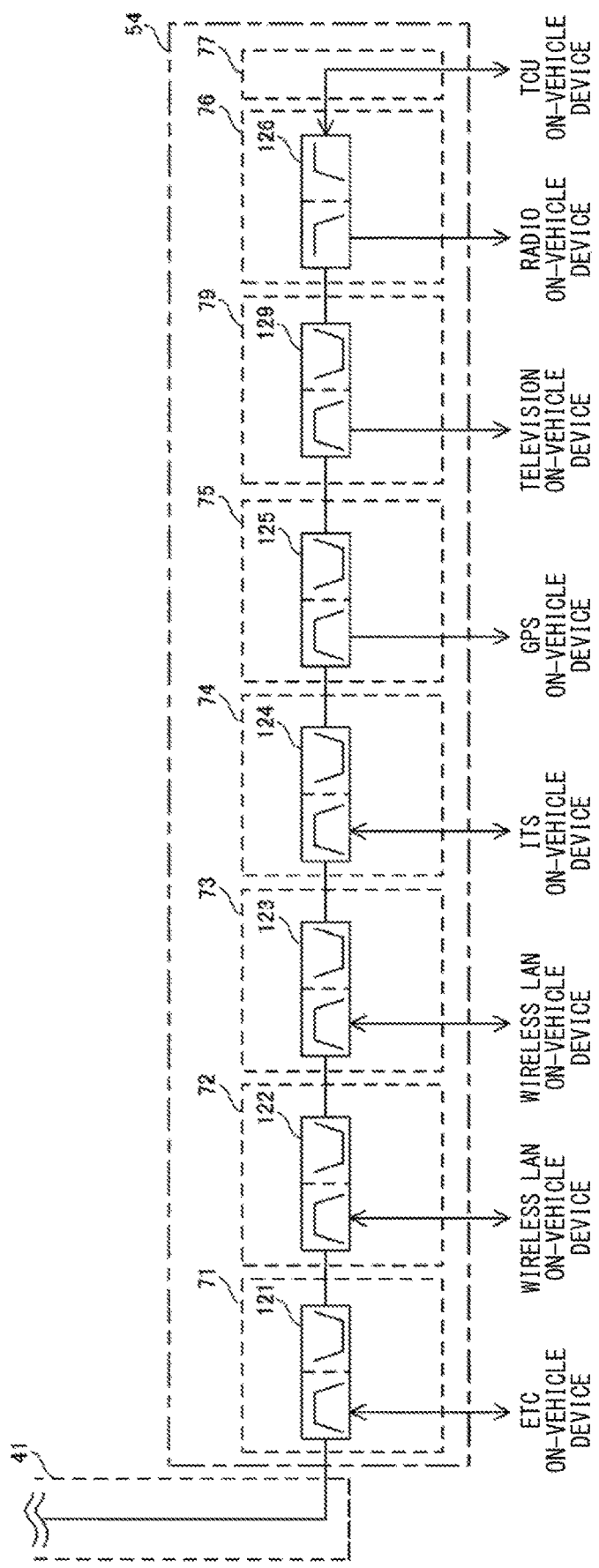
FIG. 17 shows an example of the configuration of an on-vehicle-device-side circuit unit in Modification 3 of the on-vehicle transmission system according to the first embodiment of the present invention.

FIG. 17 shows an example of the configuration of the on-vehicle-device-side circuit unit in Modification 3 of the on-vehicle transmission system according to the first embodiment of the present invention.

With reference to FIG. 17, as compared to the on-vehicle-device-side circuit unit 51 in FIG. 6, the on-vehicle-device-side circuit unit 53 further includes a wireless circuit 79.

The wireless circuit 79 is connected between the wireless circuit 75 and the wireless circuit 76. The wireless circuit 79 includes a diplexer 129.

The diplexer 129 in the wireless circuit 79 receives a radio signal obtained by combining a plurality of frequency components, from the wireless circuit 75, and separates a frequency component in the signal band including 470 MHz to 710 MHz that is a radio signal corresponding to television broadcasting. The diplexer 129 outputs the separated radio signal including the frequency component in the signal band including 470 MHz to 710 MHz, for example, to the television on-vehicle device. The diplexer 129 outputs a radio signal including frequency components other than the frequency component in the signal band including 470 MHz to 710 MHz, in the radio signal received from the wireless circuit 75, to the wireless circuit 76.

Figure 18:
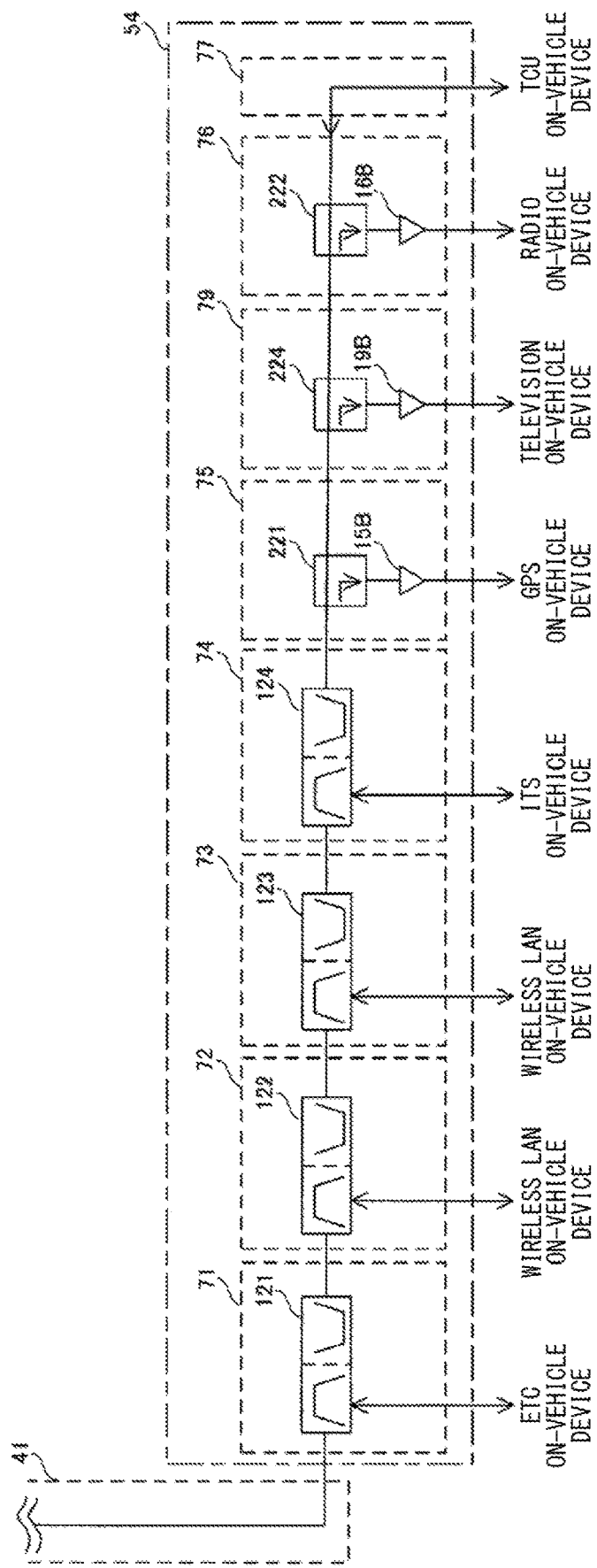
FIG. 18 shows another example of the configuration of the on-vehicle-device-side circuit unit in Modification 3 of the on-vehicle transmission system according to the first embodiment of the present invention.

FIG. 18 shows another example of the configuration of the on-vehicle-device-side circuit unit in Modification 3 of the on-vehicle transmission system according to the first embodiment of the present invention.

With reference to FIG. 18, as compared to the on-vehicle-device-side circuit unit 51 in FIG. 7, the on-vehicle-device-side circuit unit 54 further includes a wireless circuit 79 including a directional coupling circuit 224 and an LNA 19B.

The LNA 19B is connected between the directional coupling circuit 224 and the television on-vehicle device.

The directional coupling circuit 224 in the wireless circuit 79 receives a radio signal obtained by combining a plurality of frequency components, from the wireless circuit 75, and separates a frequency component in the signal band including 470 MHz to 710 MHz that is a radio signal corresponding to television broadcasting.

In addition, the directional coupling circuit 224 outputs the separated radio signal including the frequency component in the signal band including 470 MHz to 710 MHz, for example, to the television on-vehicle device. The directional coupling circuit 224 outputs a radio signal including frequency components other than the frequency component in the signal band including 470 MHz to 710 MHz, in the radio signal received from the wireless circuit 75, to the wireless circuit 76.

Regarding the on-vehicle transmission system according to the first embodiment of the present invention, the on-vehicle transmission system 104 is configured to perform reception diversity using the diversity wireless circuit unit 84, the wireless circuit 69, the wireless circuit 79, and the antennas 28A, 28B, 28C, and 28D, but is not limited thereto. The on-vehicle transmission system 104 may be configured to perform transmission diversity.

More specifically, for example, the wireless circuit 79 is a wireless transmission/reception circuit, and outputs a radio signal received from the on-vehicle device, to the wireless circuit 75. The wireless circuit 79 outputs a radio signal received from the wireless circuit 76, to the wireless circuit 75. The wireless circuit 79 combines the radio signal received from the on-vehicle device and the radio signal received from the wireless circuit 76, and outputs the resultant radio signal to the wireless circuit 75.

The wireless circuit 69 is a wireless transmission/reception circuit, separates, for example, a frequency component in the signal band of the radio signal transmitted from the on-vehicle device, from a radio signal received from the wireless circuit 65, and outputs the separated radio signal to the diversity wireless circuit unit 84. The wireless circuit 69 outputs a radio signal including frequency components outside the signal band of the radio signal transmitted from the on-vehicle device, in the radio signal received from the wireless circuit 65, to the wireless circuit 66.

The diversity wireless circuit unit 84 generates a plurality of radio signals from a radio signal received from the wireless circuit 69, and transmits the plurality of generated radio signals via the antennas 28A, 28B, 28C, and 28D.

[Modification 4]

Figure 19:
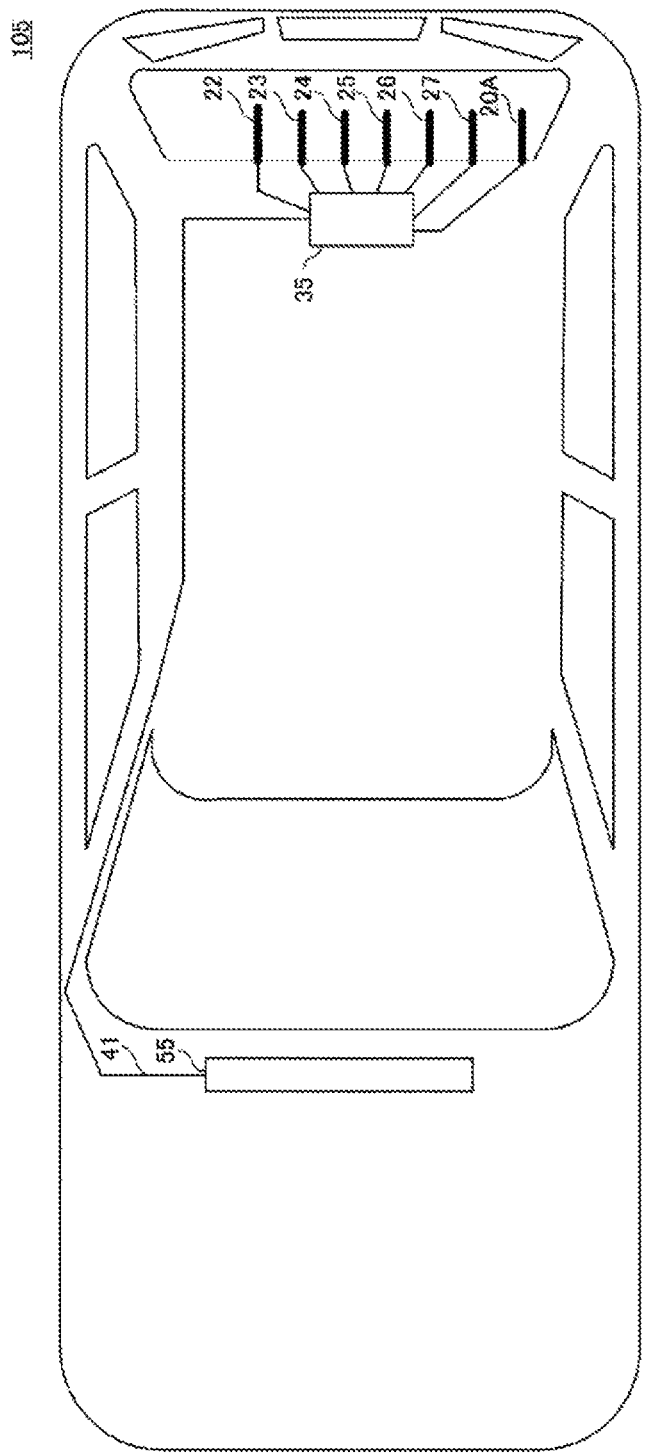
FIG. 19 shows the configuration of Modification 4 of the on-vehicle transmission system according to the first embodiment of the present invention.

FIG. 19 shows the configuration of Modification 4 of the on-vehicle transmission system according to the first embodiment of the present invention. FIG. 19 shows an on-vehicle transmission system compatible with communication services outside Japan.

With reference to FIG. 19, an on-vehicle transmission system 105 includes antennas 22 to 27 and 20A, an antenna-side circuit unit 35, a path part 41, and an on-vehicle-device-side circuit unit 55. Hereinafter, each of the antennas 22 to 27 and 20A is also referred to as an antenna 20.

The antenna-side circuit unit 35 is installed, for example, in the space between the sheet metal and the lining in the rear part of the roof of the vehicle.

The antenna-side circuit unit 35 combines radio signals in different communication services, that is, radio signals in frequency bands different from each other, that are received via the antennas 20, and outputs the resultant radio signal to the path part 41.

The path part 41 is, for example, an antenna cable, and transmits the radio signal resulting from the combination and received from the antenna-side circuit unit 35, to the on-vehicle-device-side circuit unit 55.

The on-vehicle-device-side circuit unit 55 splits the radio signal resulting from the combination and received from the path part 41, separates the resultant radio signals for the respective communication services, and outputs a plurality of separated radio signals to a plurality of on-vehicle devices that are not shown, respectively.

Moreover, the on-vehicle-device-side circuit unit 55 receives radio signals transmitted from the respective on-vehicle devices, combines the received radio signals, and outputs the resultant radio signal to the path part 41.

The path part 41 transmits the radio signal resulting from the combination and received from the on-vehicle-device-side circuit unit 55, to the antenna-side circuit unit 35.

The antenna-side circuit unit 35 splits the radio signal resulting from the combination and received from the path part 41, separates the resultant radio signals for the respective communication services, and transmits the separated radio signals via the corresponding antennas 20.

Figure 20:
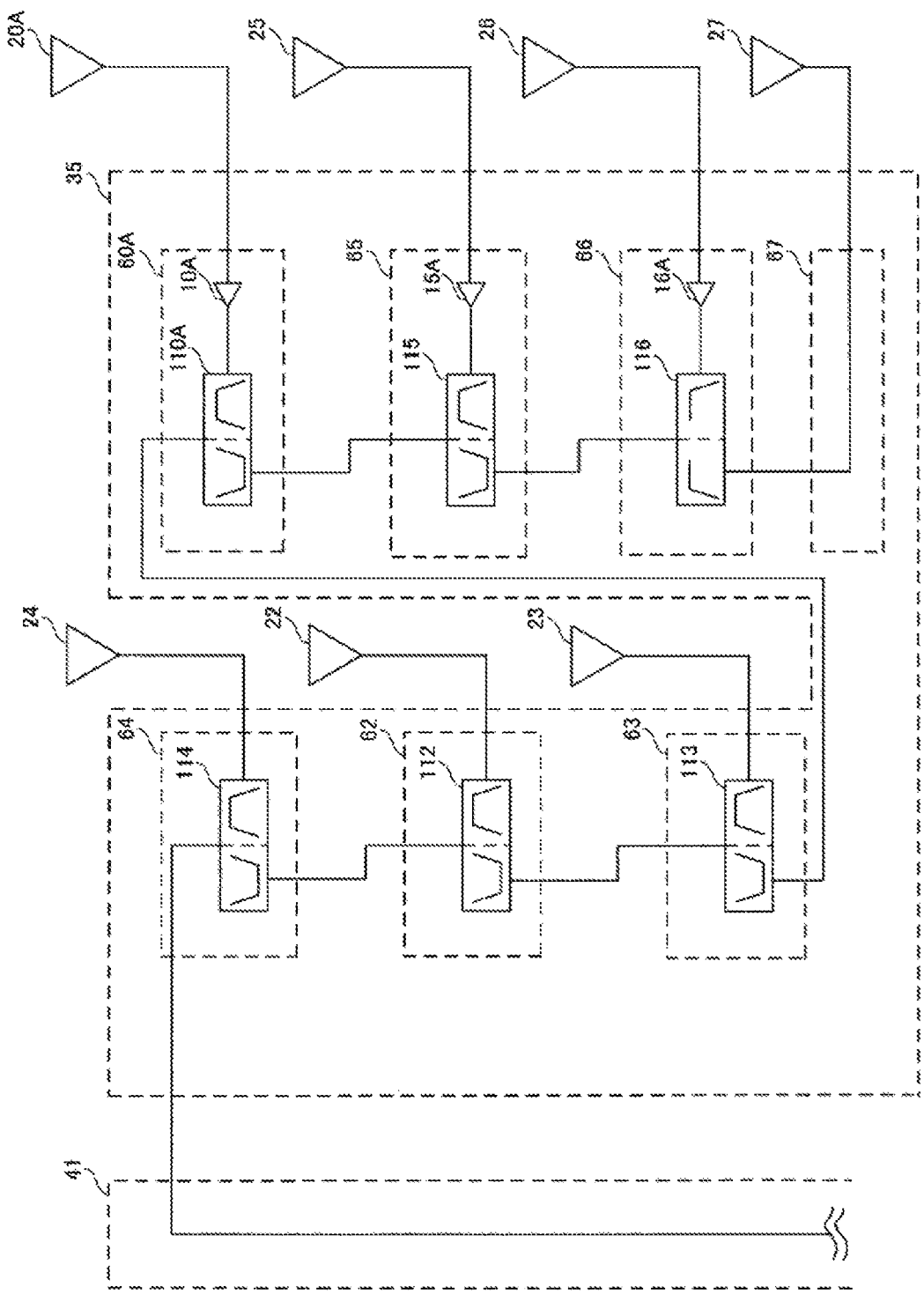
FIG. 20 shows an example of the configuration of an antenna-side circuit unit in Modification 4 of the on-vehicle transmission system according to the first embodiment of the present invention.

FIG. 20 shows an example of the configuration of the antenna-side circuit unit in Modification 4 of the on-vehicle transmission system according to the first embodiment of the present invention.

With reference to FIG. 20, the antenna-side circuit unit 35 includes wireless circuits 62 to 67 and 60A. The wireless circuits 62 to 67 and 60A are connected in series and receive radio signals in frequency bands different from each other. Hereinafter, each of the wireless circuits 62 to 67 and 60A is also referred to as a wireless circuit 60.

In the antenna-side circuit unit 35, each wireless circuit 60 is connected according to an order determined for each wireless circuit 60.

Figure 21:
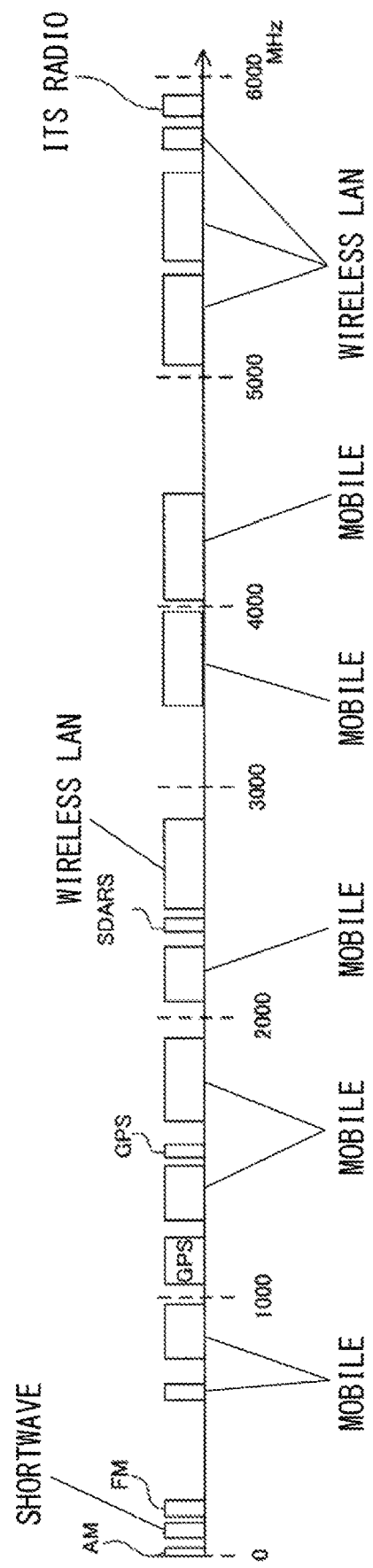
FIG. 21 shows an example of assignment of frequency bands of radio waves outside Japan.

FIG. 21 shows an example of assignment of frequency bands of radio waves outside Japan.

With reference to FIG. 21, for example, AM radio is assigned 540 kHz to 1580 kHz; shortwave radio is assigned 5.985 MHz to 21.610 MHz; FM radio is assigned 88.1 MHz to 107.9 MHz; GPS is assigned 1176.45 MHz, 1227.60 MHz, and 1563.4 MHz to 1578.4 MHz; SDARS (Satellite Digital Audio Radio Service) is assigned 2320 MHz to 2345 MHz; wireless LAN of 2.4 GHz band is assigned 2400 MHz to 2483.5 MHz; wireless LAN of 5 GHz band is assigned 5150 MHz to 5835 MHz; and ITS radio is assigned 5860 MHz to 5920 MHz.

In addition, the frequency bands assigned to mobile communication such as 3G and LTE are 718 MHz to 748 MHz, 815 MHz to 845 MHz, 860 MHz to 890 MHz, 900 MHz to 915 MHz, 945 MHz to 960 MHz, 1427.9 MHz to 1462.9 MHz, 1475.9 MHz to 1510.9 MHz, 1749.9 MHz to 1784.9 MHz, 1844.9 MHz to 1879.9 MHz, 1920 MHz to 1980 MHz, 2110 MHz to 2170 MHz, and 3600 MHz to 4380 MHz. That is, in mobile communication, the frequency bands are arranged on the frequency axis so as to be spaced apart from each other, that is, are arranged discretely on the frequency axis.

In the antenna-side circuit unit 35, the wireless circuit 67 compatible with mobile communication is capable of transmitting and receiving radio signals in a plurality of frequency bands, is connected at an end farthest from the path part 41, that is, at the rearmost position, and is located at the rearmost stage among the respective wireless circuits 60, that is, at the rearmost part.

In the antenna-side circuit unit 35, the wireless circuits 62 to 64 are wireless transmission/reception circuits, are connected at an end nearest to the path part 41, that is, at the foremost position, and are located at the foremost stage among the respective wireless circuits 60, that is, at the foremost part.

In the antenna-side circuit unit 35, the wireless circuit 60 compatible with a radio signal in a higher frequency band is connected at a side closer to the path part 41.

Specifically, the wireless circuit 64 is a wireless transmission/reception circuit compatible with ITS, which is a service using a radio signal having a highest frequency, in the on-vehicle transmission system 105, and is connected at the end nearest to the path part 41.

The wireless circuit 62 which is a wireless transmission/reception circuit compatible with wireless LAN of 5 GHz band is connected to the wireless circuit 64, the wireless circuit 63 compatible with wireless LAN of 2.4 GHz band is connected to the wireless circuit 62.

In the antenna-side circuit unit 35, the wireless circuits 65, 66, and 60A which are wireless reception circuits are connected between the wireless circuit 63 and the wireless circuit 67.

The wireless circuit 65 is compatible with GPS, the wireless circuit 66 is compatible with AM/FM radio, and the wireless circuit 60A is compatible with SDARS.

Among the wireless circuits 65, 66, and 60A, the wireless circuit 60A which receives a radio signal having a highest frequency is connected at a side closer to the path part 41, that is, connected to the wireless circuit 63.

The wireless circuit 65 compatible with GPS using the next highest frequency band is connected to the wireless circuit 60A, and the wireless circuit 66 compatible with AM/FM radio using the lowest frequency band is connected to the wireless circuit 65.

In the antenna-side circuit unit 35, the wireless circuits 62 to 66 and 60A include diplexers 112 to 116 and 110A, respectively.

The diplexer 114 in the wireless circuit 64 receives a radio signal received at the antenna 24 and corresponding to ITS radio, and outputs the received radio signal to the path part 41. In addition, the diplexer 114 outputs a radio signal received from the wireless circuit 62, to the path part 41. The diplexer 114 combines the radio signal received at the antenna 24 and corresponding to ITS radio and the radio signal received from the wireless circuit 62, and outputs the resultant radio signal to the path part 41.

Meanwhile, the diplexer 114 separates a frequency component in a signal band including 5.9 GHz that is a radio signal corresponding to ITS radio, from a radio signal received from the path part 41. The diplexer 114 outputs the separated radio signal including the frequency component in the signal band including 5.9 GHz, to the antenna 24. The diplexer 114 outputs a radio signal including frequency components outside the signal band including 5.9 GHz, in the radio signal received from the path part 41, to the wireless circuit 62.

The diplexer 112 in the wireless circuit 62 receives a radio signal received at the antenna 22 and corresponding to wireless LAN of 5 GHz band, and outputs the received radio signal to the wireless circuit 64. In addition, the diplexer 112 outputs a radio signal received from the wireless circuit 63, to the wireless circuit 64. The diplexer 112 combines the radio signal received at the antenna 22 and corresponding to wireless LAN of 5 GHz band and the radio signal received from the wireless circuit 63, and outputs the resultant radio signal to the wireless circuit 64.

Meanwhile, the diplexer 112 separates a frequency component in a signal band including 5.2 GHz to 5.6 GHz that is a radio signal corresponding to wireless LAN of 5 GHz band, from a radio signal received from the wireless circuit 64. The diplexer 112 outputs the separated radio signal including the frequency component in the signal band including 5.2 GHz to 5.6 GHz, to the antenna 22. The diplexer 112 outputs a radio signal including frequency components outside the signal band including 5.2 GHz to 5.6 GHz, in the radio signal received from the wireless circuit 64, to the wireless circuit 63.

The diplexer 113 in the wireless circuit 63 receives a radio signal received at the antenna 23 and corresponding to wireless LAN of 2.4 GHz band, and outputs the received radio signal to the wireless circuit 62. In addition, the diplexer 113 outputs a radio signal received from the wireless circuit 60A, to the wireless circuit 62. The diplexer 113 combines the radio signal received at the antenna 23 and corresponding to wireless LAN of 2.4 GHz band and the radio signal received from the wireless circuit 60A, and outputs the resultant radio signal to the wireless circuit 62.

Meanwhile, the diplexer 113 separates a frequency component in a signal band including 2.4 GHz that is a radio signal corresponding to wireless LAN of 2.4 GHz band, from a radio signal received from the wireless circuit 62. The diplexer 113 outputs the separated radio signal including the frequency component in the signal band including 2.4 GHz, to the antenna 23. The diplexer 113 outputs a radio signal including frequency components outside the signal band including 2.4 GHz, in the radio signal received from the wireless circuit 62, to the wireless circuit 60A.

The diplexer 110A in the wireless circuit 60A receives a radio signal received at the antenna 20A and corresponding to SDARS, and outputs the received radio signal to the wireless circuit 63. In addition, the diplexer 110A outputs a radio signal received from the wireless circuit 65, to the wireless circuit 63. The diplexer 110A combines the radio signal received at the antenna 20A and corresponding to SDARS and the radio signal received from the wireless circuit 65, and outputs the resultant radio signal to the wireless circuit 63.

Meanwhile, the diplexer 110A outputs a radio signal including frequency components other than a frequency component in a signal band including 2.3 GHz corresponding to SDARS, in the radio signal received from the wireless circuit 63, to the wireless circuit 65.

The diplexer 115 in the wireless circuit 65 receives a radio signal received at the antenna 25 and corresponding to GPS, and outputs the received radio signal to the wireless circuit 60A. In addition, the diplexer 115 outputs a radio signal received from the wireless circuit 66, to the wireless circuit 60A. The diplexer 115 combines the radio signal received at the antenna 25 and corresponding to GPS and the radio signal received from the wireless circuit 66, and outputs the resultant radio signal to the wireless circuit 60A.

Meanwhile, the diplexer 115 outputs a radio signal including frequency components other than a frequency component in the signal band including 1.2 GHz to 1.5 GHz corresponding to GPS, in a radio signal received from the wireless circuit 60A, to the wireless circuit 66.

The diplexer 116 in the wireless circuit 66 receives a radio signal received at the antenna 26 and corresponding to AM/FM radio, and outputs the received radio signal to the wireless circuit 65. In addition, the diplexer 116 outputs a radio signal received from the wireless circuit 67, to the wireless circuit 65. The diplexer 116 combines the radio signal received at the antenna 26 and corresponding to AM/FM radio and the radio signal received from the wireless circuit 67, and outputs the resultant radio signal to the wireless circuit 65.

Meanwhile, the diplexer 116 in the wireless circuit 66 outputs a radio signal including frequency components other than a frequency component in or below a signal band including 120 MHz corresponding to AM/FM radio, in a radio signal received from the wireless circuit 65, to the wireless circuit 67.

The wireless circuits 65, 66, and 60A also include an LNA 15A, an LNA 16A, and an LNA 10A, respectively.

In the case where the reception power of a corresponding radio signal is low, the LNA 15A, the LNA 16A, and the LNA 10A are provided to increase a signal-to-noise ratio.

The LNA 15A is connected between the diplexer 115 and the antenna 25. The LNA 16A is connected between the diplexer 116 and the antenna 26. The LNA 10A is connected between the diplexer 110A and the antenna 20A.

The wireless circuit 67 receives a radio signal corresponding to mobile communication, via the antenna 27, and outputs the received radio signal to the wireless circuit 66.

In addition, the wireless circuit 67 transmits a radio signal received from the wireless circuit 66, via the antenna 27.

Figure 22:
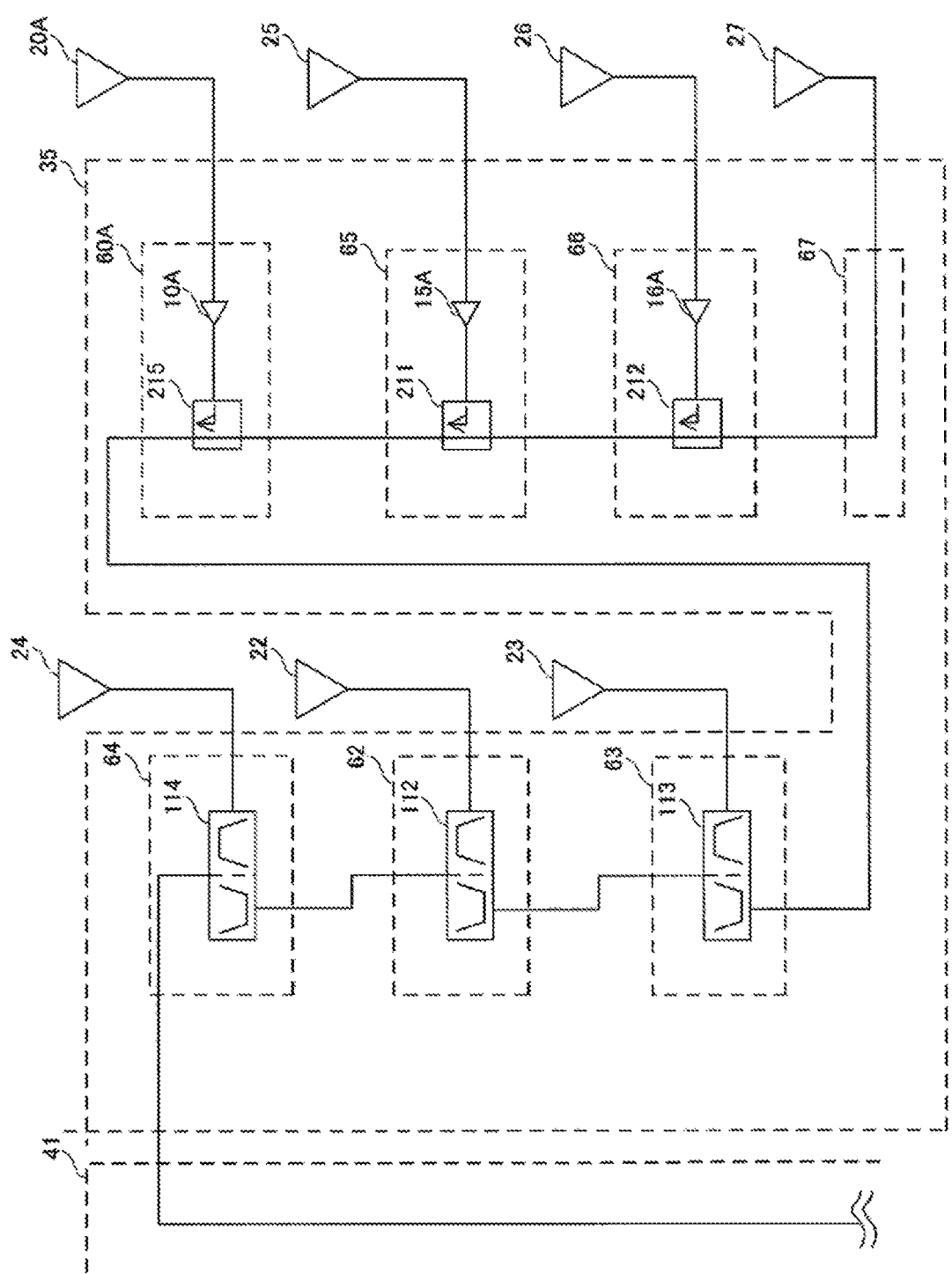
FIG. 22 shows another example of the configuration of an antenna-side circuit unit in Modification 4 of the on-vehicle transmission system according to the first embodiment of the present invention.

FIG. 22 shows another example of the configuration of the antenna-side circuit unit in Modification 4 of the on-vehicle transmission system according to the first embodiment of the present invention.

With reference to FIG. 22, as compared to the wireless circuits 65, 66, and 60A shown in FIG. 20, wireless circuits 65, 66, and 60A include a directional coupling circuit 211, a directional coupling circuit 212, and a directional coupling circuit 215 instead of the diplexer 115, the diplexer 116, and the diplexer 110A, respectively.

The directional coupling circuit 215 in the wireless circuit 60A receives a radio signal received at the antenna 20A and corresponding to SDARS, and outputs the received radio signal to the wireless circuit 63.

In addition, the directional coupling circuit 215 outputs a radio signal received from the wireless circuit 65, to the wireless circuit 63. The directional coupling circuit 215 combines the radio signal received at the antenna 20A and corresponding to SDARS and the radio signal received from the wireless circuit 65, and outputs the resultant radio signal to the wireless circuit 63.

The directional coupling circuit 211 in the wireless circuit 65 receives a radio signal received at the antenna 25 and corresponding to GPS, and outputs the received radio signal to the wireless circuit 60A.

In addition, the directional coupling circuit 211 outputs a radio signal received from the wireless circuit 66, to the wireless circuit 60A. The directional coupling circuit 211 combines the radio signal received at the antenna 25 and corresponding to GPS and the radio signal received from the wireless circuit 66, and outputs the resultant radio signal to the wireless circuit 60A.

The directional coupling circuit 212 in the wireless circuit 66 receives a radio signal received at the antenna 26 and corresponding to AM/FM radio, and outputs the received radio signal to the wireless circuit 65.

In addition, the directional coupling circuit 212 outputs a radio signal received from the wireless circuit 67, to the wireless circuit 65. The directional coupling circuit 212 combines the radio signal received at the antenna 26 and corresponding to AM/FM radio and the radio signal received from the wireless circuit 67, and outputs the resultant radio signal to the wireless circuit 65.

Figure 23:
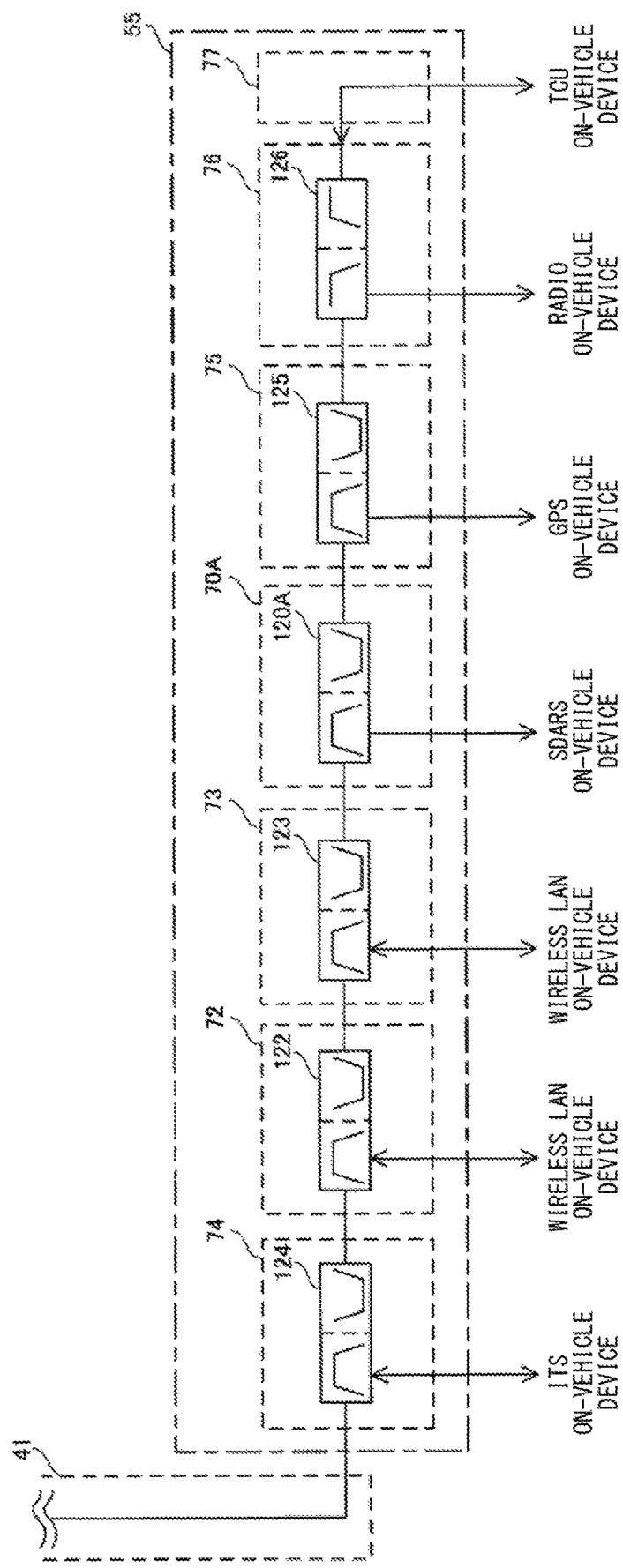
FIG. 23 shows an example of the configuration of an on-vehicle-device-side circuit unit in Modification 4 of the on-vehicle transmission system according to the first embodiment of the present invention.

FIG. 23 shows an example of the configuration of the on-vehicle-device-side circuit unit in Modification 4 of the on-vehicle transmission system according to the first embodiment of the present invention.

With reference to FIG. 23, the on-vehicle-device-side circuit unit 55 includes wireless circuits 72 to 77 and 70A. The wireless circuits 72 to 77 are connected in series and receive radio signals in frequency bands different from each other. Hereinafter, each of the wireless circuits 72 to 77 and 70A is also referred to as a wireless circuit 70.

Each wireless circuit 70 is connected to an on-vehicle device that is not shown and that is capable of providing a service using a radio signal in a corresponding frequency band. For example, the wireless circuit 72 and the wireless circuit 73 are connected to on-vehicle devices compatible with wireless LAN (hereinafter, also referred to as wireless LAN on-vehicle devices); the wireless circuit 74 is connected to an on-vehicle device compatible with ITS (hereinafter, also referred to as an ITS on-vehicle device); the wireless circuit 75 is connected to an on-vehicle device compatible with GPS such as a car navigation device (hereinafter, also referred to as a GPS on-vehicle device); the wireless circuit 76 is connected to an on-vehicle device compatible with AM/FM radio such as a radio tuner (hereinafter, also referred to as a radio on-vehicle device); the wireless circuit 77 is connected to an on-vehicle device compatible with TCU (Telematics Communication Unit) using mobile communication (hereinafter, also referred to as a TCU on-vehicle device); and the wireless circuit 70A is connected to an on-vehicle device compatible with SDARS (hereinafter, also referred to as an SDARS on-vehicle device).

In the on-vehicle-device-side circuit unit 55, each wireless circuit 70 is connected according to an order determined for each wireless circuit 70.

In the on-vehicle-device-side circuit unit 55, the wireless circuit 77 compatible with mobile communication is capable of transmitting and receiving radio signals in a plurality of frequency bands, is connected at an end farthest from the path part 41, that is, at the rearmost position, and is located at the rearmost stage among the respective wireless circuits 70, that is, at the rearmost part.

In the on-vehicle-device-side circuit unit 55, the wireless circuits 72 to 74 are wireless transmission/reception circuits, are connected at an end nearest to the path part 41, that is, at the foremost position, and are located at the foremost stage among the respective wireless circuits 70, that is, at the foremost part.

In the on-vehicle-device-side circuit unit 55, the wireless circuit 70 compatible with a radio signal in a higher frequency band is connected at a side closer to the path part 41.

Specifically, the wireless circuit 74 is a wireless transmission/reception circuit compatible with ITS, which is a service using a radio signal having a highest frequency, in the on-vehicle transmission system 105, and is connected at the end nearest to the path part 41.

The wireless circuit 72 which is a wireless transmission/reception circuit compatible with wireless LAN of 5 GHz band is connected to the wireless circuit 74, and the wireless circuit 73 compatible with wireless LAN of 2.4 GHz band is connected to the wireless circuit 72.

In the on-vehicle-device-side circuit unit 55, the wireless circuits 75, 76, and 70A which are wireless reception circuits are connected between the wireless circuit 73 and the wireless circuit 77.

The wireless circuit 75 is compatible with GPS, the wireless circuit 76 is compatible with AM/FM radio, and the wireless circuit 70A is compatible with SDARS.

Among the wireless circuits 75, 76, and 70A, the wireless circuit 70A which receives a radio signal having a highest frequency is connected at a side closer to the path part 41, that is, connected to the wireless circuit 73.

The wireless circuit 75 compatible with GPS using the next highest frequency band is connected to the wireless circuit 70A, and the wireless circuit 76 compatible with AM/FM radio using the lowest frequency band is connected to the wireless circuit 75.

In the on-vehicle-device-side circuit unit 55, the wireless circuits 72 to 76 and 70A include diplexers 122 to 126 and 120A, respectively.

The on-vehicle-device-side circuit unit 55 splits a radio signal received from the path part 41 and provides the resultant radio signals to the respective wireless circuits 70.

More specifically, the diplexer 124 in the wireless circuit 74 receives a radio signal obtained by combining a plurality of frequency components, from the path part 41, and separates a frequency component in the signal band including 5.9 GHz that is a radio signal corresponding to ITS radio. The diplexer 124 outputs the separated radio signal including the frequency component in the signal band including 5.9 GHz, to the ITS on-vehicle device. The diplexer 124 outputs a radio signal including frequency components other than the frequency component in the signal band including 5.9 GHz, in the radio signal received from the path part 41, to the wireless circuit 72.

Meanwhile, the diplexer 124 outputs a radio signal received from the ITS on-vehicle device, to the path part 41. The diplexer 124 outputs a radio signal received from the wireless circuit 72, to the path part 41. The diplexer 124 combines the radio signal received from the ITS on-vehicle device and the radio signal received from the wireless circuit 72, and outputs the resultant radio signal to the path part 41.

The diplexer 122 in the wireless circuit 72 receives a radio signal obtained by combining a plurality of frequency components, from the wireless circuit 74, and separates a frequency component in the signal band including 5.2 GHz to 5.6 GHz that is a radio signal corresponding to wireless LAN of 5 GHz band. The diplexer 122 outputs the separated radio signal including the frequency component in the signal band including 5.2 GHz to 5.6 GHz, to the wireless LAN on-vehicle device. The diplexer 122 outputs a radio signal including frequency components other than the frequency component in the signal band including 5.2 GHz to 5.6 GHz, in the radio signal received from the wireless circuit 74, to the wireless circuit 73.

Meanwhile, the diplexer 122 outputs a radio signal received from the wireless LAN on-vehicle device, to the wireless circuit 74. The diplexer 122 outputs a radio signal received from the wireless circuit 73, to the wireless circuit 74. The diplexer 122 combines the radio signal received from the wireless LAN on-vehicle device and the radio signal received from the wireless circuit 73, and outputs the resultant radio signal to the wireless circuit 74.

The diplexer 123 in the wireless circuit 73 receives a radio signal obtained by combining a plurality of frequency components, from the wireless circuit 72, and separates a frequency component in the signal band including 2.4 GHz that is a radio signal corresponding to wireless LAN of 2.4 GHz band. The diplexer 123 outputs the separated radio signal including the frequency component in the signal band including 2.4 GHz, to the wireless LAN on-vehicle device. The diplexer 123 outputs a radio signal including frequency components other than the frequency component in the signal band including 2.4 GHz, in the radio signal received from the wireless circuit 72, to the wireless circuit 70A.

Meanwhile, the diplexer 123 outputs a radio signal received from the wireless LAN on-vehicle device, to the wireless circuit 72. The diplexer 123 outputs a radio signal received from the wireless circuit 70A, to the wireless circuit 72. The diplexer 123 combines the radio signal received from the wireless LAN on-vehicle device and the radio signal received from the wireless circuit 70A, and outputs the resultant radio signal to the wireless circuit 72.

The diplexer 120A in the wireless circuit 70A receives a radio signal obtained by combining a plurality of frequency components, from the wireless circuit 73, and separates a frequency component in the signal band including 2.3 GHz that is an SDARS radio signal. The diplexer 120A outputs the separated radio signal including the frequency component in the signal band including 2.3 GHz, to the SDARS on-vehicle device. The diplexer 120A outputs a radio signal including frequency components other than the frequency component in the signal band including 2.3 GHz, in the radio signal received from the wireless circuit 73, to the wireless circuit 75.

The diplexer 125 in the wireless circuit 75 receives a radio signal obtained by combining a plurality of frequency components, from the wireless circuit 70A, and separates a frequency component in the signal band including 1.2 GHz to 1.5 GHz that is a radio signal corresponding to GPS. The diplexer 125 outputs the separated radio signal including the frequency component in the signal band including 1.2 GHz to 1.5 GHz, to the GPS on-vehicle device. The diplexer 125 outputs a radio signal including frequency components other than the frequency component in the signal band including 1.2 GHz to 1.5 GHz, in the radio signal received from the wireless circuit 70A, to the wireless circuit 76.

The diplexer 126 in the wireless circuit 76 receives a radio signal obtained by combining a plurality of frequency components, from the wireless circuit 75, and separates a frequency component in or below the signal band including 120 MHz that is a radio signal corresponding to AM/FM radio. The diplexer 126 outputs the separated radio signal including the frequency component in or below the signal band including 120 MHz, to the radio on-vehicle device. The diplexer 126 outputs a radio signal including frequency components other than the frequency component in or below the signal band including 120 MHz, in the radio signal received from the wireless circuit 75, to the wireless circuit 77.

The wireless circuit 77 receives a radio signal including a frequency component corresponding to mobile communication, from the TCU on-vehicle device, and outputs the received radio signal to the wireless circuit 76.

In addition, the wireless circuit 77 outputs a radio signal received from the wireless circuit 76, to the TCU on-vehicle device.

Figure 24:
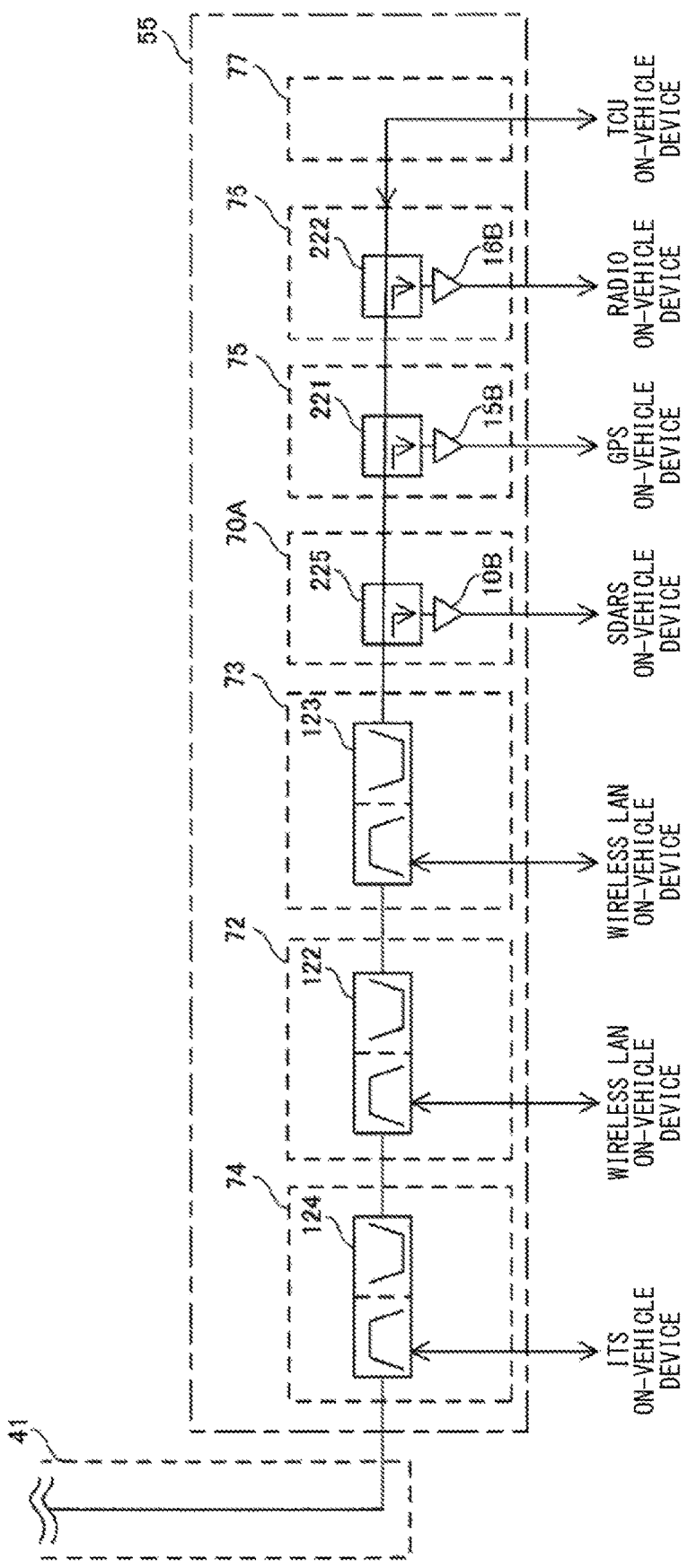
FIG. 24 shows another example of the configuration of the on-vehicle-device-side circuit unit in Modification 4 of the on-vehicle transmission system according to the first embodiment of the present invention.

FIG. 24 shows another example of the configuration of the on-vehicle-device-side circuit unit in Modification 4 of the on-vehicle transmission system according to the first embodiment of the present invention.

With reference to FIG. 24, as compared to the wireless circuit 70A shown in FIG. 23, a wireless circuit 70A includes a directional coupling circuit 225 instead of the diplexer 120A, and includes an LNA 10B. The LNA 10B is connected between the directional coupling circuit 225 and the SDARS on-vehicle device.

As compared to the wireless circuit 75 shown in FIG. 23, a wireless circuit 75 includes a directional coupling circuit 221 instead of the diplexer 125, and includes an LNA 15B. The LNA 15B is connected between the directional coupling circuit 221 and the GPS on-vehicle device.

As compared to the wireless circuit 76 shown in FIG. 23, a wireless circuit 76 includes a directional coupling circuit 222 instead of the diplexer 126, and includes an LNA 16B. The LNA 16B is connected between the directional coupling circuit 222 and the radio on-vehicle device.

The directional coupling circuit 225 in the wireless circuit 70A receives a radio signal obtained by combining a plurality of frequency components, from the wireless circuit 73, and separates a frequency component in the signal band including 2.3 GHz that is a radio signal corresponding to SDARS.

In addition, the directional coupling circuit 225 outputs the separated radio signal including the frequency component in the signal band including 2.3 GHz, to the SDARS on-vehicle device. The directional coupling circuit 225 outputs a radio signal including frequency components other than the frequency component in the signal band including 2.3 GHz, in the radio signal received from the wireless circuit 73, to the wireless circuit 75.

The directional coupling circuit 221 in the wireless circuit 75 receives a radio signal obtained by combining a plurality of frequency components, from the wireless circuit 70A, and separates a frequency component in the signal band including 1.2 GHz to 1.5 GHz that is a radio signal corresponding to GPS.

In addition, the directional coupling circuit 221 outputs the separated radio signal including the frequency component in the signal band including 1.2 GHz to 1.5 GHz, to the GPS on-vehicle device. The directional coupling circuit 221 outputs a radio signal including frequency components other than the frequency component in the signal band including 1.2 GHz to 1.5 GHz, in the radio signal received from the wireless circuit 70A, to the wireless circuit 76.

The directional coupling circuit 222 in the wireless circuit 76 receives a radio signal obtained by combining a plurality of frequency components, from the wireless circuit 75, and separates a frequency component in or below the signal band including 120 MHz that is a radio signal corresponding to AM/FM radio.

In addition, the directional coupling circuit 222 outputs the separated radio signal including the frequency component in or below the signal band including 120 MHz, to the radio on-vehicle device. The directional coupling circuit 222 outputs a radio signal including frequency components other than the frequency component in or below the signal band including 120 MHz, in the radio signal received from the wireless circuit 75, to the wireless circuit 77.

The on-vehicle transmission system according to the first embodiment of the present invention is configured to include the antenna-side circuit unit and the on-vehicle-device-side circuit unit, but is not limited thereto. The on-vehicle transmission system 101 may be configured to include either one of the antenna-side circuit unit and the on-vehicle-device-side circuit unit. In this case, the path part 41 may form a part of a path between the antenna-side circuit unit and the on-vehicle-device-side circuit unit.

In the on-vehicle transmission system according to the first embodiment of the present invention, the antenna-side circuit unit is configured to include the wireless transmission/reception circuits and the wireless reception circuits, but is not limited thereto. The antenna-side circuit unit may be configured not to include any wireless reception circuits. Specifically, the antenna-side circuit unit 31 may be configured not to include the wireless circuit 65 and the wireless circuit 66 which are wireless reception circuits.

In the on-vehicle transmission system according to the first embodiment of the present invention, the on-vehicle-device-side circuit unit is configured to include the wireless transmission/reception circuits and the wireless reception circuits, but is not limited thereto. The on-vehicle-device-side circuit unit may be configured not to include any wireless reception circuits. Specifically, the on-vehicle-device-side circuit unit 51 may be configured not to include the wireless circuit 75 and the wireless circuit 76 which are wireless reception circuits.

In the on-vehicle transmission system according to the first embodiment of the present invention, the antenna-side circuit unit is configured such that the wireless circuit 60 for which the frequency band of a corresponding radio signal is higher is connected at a side closer to the path part, but the on-vehicle transmission system is not limited thereto. The on-vehicle transmission system 101 may be configured such that, in the antenna-side circuit unit, the wireless circuit 60 for which the frequency band of a corresponding radio signal is lower is connected at a side closer to the path part.

Specifically, the antenna-side circuit unit 31 shown in FIG. 2 may be configured such that the wireless circuit 63 is connected to the path part 41, the wireless circuit 62 is connected to the wireless circuit 63, and the wireless circuit 61 is connected to the wireless circuit 62.

The on-vehicle transmission system according to the first embodiment of the present invention is configured such that, in the on-vehicle-device-side circuit unit, the wireless circuit 70 for which the frequency band of a corresponding radio signal is higher is connected at a side closer to the path part, but the on-vehicle transmission system is not limited thereto. The on-vehicle transmission system 101 may be configured such that, in the on-vehicle-device-side circuit unit, the wireless circuit 70 for which the frequency band of a corresponding radio signal is lower is connected at a side closer to the path part Specifically, the on-vehicle-device-side circuit unit 51 shown in FIG. 6 may be configured such that the wireless circuit 73 is connected to the path part 41, the wireless circuit 72 is connected to the wireless circuit 73, and the wireless circuit 71 is connected to the wireless circuit 72.

In the on-vehicle transmission system according to the first embodiment of the present invention, the antenna-side circuit unit is configured to include the diplexers or directional coupling circuits, which are passive elements, and the LNAs, which are active elements, but is not limited thereto. The antenna-side circuit unit may be configured not to include any active elements and configured to combine radio signals received by the respective wireless circuits 60 and output the resultant radio signal to the path part 41.

Meanwhile, a technology capable of realizing an excellent configuration for transmitting radio signals between an antenna side and an on-vehicle device side of a vehicle is desired.

For realizing such a technology, in the on-vehicle transmission system according to the embodiment of the present invention, the antenna-side circuit unit 31 includes the multiple wireless circuits 60 which receive radio signals in frequency bands different from each other and which are connected in series, and combines radio signals received by the respective wireless circuits 60 and outputs the resultant radio signal. The path part 41 transmits the radio signal resulting from the combination and received from the antenna-side circuit unit 31, to the on-vehicle-device-side circuit unit 51 mounted on the vehicle. In the antenna-side circuit unit 31, each wireless circuit 60 is connected according to the order determined for each wireless circuit 60.

Owing to the configuration in which the radio signals received by the multiple wireless circuits are combined and transmitted as described above, the configuration for transmission can be simplified. Furthermore, owing to the configuration in which each of the wireless circuits which receive radio signals in different frequency bands is connected in the order determined for each of the wireless circuits, from various viewpoints such as signal characteristics and design, the respective wireless circuits can be appropriately arranged in accordance with corresponding services. Therefore, an excellent configuration for transmitting radio signals between the antenna side and the on-vehicle device side of the vehicle can be realized.

In the on-vehicle transmission system according to the embodiment of the present invention, in the antenna-side circuit unit 31, the wireless circuit 67 capable of receiving radio signals in a plurality of frequency bands is connected at the end farthest from the path part 41.

For a radio signal using a plurality of frequency bands, it is necessary to provide filters corresponding to the respective frequency bands, and thus the size of the circuit is increased. Owing to the configuration in which a component in another frequency band can be extracted at a side closer to the path part as described above, a radio signal mainly including a desired frequency component can be obtained, and thus the filter design can be simplified.

In the on-vehicle transmission system according to the embodiment of the present invention, in the antenna-side circuit unit 31, regarding the wireless circuits 60 other than the wireless circuit 67 connected at the farthest end, the wireless circuit 60 for which the frequency band of a radio signal is higher is connected at a side closer to the path part 41.

Owing to the configuration in which a wireless circuit compatible with a radio signal having a high frequency is disposed at a side close to the path part as described above, the distance for which a high-frequency radio signal having a high degree of attenuation propagates through a cable or the like can be shortened.

In the on-vehicle transmission system according to the embodiment of the present invention, at least one of the multiple wireless circuits 60 in the antenna-side circuit unit 31 is a wireless transmission/reception circuit that transmits a radio signal. In the antenna-side circuit unit 31, the wireless transmission/reception circuit is connected at the end nearest to the path part 41.

Owing to such a configuration, at a side closer to the path part, a transmission signal can be separated to an antenna, and thus the transmission signal can be inhibited from being transmitted to the wireless circuit at a rear stage from the path part. Accordingly, the transmission signal can be prevented from propagating to the antenna connected to the wireless circuit at the rear stage.

In the on-vehicle transmission system according to the embodiment of the present invention, in the antenna-side circuit unit 31, regarding the wireless circuits 60 other than the wireless circuits 61 to 64 connected at the nearest end, the wireless circuit 60 for which the frequency band of a radio signal is higher is connected at a side closer to the path part 41.

Owing to the configuration in which a wireless circuit compatible with a radio signal having a high frequency is disposed at a side close to the path part as described above, the distance for which a high-frequency radio signal having a high degree of attenuation propagates through a cable or the like can be shortened.

In the on-vehicle transmission system according to the embodiment of the present invention, in the antenna-side circuit unit 31, the wireless circuit 60 for which the frequency band of a radio signal is higher is connected at a side closer to the path part 41.

Owing to the configuration in which a wireless circuit compatible with a radio signal having a high frequency is disposed at a side close to the path part as described above, the distance for which a high-frequency radio signal having a high degree of attenuation propagates through a cable or the like can be shortened.

In the on-vehicle transmission system according to the embodiment of the present invention, at least one of the multiple wireless circuits 60 in the antenna-side circuit unit 31 is a wireless transmission/reception circuit that transmits a radio signal. The wireless transmission/reception circuit includes a diplexer.

Owing to the configuration using a diplexer as described above, in an own wireless circuit, for example, a radio signal in a frequency band not to be transmitted can be inhibited from propagating to an antenna, and a radio signal received at the own wireless circuit can be prevented from propagating to another wireless circuit at the side opposite to the path part.

In the on-vehicle transmission system according to the embodiment of the present invention, at least one of the multiple wireless circuits 60 in the antenna-side circuit unit 31 is a wireless transmission/reception circuit that transmits a radio signal. The wireless circuits 60 other than the wireless transmission/reception circuit each include a directional coupling circuit.

Owing to the configuration using a directional coupling circuit as described above, as compared to the case of using a diplexer, the direction of a signal in the wireless circuit is restricted, and thus, for example, a transmission radio signal in a frequency band not to be used can be more reliably prevented from propagating through an own wireless circuit to an antenna, and a radio signal received at another wireless circuit can be more reliably prevented from propagating to the antenna corresponding to the own wireless circuit.

In the on-vehicle transmission system according to the embodiment of the present invention, at least one of the multiple wireless circuits 60 in the antenna-side circuit unit 31 is a wireless reception circuit that does not transmit a radio signal, and the wireless reception circuit includes an LNA.

Owing to such a configuration, in the wireless reception circuit, the signal noise characteristics of a received radio signal can be improved, and isolation from a radio signal from another wireless circuit is ensured. For example, a radio signal from another wireless circuit can be inhibited from propagating to an antenna connected to an own wireless circuit.

In the on-vehicle transmission system according to the embodiment of the present invention, the diversity wireless circuit unit 82 is connected to a plurality of antennas. The diversity path part 42 transmits radio signals at the plurality of antennas, to the on-vehicle device side mounted on the vehicle.

Owing to such a configuration, the space in the vehicle can be used more efficiently by passing a path through which radio signals are combined and transmitted between the antenna side and the on-vehicle device side of the vehicle and a path through which signals not suitable to be combined are transmitted, for example, through the inside of the same pillar.

In the on-vehicle transmission system according to the embodiment of the present invention, the diversity wireless circuit unit 83 is connected to a plurality of antennas. The antenna-side circuit unit 33 further combines at least one of radio signals at the plurality of antennas.

Owing to the configuration in which the radio signals received at the plurality of antennas are combined as described above, for example, the number of cables passed through the inside of a pillar can be reduced, and thus the space in the vehicle can be used more efficiently.

In the on-vehicle transmission system according to the embodiment of the present invention, the diversity wireless circuit unit 84 is connected to a plurality of antennas, and outputs a signal generated on the basis of radio signals received at the plurality of antennas. The antenna-side circuit unit 34 further combines the signal received from the diversity wireless circuit unit 84.

Owing to the configuration in which a signal is generated on the basis of radio signals received at the plurality of antennas and is combined as described above, for example, the number of cables passed through the inside of a pillar can be reduced, and thus the space in the vehicle can be used more efficiently.

In the on-vehicle transmission system according to the embodiment of the present invention, the path part 41 transmits a radio signal received from the antenna-side circuit unit 31 mounted on the vehicle, to the on-vehicle-device-side circuit unit 51 mounted on the vehicle. The on-vehicle-device-side circuit unit 51 includes the multiple wireless circuits 70, which receive radio signals in frequency bands different from each other and which are connected in series, splits the radio signal received from the path part 41, and provides the resultant radio signals to the respective wireless circuits 70. In the on-vehicle-device-side circuit unit 51, each wireless circuit 70 is connected according to the order determined for each wireless circuit 70.

Owing to the configuration in which radio signals received by the multiple wireless circuits are combined and transmitted as described above, the configuration for transmission can be simplified. Furthermore, owing to the configuration in which each of the wireless circuits which receive radio signals in different frequency bands is connected in the order determined for each of the wireless circuits, from various viewpoints such as signal characteristics and design, the respective wireless circuits can be appropriately arranged in accordance with corresponding services. Therefore, an excellent configuration for transmitting radio signals between the antenna side and the on-vehicle device side of the vehicle can be realized.

In the on-vehicle transmission system according to the embodiment of the present invention, in the on-vehicle-device-side circuit unit 51, the wireless circuit 77 capable of receiving radio signals in a plurality of frequency bands is connected at the end farthest from the path part.

For a radio signal using a plurality of frequency bands, it is necessary to provide filters corresponding to the respective frequency bands, and thus the size of the circuit is increased. Owing to the configuration in which a component in another frequency band can be extracted at a side closer to the path part as described above, a radio signal mainly including a desired frequency component can be obtained, and thus the filter design can be simplified.

In the on-vehicle transmission system according to the embodiment of the present invention, in the on-vehicle-device-side circuit unit 51, regarding the wireless circuits 70 other than the wireless circuit 77 connected at the farthest end, the wireless circuit 70 for which the frequency band of a radio signal is higher is connected at a side closer to the path part 41.

Owing to the configuration in which a wireless circuit compatible with a radio signal having a high frequency is disposed at a side close to the path part as described above, the distance for which a high-frequency radio signal having a high degree of attenuation propagates through a cable or the like can be shortened.

In the on-vehicle transmission system according to the embodiment of the present invention, at least one of the multiple wireless circuits 70 in the on-vehicle-device-side circuit unit 51 is a wireless transmission/reception circuit that transmits a radio signal. In the on-vehicle-device-side circuit unit 51, the wireless transmission/reception circuit is connected at the end nearest to the path part 41.

Owing to such a configuration, a reception signal from an antenna can be separated at a side closer to the path part, and thus the reception signal can be inhibited from being transmitted to the wireless circuit at a rear stage from the path part. Accordingly, saturation of the wireless circuit at the rear stage can be prevented.

In the on-vehicle transmission system according to the embodiment of the present invention, in the on-vehicle-device-side circuit unit 51, regarding the wireless circuits 70 other than the wireless circuits 71 to 74 connected at the nearest end, the wireless circuit 70 for which the frequency band of a radio signal is higher is connected at a side closer to the path part 41.

Owing to the configuration in which a wireless circuit compatible with a radio signal having a high frequency is disposed at a side close to the path part as described above, the distance for which a high-frequency radio signal having a high degree of attenuation propagates through a cable or the like can be shortened.

In the on-vehicle transmission system according to the embodiment of the present invention, the wireless circuit 70 for which the frequency band of a radio signal is higher is connected at a side closer to the path part 41.

Owing to the configuration in which a wireless circuit compatible with a radio signal having a high frequency is disposed at a side close to the path part as described above, the distance for which a high-frequency radio signal having a high degree of attenuation propagates through a cable or the like can be shortened.

In the on-vehicle transmission system according to the embodiment of the present invention, at least one of the multiple wireless circuits 70 in the on-vehicle-device-side circuit unit 51 is a wireless transmission/reception circuit that transmits a radio signal. The wireless transmission/reception circuit includes a diplexer.

Owing to the configuration using a diplexer as described above, for example, a transmitted radio signal can be prevented from propagating to an on-vehicle device not compatible with the radio signal and interfering in a reception circuit compatible with the on-vehicle device or saturating the reception circuit.

In the on-vehicle transmission system according to the embodiment of the present invention, at least one of the multiple wireless circuits 70 in the on-vehicle-device-side circuit unit 51 is a wireless transmission/reception circuit that transmits a radio signal. The wireless circuits 70 other than the wireless transmission/reception circuit each include a directional coupling circuit.

Owing to the configuration using a directional coupling circuit as described above, as compared to the case of using a diplexer, the direction of a signal in the wireless circuit is restricted, and thus a radio signal transmitted from a transmission circuit compatible with another on-vehicle device can be more reliably prevented from interfering in an own reception circuit or saturating the own reception circuit.

In the on-vehicle transmission system according to the embodiment of the present invention, at least one of the multiple wireless circuits 70 in the on-vehicle-device-side circuit unit 51 is a wireless reception circuit that does not transmit a radio signal, and the wireless reception circuit includes an LNA.

Owing to such a configuration, in the wireless reception circuit, by amplifying a received radio signal, transmission loss can be compensated for and signal noise characteristics can be improved.

Next, other embodiments of the present invention will be described with reference to the drawings. In the drawings, the same or corresponding parts are denoted by the same reference characters, and description thereof is not repeated.

Second Embodiment

The present embodiment relates to an on-vehicle transmission system in which the orders of connection of wireless circuits in an antenna-side circuit unit and an on-vehicle-device-side circuit unit are different from those in the on-vehicle transmission system according to the first embodiment. The contents other than those described below are the same as those of the on-vehicle transmission system according to the first embodiment.

Figure 25:
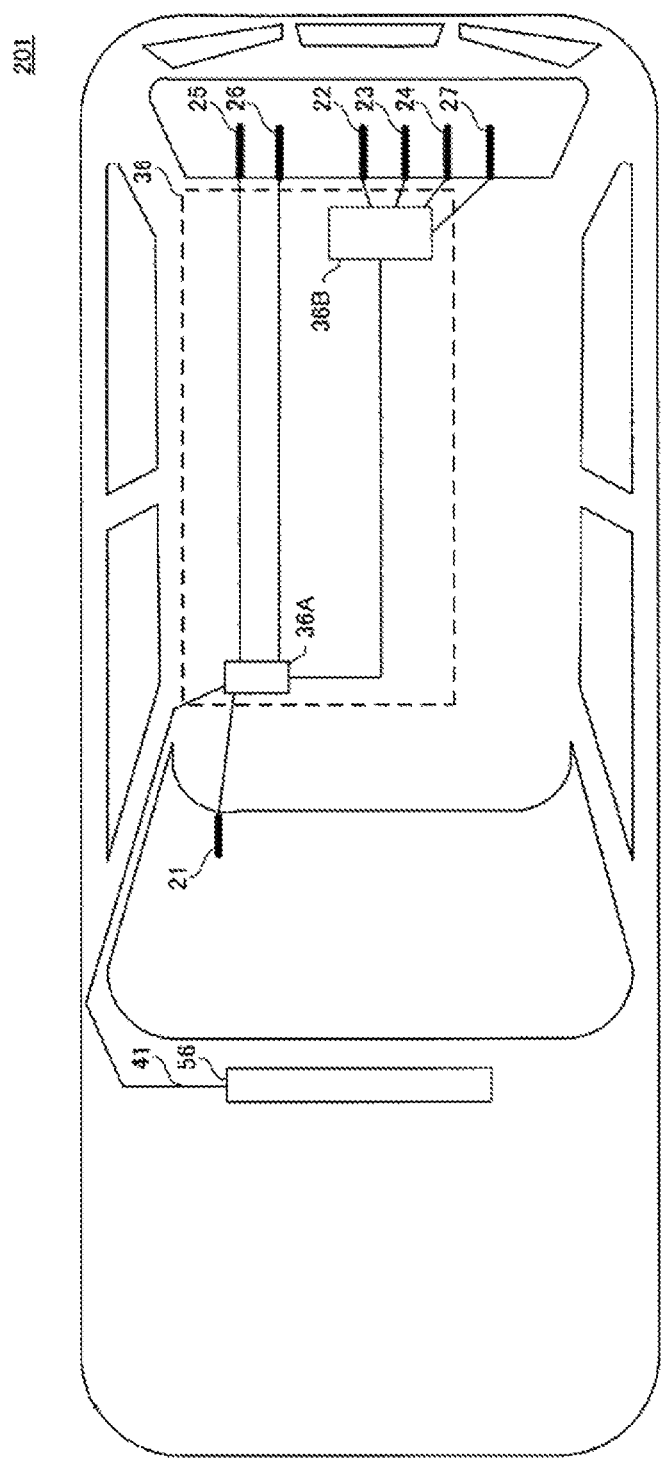
FIG. 25 shows an example of the configuration of an on-vehicle transmission system according to a second embodiment of the present invention.

FIG. 25 shows an example of the configuration of the on-vehicle transmission system according to the second embodiment of the present invention. FIG. 25 shows an on-vehicle transmission system compatible with communication services in Japan.

With reference to FIG. 25, an on-vehicle transmission system 201 includes antennas 21 to 27, an antenna-side circuit unit 36, a path part 41, and an on-vehicle-device-side circuit unit 56. The antenna-side circuit unit 36 includes a front-side circuit unit 36A and a rear-side circuit unit 36B.

Figure 26:
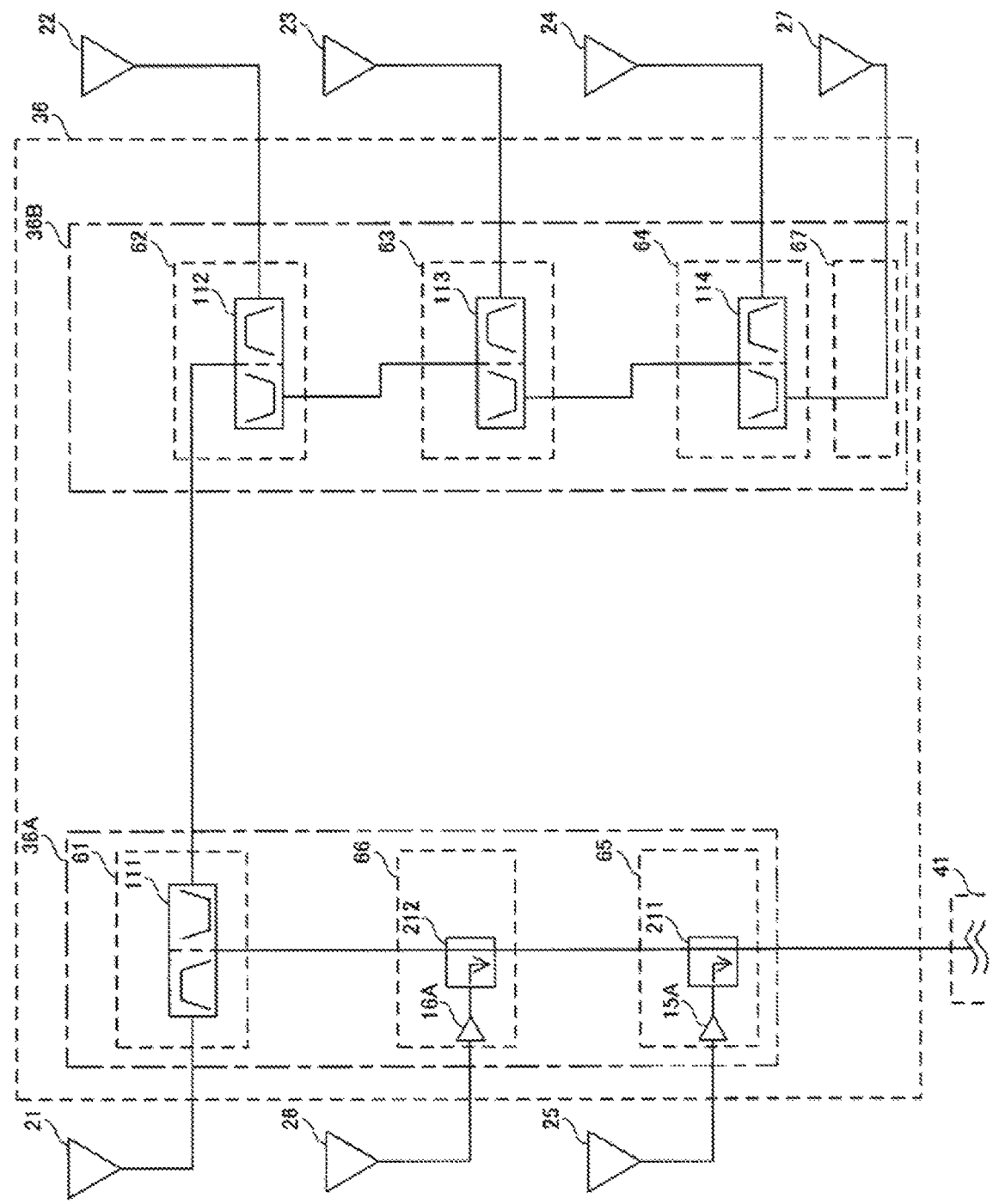
FIG. 26 shows an example of the configuration of an antenna-side circuit unit in the on-vehicle transmission system according to the second embodiment of the present invention.

FIG. 26 shows an example of the configuration of the antenna-side circuit unit in the on-vehicle transmission system according to the second embodiment of the present invention.

With reference to FIG. 26, the front-side circuit unit 36A includes wireless circuits 61, 65, and 66. The rear-side circuit unit 36B includes wireless circuits 62, 63, 64, and 67. The wireless circuits 61 to 67 are connected in series and receive radio signals in frequency bands different from each other. Hereinafter, each of the wireless circuits 61 to 67 is also referred to as a wireless circuit 60.

In the antenna-side circuit unit 36, the wireless circuit 67 compatible with mobile communication is capable of transmitting and receiving radio signals in a plurality of frequency bands, is connected at an end farthest from the path part 41, that is, at the rearmost position, and is located at the rearmost stage among the respective wireless circuits 60, that is, at the rearmost part.

The wireless circuits 61 to 64 are wireless transmission/reception circuits, and the wireless circuit 65 and the wireless circuit 66 are wireless reception circuits.

In the antenna-side circuit unit 36, the wireless circuit 65 and the wireless circuit 66, which are the wireless circuits 60 other than the wireless transmission/reception circuits, are connected at an end nearest to the path part 41, that is, at the foremost position, and are located at the foremost stage among the respective wireless circuits 60, that is, at the foremost part.

In the antenna-side circuit unit 36, the wireless circuit 60 compatible with a radio signal in a higher frequency band is connected at a side closer to the path part 41.

Specifically, the wireless circuit 65 is a wireless reception circuit compatible with GPS, which is a service using a radio signal having a highest frequency, among the wireless reception circuits in the on-vehicle transmission system 201, and is connected at the end nearest to the path part 41.

The wireless circuit 66 which is a wireless reception circuit compatible with AM/FM radio using a radio signal having the next lower frequency is connected to the wireless circuit 65.

The wireless circuit 61 which is a wireless transmission/reception circuit compatible with ETC using a radio signal in 5.8 GHz band is connected to the wireless circuit 65; the wireless circuit 62 compatible with wireless LAN of 5 GHz band is connected to the wireless circuit 61; the wireless circuit 63 compatible with wireless LAN of 2.4 GHz band is connected to the wireless circuit 62; and the wireless circuit 64 compatible with ITS is connected to the wireless circuit 63.

In the antenna-side circuit unit 36, the wireless circuits 61 to 64 include diplexers 111 to 114, respectively.

The wireless circuit 65 and the wireless circuit 66 include a directional coupling circuit 211 and a directional coupling circuit 212, respectively.

The wireless circuit 65 and the wireless circuit 66 also include an LNA 15A and an LNA 16A, respectively.

In the case where the reception power of a corresponding radio signal is low, the LNAs 15A and 16A are provided to increase a signal-to-noise ratio.

The LNA 15A is connected between the directional coupling circuit 211 and the antenna 25. The LNA 16A is connected between the directional coupling circuit 212 and the antenna 26.

The directional coupling circuit 211 in the wireless circuit 65 receives a radio signal received at the antenna 25 and corresponding to GPS, and outputs the received radio signal to the path part 41.

In addition, the directional coupling circuit 211 outputs a radio signal received from the wireless circuit 66, to the path part 41. The directional coupling circuit 211 combines the radio signal received at the antenna 25 and corresponding to GPS and the radio signal received from the wireless circuit 66, and outputs the resultant radio signal to the path part 41.

The directional coupling circuit 212 in the wireless circuit 66 receives a radio signal received at the antenna 26 and corresponding to AM/FM radio, and outputs the received radio signal to the wireless circuit 65.

In addition, the directional coupling circuit 212 outputs a radio signal received from the wireless circuit 61, to the wireless circuit 65. The directional coupling circuit 212 combines the radio signal received at the antenna 26 and corresponding to AM/FM radio and the radio signal received from the wireless circuit 61, and outputs the resultant radio signal to the wireless circuit 65.

The diplexer 111 in the wireless circuit 61 receives a radio signal received at the antenna 21 and corresponding to ETC, and outputs the received radio signal to the wireless circuit 66. In addition, the diplexer 111 outputs a radio signal received from the wireless circuit 62, to the wireless circuit 66. The diplexer 111 combines the radio signal received at the antenna 21 and corresponding to ETC and the radio signal received from the wireless circuit 62, and outputs the resultant radio signal to the wireless circuit 66.

Meanwhile, the diplexer 111 separates a frequency component in a signal band including 5.8 GHz that is a radio signal corresponding to ETC, from a radio signal received from the wireless circuit 66. The diplexer 111 outputs the separated radio signal including the frequency component in the signal band including 5.8 GHz, to the antenna 21. The diplexer 111 outputs a radio signal including frequency components outside the signal band including 5.8 GHz, in the radio signal received from the wireless circuit 66, to the wireless circuit 62.

The diplexer 112 in the wireless circuit 62 receives a radio signal received at the antenna 22 and corresponding to wireless LAN of 5 GHz band, and outputs the received radio signal to the wireless circuit 61. In addition, the diplexer 112 outputs a radio signal received from the wireless circuit 63, to the wireless circuit 61. The diplexer 112 combines the radio signal received at the antenna 22 and corresponding to wireless LAN of 5 GHz band and the radio signal received from the wireless circuit 63, and outputs the resultant radio signal to the wireless circuit 61.

Meanwhile, the diplexer 112 separates a frequency component in a signal band including 5.2 GHz to 5.6 GHz that is a radio signal corresponding to wireless LAN of 5 GHz band, from a radio signal received from the wireless circuit 61. The diplexer 112 outputs the separated radio signal including the frequency component in the signal band including 5.2 GHz to 5.6 GHz, to the antenna 22. The diplexer 112 outputs a radio signal including frequency components outside the signal band including 5.2 GHz to 5.6 GHz, in the radio signal received from the wireless circuit 61, to the wireless circuit 63.

The diplexer 113 in the wireless circuit 63 receives a radio signal received at the antenna 23 and corresponding to wireless LAN of 2.4 GHz band, and outputs the received radio signal to the wireless circuit 62. In addition, the diplexer 113 outputs a radio signal received from the wireless circuit 64, to the wireless circuit 62. The diplexer 113 combines the radio signal received at the antenna 23 and corresponding to wireless LAN of 2.4 GHz band and the radio signal received from the wireless circuit 64, and outputs the resultant radio signal to the wireless circuit 62.

Meanwhile, the diplexer 113 separates a frequency component in a signal band including 2.4 GHz that is a radio signal corresponding to wireless LAN of 2.4 GHz band, from a radio signal received from the wireless circuit 62. The diplexer 113 outputs the separated radio signal including the frequency component in the signal band including 2.4 GHz, to the antenna 23. The diplexer 113 outputs a radio signal including frequency components outside the signal band including 2.4 GHz, in the radio signal received from the wireless circuit 62, to the wireless circuit 64.

The diplexer 114 in the wireless circuit 64 receives a radio signal received at the antenna 24 and corresponding to ITS radio, and outputs the received radio signal to the wireless circuit 63. In addition, the diplexer 114 outputs a radio signal received from the wireless circuit 67, to the wireless circuit 63. The diplexer 114 combines the radio signal received at the antenna 24 and corresponding to ITS radio and the radio signal received from the wireless circuit 67, and outputs the resultant radio signal to the wireless circuit 63.

Meanwhile, the diplexer 114 separates a frequency component in a signal band including 760 MHz that is a radio signal corresponding to ITS radio, from a radio signal received from the wireless circuit 63. The diplexer 114 outputs the separated radio signal including the frequency component in the signal band including 760 MHz, to the antenna 24. The diplexer 114 outputs a radio signal including frequency components outside the signal band including 760 MHz, in the radio signal received from the wireless circuit 63, to the wireless circuit 67.

The wireless circuit 67 receives a radio signal corresponding to mobile communication, via the antenna 27, and outputs the received radio signal to the wireless circuit 64.

In addition, the wireless circuit 67 transmits a radio signal received from the wireless circuit 64, via the antenna 27.

Figure 27:
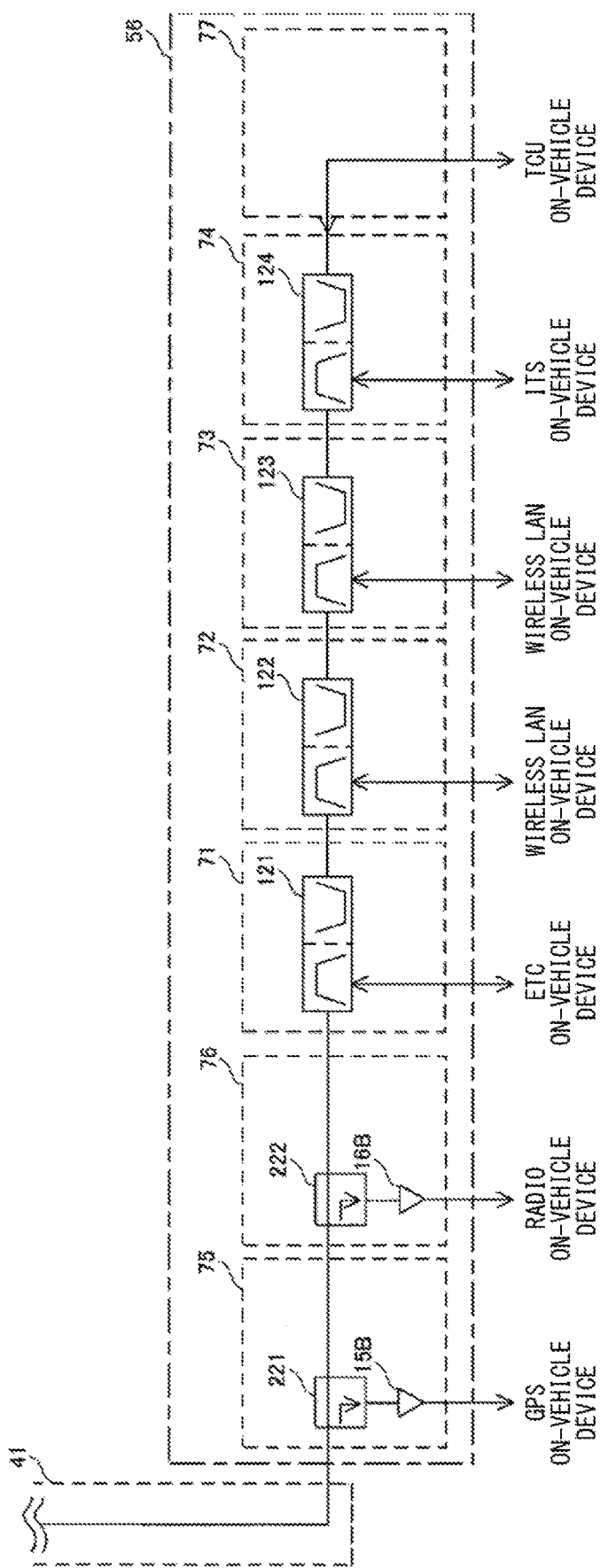
FIG. 27 shows an example of the configuration of an on-vehicle-device-side circuit unit in the on-vehicle transmission system according to the second embodiment of the present invention.

FIG. 27 shows an example of the configuration of the on-vehicle-device-side circuit unit in the on-vehicle transmission system according to the second embodiment of the present invention.

With reference to FIG. 27, the on-vehicle-device-side circuit unit 56 includes a plurality of wireless circuits 71 to 77. The plurality of wireless circuits 71 to 77 are connected in series and receive radio signals in frequency bands different from each other. Hereinafter, each of the wireless circuits 71 to 77 is also referred to as a wireless circuit 70.

In the on-vehicle-device-side circuit unit 56, each wireless circuit 70 is connected according to an order determined for each wireless circuit 70.

In the on-vehicle-device-side circuit unit 56, the wireless circuit 77 compatible with mobile communication is capable of transmitting and receiving radio signals in a plurality of frequency bands, is connected at an end farthest from the path part 41, that is, at the rearmost position, and is located at the rearmost stage among the respective wireless circuits 70, that is, at the rearmost part.

The wireless circuits 71 to 74 are wireless transmission/reception circuits, and the wireless circuit 75 and the wireless circuit 76 are wireless reception circuits.

In the on-vehicle-device-side circuit unit 56, the wireless circuit 75 and the wireless circuit 76, which are the wireless circuits 70 other than the wireless transmission/reception circuits, are connected at an end nearest to the path part 41, that is, at the foremost position, and are located at the foremost stage among the respective wireless circuits 70, that is, at the foremost part.

In the on-vehicle-device-side circuit unit 56, the wireless circuit 70 compatible with a radio signal in a higher frequency band is connected at a side closer to the path part 41.

Specifically, the wireless circuit 75 is a wireless reception circuit compatible with GPS, which is a service using a radio signal having a highest frequency, among the wireless reception circuits in the on-vehicle transmission system 201, and is connected at the end nearest to the path part 41.

The wireless circuit 76 which is a wireless reception circuit compatible with AM/FM radio using a radio signal having the next lower frequency is connected to the wireless circuit 75.

The wireless circuit 71 compatible with ETC using a radio signal in 5.8 GHz band is connected to the wireless circuit 76; the wireless circuit 72 which is a wireless transmission/reception circuit compatible with wireless LAN of 5 GHz band is connected to the wireless circuit 71; the wireless circuit 73 compatible with wireless LAN of 2.4 GHz band is connected to the wireless circuit 72; and the wireless circuit 74 compatible with ITS is connected to the wireless circuit 73.

In the on-vehicle-device-side circuit unit 56, the wireless circuits 71 to 74 include diplexers 121 to 124, respectively.

The wireless circuit 75 and the wireless circuit 76 include a directional coupling circuit 221 and a directional coupling circuit 222, respectively.

The wireless circuit 75 and the wireless circuit 76 also include an LNA 15B and an LNA 16B, respectively.

In the case where the reception power of a corresponding radio signal is low, the LNAs 15B and 16B are provided to increase a signal-to-noise ratio.

The LNA 15B is connected between the directional coupling circuit 221 and a GPS on-vehicle device. The LNA 16B is connected between the directional coupling circuit 222 and a radio on-vehicle device.

The on-vehicle-device-side circuit unit 56 splits a radio signal received from the path part 41 and provides the resultant radio signals to the respective wireless circuits 70.

More specifically, the directional coupling circuit 221 in the wireless circuit 75 receives a radio signal obtained by combining a plurality of frequency components, from the path part 41, and separates a frequency component in a signal band including 1.2 GHz to 1.5 GHz that is a radio signal corresponding to GPS.

In addition, the directional coupling circuit 221 outputs the separated radio signal including the frequency component in the signal band including 1.2 GHz to 1.5 GHz, to the GPS on-vehicle device. The directional coupling circuit 221 outputs a radio signal including frequency components other than the frequency component in the signal band including 1.2 GHz to 1.5 GHz, in the radio signal received from the path part 41, to the wireless circuit 76.

The directional coupling circuit 222 in the wireless circuit 76 receives a radio signal obtained by combining a plurality of frequency components, from the wireless circuit 75, and separates a frequency component in or below a signal band including 120 MHz that is a radio signal corresponding to AM/FM radio.

In addition, the directional coupling circuit 222 outputs the separated radio signal including the frequency component in or below the signal band including 120 MHz, to the radio on-vehicle device. The directional coupling circuit 222 outputs a radio signal including frequency components other than the frequency component in or below the signal band including 120 MHz, in the radio signal received from the wireless circuit 75, to the wireless circuit 71.

The diplexer 121 in the wireless circuit 71 receives a radio signal obtained by combining a plurality of frequency components, from the wireless circuit 76, and separates a frequency component in the signal band including 5.8 GHz that is a radio signal corresponding to ETC. The diplexer 121 outputs the separated radio signal including the frequency component in the signal band including 5.8 GHz, to an ETC on-vehicle device. The diplexer 121 outputs a radio signal including frequency components other than the frequency component in the signal band including 5.8 GHz, in the radio signal received from the wireless circuit 76, to the wireless circuit 72.

Meanwhile, the diplexer 121 outputs a radio signal received from the ETC on-vehicle device, to the wireless circuit 76. The diplexer 121 outputs a radio signal received from the wireless circuit 72, to the wireless circuit 76. The diplexer 121 combines the radio signal received from the ETC on-vehicle device and the radio signal received from the wireless circuit 72, and outputs the resultant radio signal to the wireless circuit 76.

The diplexer 122 in the wireless circuit 72 receives a radio signal obtained by combining a plurality of frequency components, from the wireless circuit 71, and separates a frequency component in the signal band including 5.2 GHz to 5.6 GHz that is a radio signal corresponding to wireless LAN of 5 GHz band. The diplexer 122 outputs the separated radio signal including the frequency component in the signal band including 5.2 GHz to 5.6 GHz, to a wireless LAN on-vehicle device. The diplexer 122 outputs a radio signal including frequency components other than the frequency component in the signal band including 5.2 GHz to 5.6 GHz, in the radio signal received from the wireless circuit 71, to the wireless circuit 73.

Meanwhile, the diplexer 122 outputs a radio signal received from the wireless LAN on-vehicle device, to the wireless circuit 71. The diplexer 122 outputs a radio signal received from the wireless circuit 73, to the wireless circuit 71. The diplexer 122 combines the radio signal received from the wireless LAN on-vehicle device and the radio signal received from the wireless circuit 73, and outputs the resultant radio signal to the wireless circuit 71.

The diplexer 123 in the wireless circuit 73 receives a radio signal obtained by combining a plurality of frequency components, from the wireless circuit 72, and separates a frequency component in the signal band including 2.4 GHz that is a radio signal corresponding to wireless LAN of 2.4 GHz band. The diplexer 123 outputs the separated radio signal including the frequency component in the signal band including 2.4 GHz, to the wireless LAN on-vehicle device. The diplexer 123 outputs a radio signal including frequency components other than the frequency component in the signal band including 2.4 GHz, in the radio signal received from the wireless circuit 72, to the wireless circuit 74.

Meanwhile, the diplexer 123 outputs a radio signal received from the wireless LAN on-vehicle device, to the wireless circuit 72. The diplexer 123 outputs a radio signal received from the wireless circuit 74, to the wireless circuit 72. The diplexer 123 combines the radio signal received from the wireless LAN on-vehicle device and the radio signal received from the wireless circuit 74, and outputs the resultant radio signal to the wireless circuit 72.

The diplexer 124 in the wireless circuit 74 receives a radio signal obtained by combining a plurality of frequency components, from the wireless circuit 73, and separates a frequency component in the signal band including 760 MHz that is a radio signal corresponding to ITS radio. The diplexer 124 outputs the separated radio signal including the frequency component in the signal band including 760 MHz, to an ITS on-vehicle device. The diplexer 124 outputs a radio signal including frequency components other than the frequency component in the signal band including 760 MHz, in the radio signal received from the wireless circuit 73, to the wireless circuit 77.

Meanwhile, the diplexer 124 outputs a radio signal received from the ITS on-vehicle device, to the wireless circuit 73. The diplexer 124 outputs a radio signal received from the wireless circuit 77, to the wireless circuit 73. The diplexer 124 combines the radio signal received from the ITS on-vehicle device and the radio signal received from the wireless circuit 77, and outputs the resultant radio signal to the wireless circuit 73.

The wireless circuit 77 receives a radio signal including a frequency component corresponding to mobile communication, from the TCU on-vehicle device, and outputs the received radio signal to the wireless circuit 74.

In addition, the wireless circuit 77 outputs a radio signal received from the wireless circuit 74, to the TCU on-vehicle device.

[Modifications]

Figure 28:
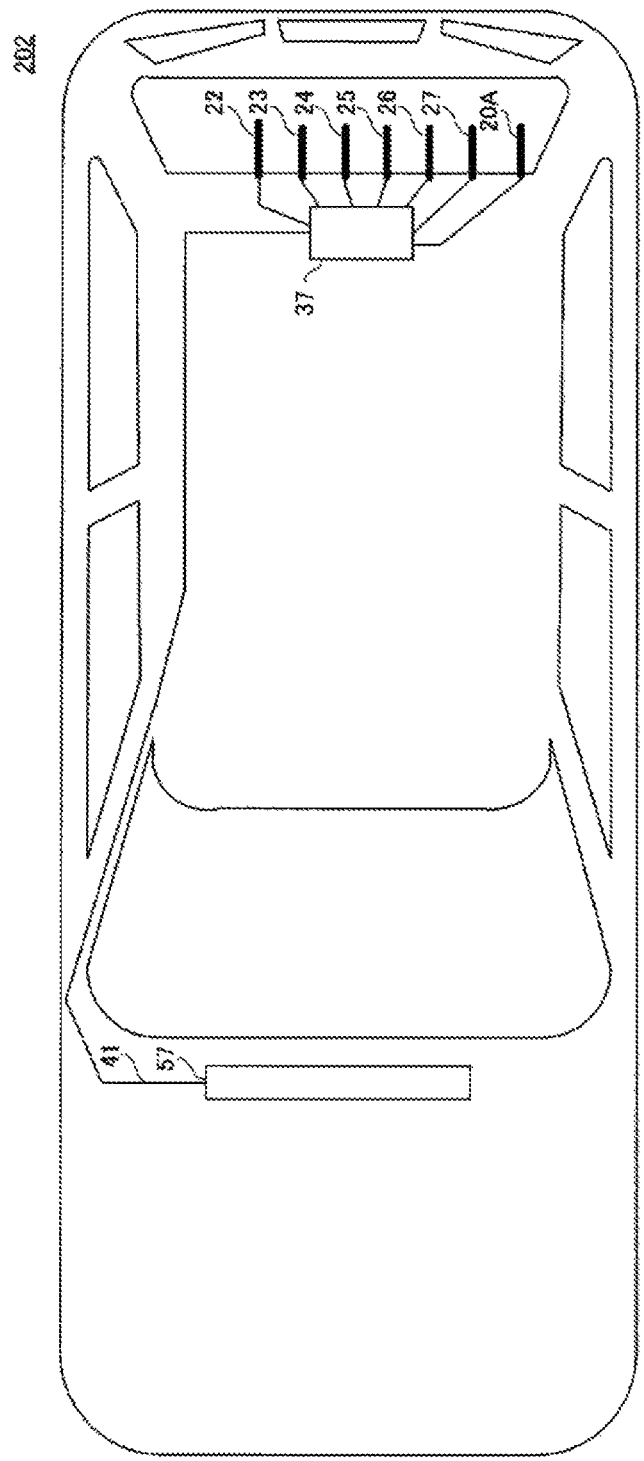
FIG. 28 shows a modification of the configuration of the on-vehicle transmission system according to the second embodiment of the present invention.

FIG. 28 shows a modification of the configuration of the on-vehicle transmission system according to the second embodiment of the present invention. FIG. 28 shows an on-vehicle transmission system compatible with communication services outside Japan.

With reference to FIG. 28, an on-vehicle transmission system 202 includes antennas 22 to 27 and 20A, an antenna-side circuit unit 37, a path part 41, and an on-vehicle-device-side circuit unit 57. Hereinafter, each of the antennas 22 to 27 and 20A is also referred to as an antenna 20.

Figure 29:
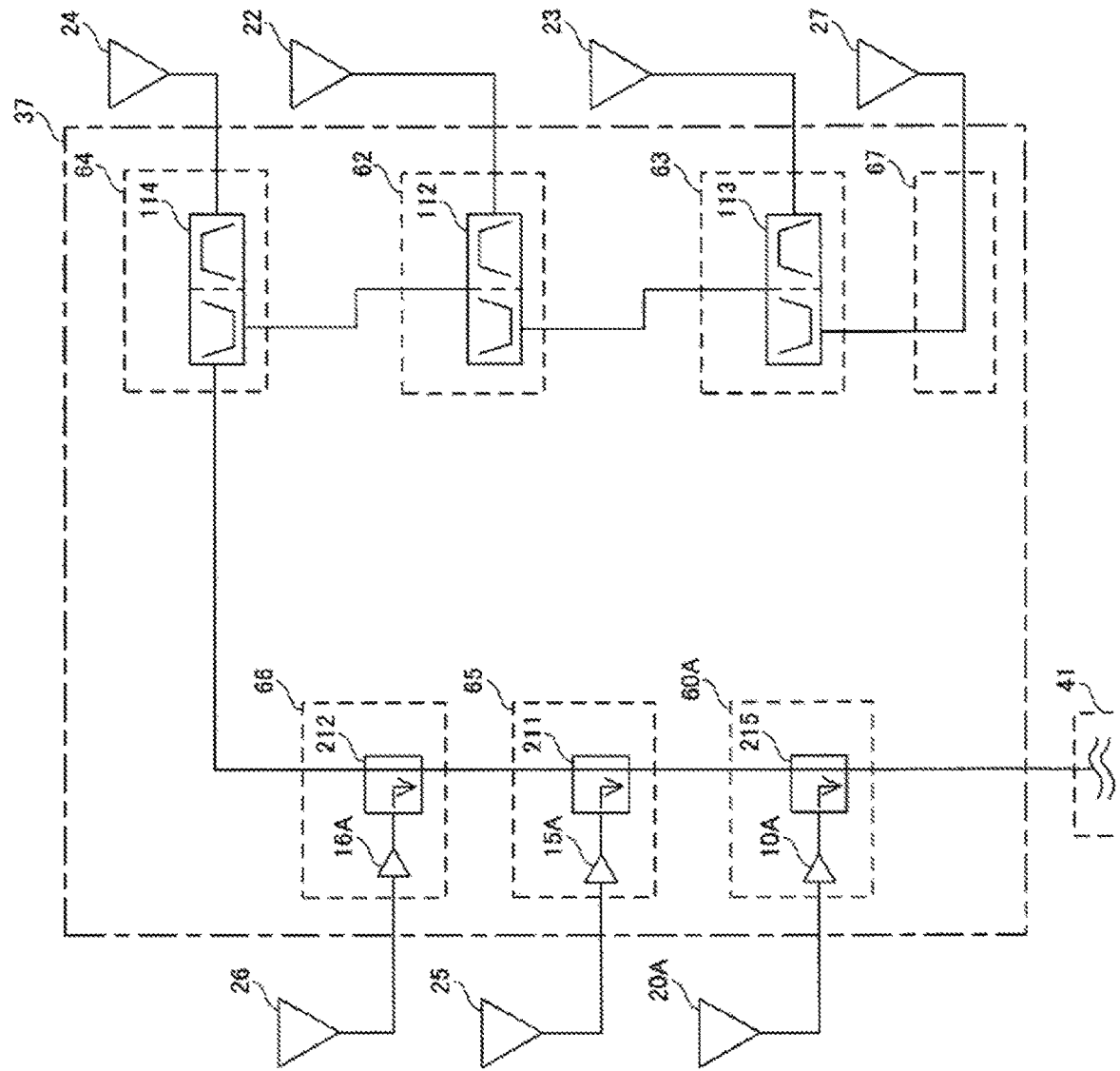
FIG. 29 shows a modification of the configuration of the antenna-side circuit unit in the on-vehicle transmission system according to the second embodiment of the present invention.

FIG. 29 shows a modification of the configuration of the antenna-side circuit unit in the on-vehicle transmission system according to the second embodiment of the present invention.

With reference to FIG. 29, the antenna-side circuit unit 37 includes wireless circuits 62 to 67 and 60A. The wireless circuits 62 to 67 and 60A are connected in series and receive radio signals in frequency bands different from each other. Hereinafter, each of the wireless circuits 62 to 67 and 60A is also referred to as a wireless circuit 60.

In the antenna-side circuit unit 37, each wireless circuit 60 is connected according to an order determined for each wireless circuit 60.

In the antenna-side circuit unit 37, the wireless circuit 67 compatible with mobile communication is capable of transmitting and receiving radio signals in a plurality of frequency bands, is connected at an end farthest from the path part 41, that is, at the rearmost position, and is located at the rearmost stage among the respective wireless circuits 60, that is, at the rearmost part.

The wireless circuits 62 to 64 are wireless transmission/reception circuits, and the wireless circuits 65, 66, and 60A are wireless reception circuits.

In the antenna-side circuit unit 37, the wireless circuits 65, 66, and 60A, which are the wireless circuits 60 other than the wireless transmission/reception circuits, are connected at an end nearest to the path part 41, that is, at the foremost position, and are located at the foremost stage among the respective wireless circuits 60, that is, at the foremost part.

In the antenna-side circuit unit 37, the wireless circuit 60 compatible with a radio signal in a higher frequency band is connected at a side closer to the path part 41.

Specifically, the wireless circuit 60A is a wireless reception circuit compatible with SDARS, which is a service using a radio signal having a highest frequency, among the wireless reception circuits in the on-vehicle transmission system 202, and is connected at the end nearest to the path part 41.

The wireless circuit 65 compatible with GPS using the next highest frequency band is connected to the wireless circuit 60A, and the wireless circuit 66 compatible with AM/FM radio using the lowest frequency band is connected to the wireless circuit 65.

The wireless circuit 64 which is a wireless transmission/reception circuit compatible with ITS using a frequency band that is 5.9 GHz band is connected to the wireless circuit 66, the wireless circuit 62 which is a wireless transmission/reception circuit compatible with wireless LAN of 5 GHz band is connected to the wireless circuit 64, and the wireless circuit 63 compatible with wireless LAN of 2.4 GHz band is connected to the wireless circuit 62.

In the antenna-side circuit unit 37, the wireless circuits 62 to 64 include diplexers 112 to 114, respectively.

The wireless circuits 65, 66, and 60A include a directional coupling circuit 211, a directional coupling circuit 212, and a directional coupling circuit 215, respectively.

The wireless circuits 65, 66, and 60A also include an LNA 15A, an LNA 16A, and an LNA 10A, respectively.

In the case where the reception power of a corresponding radio signal is low, the LNA 15A, the LNA 16A, and the LNA 10A are provided to increase a signal-to-noise ratio.

The LNA 15A is connected between the directional coupling circuit 211 and the antenna 25. The LNA 16A is connected between the directional coupling circuit 212 and the antenna 26. The LNA 10A is connected between the directional coupling circuit 215 and the antenna 20A.

The directional coupling circuit 215 in the wireless circuit 60A receives a radio signal received at the antenna 20A and corresponding to SDARS, and outputs the received radio signal to the path part 41.

In addition, the directional coupling circuit 215 outputs a radio signal received from the wireless circuit 65, to the path part 41. The directional coupling circuit 215 combines the radio signal received at the antenna 20A and corresponding to SDARS and the radio signal received from the wireless circuit 65, and outputs the resultant radio signal to the path part 41.

The directional coupling circuit 211 in the wireless circuit 65 receives a radio signal received at the antenna 25 and corresponding to GPS, and outputs the received radio signal to the wireless circuit 60A.

In addition, the directional coupling circuit 211 outputs a radio signal received from the wireless circuit 66, to the wireless circuit 60A. The directional coupling circuit 211 combines the radio signal received at the antenna 25 and corresponding to GPS and the radio signal received from the wireless circuit 66, and outputs the resultant radio signal to the wireless circuit 60A.

The directional coupling circuit 212 in the wireless circuit 66 receives a radio signal received at the antenna 26 and corresponding to AM/FM radio, and outputs the received radio signal to the wireless circuit 65.

In addition, the directional coupling circuit 212 outputs a radio signal received from the wireless circuit 64, to the wireless circuit 65. The directional coupling circuit 212 combines the radio signal received at the antenna 26 and corresponding to AM/FM radio and the radio signal received from the wireless circuit 64, and outputs the resultant radio signal to the wireless circuit 65.

The diplexer 114 in the wireless circuit 64 receives a radio signal received at the antenna 24 and corresponding to ITS radio, and outputs the received radio signal to the wireless circuit 66. In addition, the diplexer 114 outputs a radio signal received from the wireless circuit 62, to the wireless circuit 66. The diplexer 114 combines the radio signal received at the antenna 24 and corresponding to ITS radio and the radio signal received from the wireless circuit 62, and outputs the resultant radio signal to the wireless circuit 66.

Meanwhile, the diplexer 114 separates a frequency component in a signal band including 5.9 GHz that is a radio signal corresponding to ITS radio, from a radio signal received from the wireless circuit 66. The diplexer 114 outputs the separated radio signal including the frequency component in the signal band including 5.9 GHz, to the antenna 24. The diplexer 114 outputs a radio signal including frequency components outside the signal band including 5.9 GHz, in the radio signal received from the wireless circuit 66, to the wireless circuit 62.

The diplexer 112 in the wireless circuit 62 receives a radio signal received at the antenna 22 and corresponding to wireless LAN of 5 GHz band, and outputs the received radio signal to the wireless circuit 64. In addition, the diplexer 112 outputs a radio signal received from the wireless circuit 63, to the wireless circuit 64. The diplexer 112 combines the radio signal received at the antenna 22 and corresponding to wireless LAN of 5 GHz band and the radio signal received from the wireless circuit 63, and outputs the resultant radio signal to the wireless circuit 64.

Meanwhile, the diplexer 112 separates a frequency component in a signal band including 5.2 GHz to 5.6 GHz that is a radio signal corresponding to wireless LAN of 5 GHz band, from a radio signal received from the wireless circuit 64. The diplexer 112 outputs the separated radio signal including the frequency component in the signal band including 5.2 GHz to 5.6 GHz, to the antenna 22. The diplexer 112 outputs a radio signal including frequency components outside the signal band including 5.2 GHz to 5.6 GHz, in the radio signal received from the wireless circuit 64, to the wireless circuit 63.

The diplexer 113 in the wireless circuit 63 receives a radio signal received at the antenna 23 and corresponding to wireless LAN of 2.4 GHz band, and outputs the received radio signal to the wireless circuit 62. In addition, the diplexer 113 outputs a radio signal received from the wireless circuit 67, to the wireless circuit 62. The diplexer 113 combines the radio signal received at the antenna 23 and corresponding to wireless LAN of 2.4 GHz band and the radio signal received from the wireless circuit 67, and outputs the resultant radio signal to the wireless circuit 62.

Meanwhile, the diplexer 113 separates a frequency component in a signal band including 2.4 GHz that is a radio signal corresponding to wireless LAN of 2.4 GHz band, from a radio signal received from the wireless circuit 62. The diplexer 113 outputs the separated radio signal including the frequency component in the signal band including 2.4 GHz, to the antenna 23. The diplexer 113 outputs a radio signal including frequency components outside the signal band including 2.4 GHz, in the radio signal received from the wireless circuit 62, to the wireless circuit 67.

The wireless circuit 67 receives a radio signal corresponding to mobile communication, via the antenna 27, and outputs the received radio signal to the wireless circuit 63.

In addition, the wireless circuit 67 transmits a radio signal received from the wireless circuit 63, via the antenna 27.

Figure 30:
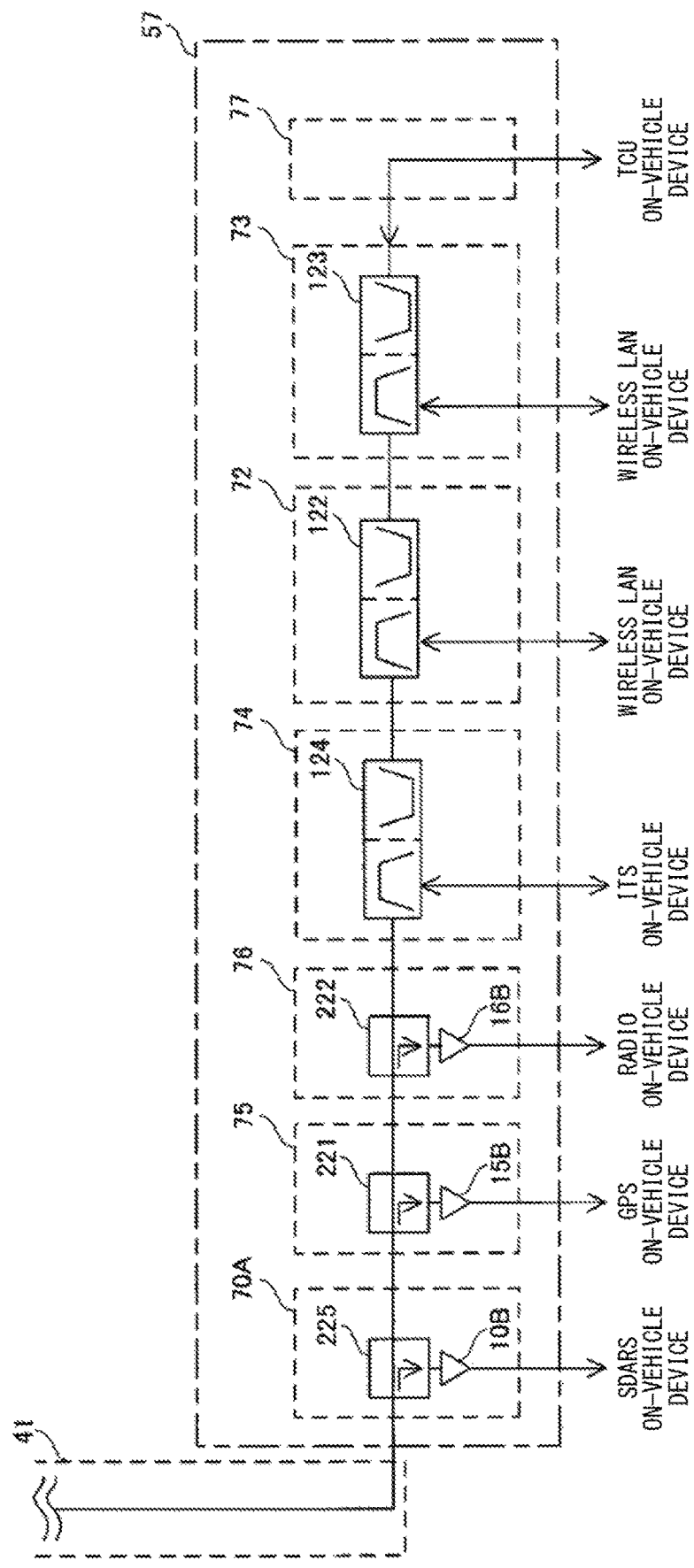
FIG. 30 shows a modification of the configuration of the on-vehicle-device-side circuit unit in the on-vehicle transmission system according to the second embodiment of the present invention.

FIG. 30 shows a modification of the configuration of the on-vehicle-device-side circuit unit in the on-vehicle transmission system according to the second embodiment of the present invention.

With reference to FIG. 30, the on-vehicle-device-side circuit unit 57 includes wireless circuits 72 to 77 and 70A. The wireless circuits 72 to 77 and 70A are connected in series and receive radio signals in frequency bands different from each other. Hereinafter, each of the wireless circuits 72 to 77 and 70A is also referred to as a wireless circuit 70.

In the on-vehicle-device-side circuit unit 57, each wireless circuit 70 is connected according to an order determined for each wireless circuit 70.

In the on-vehicle-device-side circuit unit 57, the wireless circuit 77 compatible with mobile communication is capable of transmitting and receiving radio signals in a plurality of frequency bands, is connected at an end farthest from the path part 41, that is, at the rearmost position, and is located at the rearmost position among the respective wireless circuits 70, that is, at the rearmost part.

The wireless circuits 71 to 74 are wireless transmission/reception circuits, and the wireless circuits 75, 76, and 70A are wireless reception circuits.

In the on-vehicle-device-side circuit unit 57, the wireless circuits 75, 76, and 70A, which are the wireless circuits 70 other than the wireless transmission/reception circuits, are connected at an end nearest to the path part 41, that is, at the foremost position, and are located at the foremost stage among the respective wireless circuits 70, that is, at the foremost part.

In the on-vehicle-device-side circuit unit 57, the wireless circuit 70 compatible with a radio signal in a higher frequency band is connected at a side closer to the path part 41.

Specifically, the wireless circuit 70A is a wireless reception circuit compatible with SDARS, which is a service using a radio signal having a highest frequency, among the wireless reception circuits in the on-vehicle transmission system 202, and is connected at the end nearest to the path part 41.

The wireless circuit 75 which is a wireless reception circuit compatible with GPS using the next highest frequency band is connected to the wireless circuit 70A, and the wireless circuit 76 which is a wireless reception circuit compatible with AM/FM radio using the lowest frequency band is connected to the wireless circuit 75.

The wireless circuit 74 which is a wireless transmission/reception circuit compatible with ITS using a frequency band that is 5.9 GHz band is connected to the wireless circuit 76, the wireless circuit 72 which is a wireless transmission/reception circuit compatible with wireless LAN of 5 GHz band is connected to the wireless circuit 74, and the wireless circuit 73 compatible with wireless LAN of 2.4 GHz band is connected to the wireless circuit 72.

In the on-vehicle-device-side circuit unit 57, the wireless circuits 72 to 74 include diplexers 122 to 124, respectively.

The wireless circuits 75, 76, and 70A include a directional coupling circuit 221, a directional coupling circuit 222, and a directional coupling circuit 225, respectively.

The wireless circuits 75, 76, and 70A also include an LNA 15B, an LNA 16B, and an LNA 10B, respectively.

In the case where the reception power of a corresponding radio signal is low, the LNA 15B, the LNA 16B, and the LNA 10B are provided to increase a signal-to-noise ratio.

The LNA 15B is connected between the directional coupling circuit 221 and the GPS on-vehicle device. The LNA 16B is connected between the directional coupling circuit 222 and the radio on-vehicle device. The LNA 10B is connected between the directional coupling circuit 225 and an SDARS on-vehicle device.

The on-vehicle-device-side circuit unit 57 splits a radio signal received from the path part 41 and provides the resultant radio signals to the respective wireless circuits 70.

More specifically, the directional coupling circuit 225 in the wireless circuit 70A receives a radio signal obtained by combining a plurality of frequency components, from the path part 41, and separates a frequency component in a signal band including 2.3 GHz that is a radio signal corresponding to SDARS.

In addition, the directional coupling circuit 225 outputs the separated radio signal including the frequency component in the signal band including 2.3 GHz, to the SDARS on-vehicle device. The directional coupling circuit 225 outputs a radio signal including frequency components other than the frequency component in the signal band including 2.3 GHz, in the radio signal received from the path part 41, to the wireless circuit 75.

The directional coupling circuit 221 in the wireless circuit 75 receives a radio signal obtained by combining a plurality of frequency components, from the wireless circuit 70A, and separates a frequency component in the signal band including 1.2 GHz to 1.5 GHz that is a radio signal corresponding to GPS.

In addition, the directional coupling circuit 221 outputs the separated radio signal including the frequency component in the signal band including 1.2 GHz to 1.5 GHz, to the GPS on-vehicle device. The directional coupling circuit 221 outputs a radio signal including frequency components other than the frequency component in the signal band including 1.2 GHz to 1.5 GHz, in the radio signal received from the wireless circuit 70A, to the wireless circuit 76.

The directional coupling circuit 222 in the wireless circuit 76 receives a radio signal obtained by combining a plurality of frequency components, from the wireless circuit 75, and separates a frequency component in or below the signal band including 120 MHz that is a radio signal corresponding to AM/FM radio.

In addition, the directional coupling circuit 222 outputs the separated radio signal including the frequency component in or below the signal band including 120 MHz, to the radio on-vehicle device. The directional coupling circuit 222 outputs a radio signal including frequency components other than the frequency component in or below the signal band including 120 MHz, in the radio signal received from the wireless circuit 75, to the wireless circuit 74.

The diplexer 124 in the wireless circuit 74 receives a radio signal obtained by combining a plurality of frequency components, from the wireless circuit 76, and separates a frequency component in the signal band including 5.9 GHz that is a radio signal corresponding to ITS radio. The diplexer 124 outputs the separated radio signal including the frequency component in the signal band including 5.9 GHz, to the ITS on-vehicle device. The diplexer 124 outputs a radio signal including frequency components other than the frequency component in the signal band including 5.9 GHz, in the radio signal received from the wireless circuit 76, to the wireless circuit 72.

Meanwhile, the diplexer 124 outputs a radio signal received from the ITS on-vehicle device, to the wireless circuit 76. The diplexer 124 outputs a radio signal received from the wireless circuit 72, to the wireless circuit 76. The diplexer 124 combines the radio signal received from the ITS on-vehicle device and the radio signal received from the wireless circuit 72, and outputs the resultant radio signal to the wireless circuit 76.

The diplexer 122 in the wireless circuit 72 receives a radio signal obtained by combining a plurality of frequency components, from the wireless circuit 74, and separates a frequency component in the signal band including 5.2 GHz to 5.6 GHz that is a radio signal corresponding to wireless LAN of 5 GHz band. The diplexer 122 outputs the separated radio signal including the frequency component in the signal band including 5.2 GHz to 5.6 GHz, to the wireless LAN on-vehicle device. The diplexer 122 outputs a radio signal including frequency components other than the frequency component in the signal band including 5.2 GHz to 5.6 GHz, in the radio signal received from the wireless circuit 74, to the wireless circuit 73.

Meanwhile, the diplexer 122 outputs a radio signal received from the wireless LAN on-vehicle device, to the wireless circuit 74. The diplexer 122 outputs a radio signal received from the wireless circuit 73, to the wireless circuit 74. The diplexer 122 combines the radio signal received from the wireless LAN on-vehicle device and the radio signal received from the wireless circuit 73, and outputs the resultant radio signal to the wireless circuit 74.

The diplexer 123 in the wireless circuit 73 receives a radio signal obtained by combining a plurality of frequency components, from the wireless circuit 72, and separates a frequency component in the signal band including 2.4 GHz that is a radio signal corresponding to wireless LAN of 2.4 GHz band. The diplexer 123 outputs the separated radio signal including the frequency component in the signal band including 2.4 GHz, to the wireless LAN on-vehicle device. The diplexer 123 outputs a radio signal including frequency components other than the frequency component in the signal band including 2.4 GHz, in the radio signal received from the wireless circuit 72, to the wireless circuit 77.

Meanwhile, the diplexer 123 outputs a radio signal received from the wireless LAN on-vehicle device, to the wireless circuit 72. The diplexer 123 outputs a radio signal received from the wireless circuit 77, to the wireless circuit 72. The diplexer 123 combines the radio signal received from the wireless LAN on-vehicle device and the radio signal received from the wireless circuit 77, and outputs the resultant radio signal to the wireless circuit 72.

The wireless circuit 77 receives a radio signal including a frequency component corresponding to mobile communication, from the TCU on-vehicle device, and outputs the received radio signal to the wireless circuit 73.

In addition, the wireless circuit 77 outputs a radio signal received from the wireless circuit 73, to the TCU on-vehicle device.

As described above, in the on-vehicle transmission system according to the second embodiment of the present invention, at least one of the multiple wireless circuits 60 in the antenna-side circuit unit 36 is a wireless transmission/reception circuit that transmits a radio signal. In the antenna-side circuit unit 36, the wireless circuits 60 other than the wireless transmission/reception circuit are connected at the end nearest to the path part 41.

Owing to such a configuration, for example, even when the radio signals received by the wireless circuits are weak signals, the transmission path can be made shorter, and thus signal deterioration can be inhibited.

In the on-vehicle transmission system according to the second embodiment of the present invention, at least one of the multiple wireless circuits 70 in the on-vehicle-device-side circuit unit 56 is a wireless transmission/reception circuit that transmits a radio signal. In the on-vehicle-device-side circuit unit 56, the wireless circuits 70 other than the wireless transmission/reception circuit are connected at the end nearest to the path part 41.

Owing to such a configuration, for example, even when the radio signals received by the wireless circuits are weak signals, the transmission path can be made shorter, and thus signal deterioration can be inhibited.

The other configurations and operations are the same as those in the on-vehicle transmission system according to the first embodiment, and thus detailed description thereof is not repeated.

Third Embodiment

The present embodiment relates to an on-vehicle transmission system obtained by combining the antenna-side circuit units and the on-vehicle-device-side circuit units of the respective on-vehicle transmission systems according to the first embodiment and the second embodiment. The contents other than those described below are the same as those of the on-vehicle transmission systems according to the first embodiment and the second embodiment.

Figure 31:
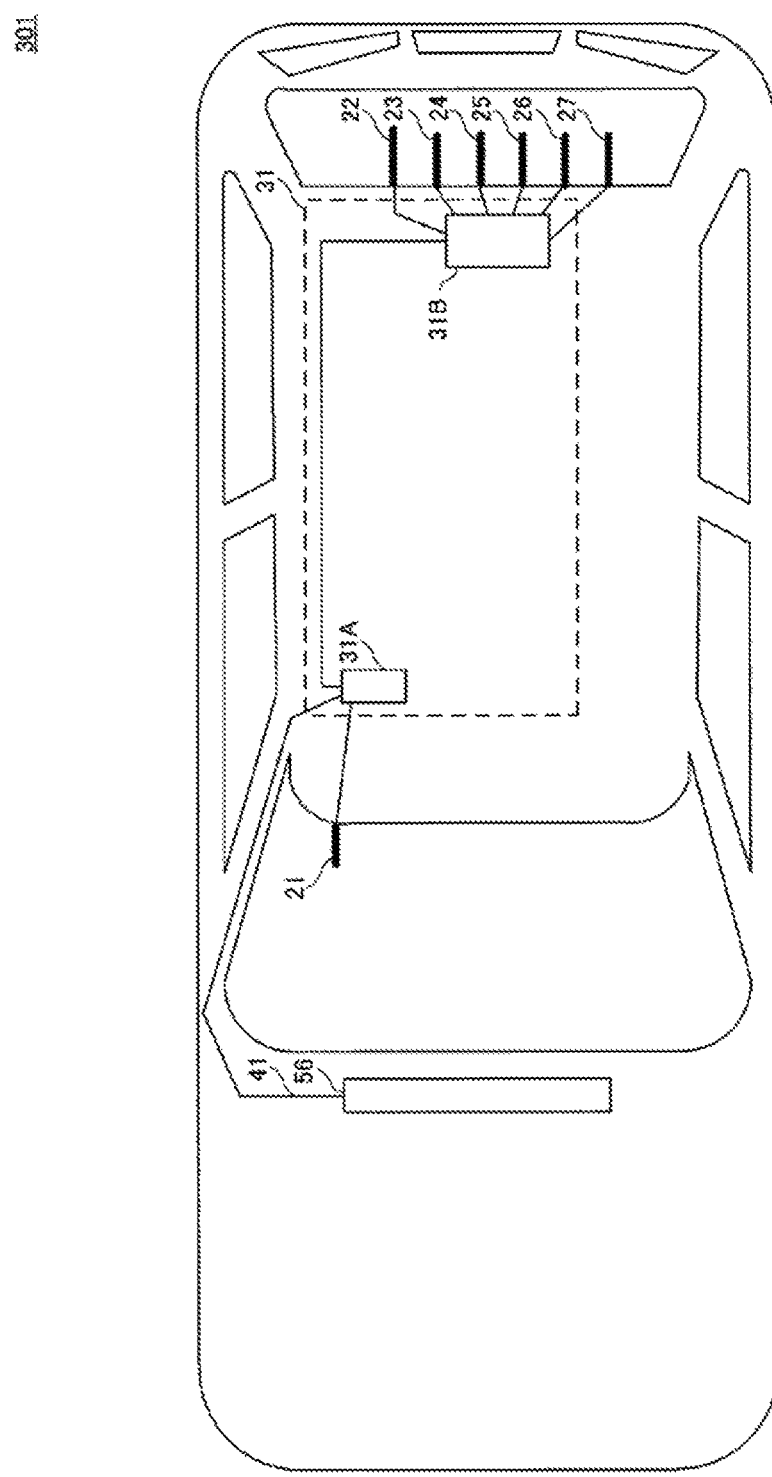
FIG. 31 shows an example of the configuration of an on-vehicle transmission system according to a third embodiment of the present invention.

FIG. 31 shows an example of the configuration of the on-vehicle transmission system according to the third embodiment of the present invention. FIG. 31 shows an on-vehicle transmission system compatible with communication services in Japan.

With reference to FIG. 31, an on-vehicle transmission system 301 includes antennas 21 to 27, an antenna-side circuit unit 31, a path part 41, and an on-vehicle-device-side circuit unit 56.

[Modifications]

Figure 32:
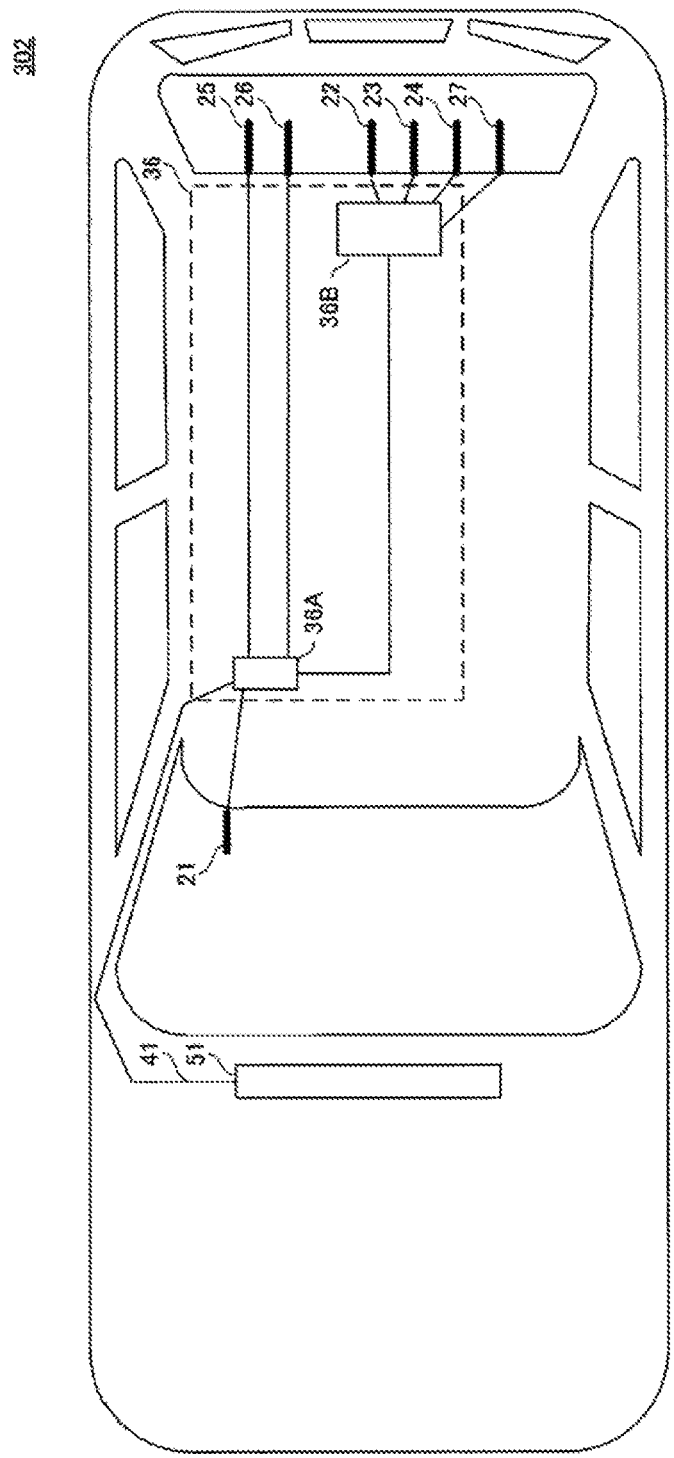
FIG. 32 shows a modification of the configuration of the on-vehicle transmission system according to the third embodiment of the present invention.

FIG. 32 shows a modification of the configuration of the on-vehicle transmission system according to the third embodiment of the present invention. FIG. 32 shows an on-vehicle transmission system compatible with communication services in Japan.

With reference to FIG. 32, an on-vehicle transmission system 302 includes antennas 21 to 27, an antenna-side circuit unit 36, a path part 41, and an on-vehicle-device-side circuit unit 51.

The other configurations and operations are the same as those in the on-vehicle transmission systems according to the first embodiment and the second embodiment, and thus detailed description thereof is not repeated.

Fourth Embodiment

The present embodiment relates to an on-vehicle transmission system that does not include any wireless transmission/reception circuits in an antenna-side circuit unit and an on-vehicle-device-side circuit unit as compared to the on-vehicle transmission system according to the first embodiment. The contents other than those described below are the same as those of the on-vehicle transmission system according to the first embodiment.

Figure 33:
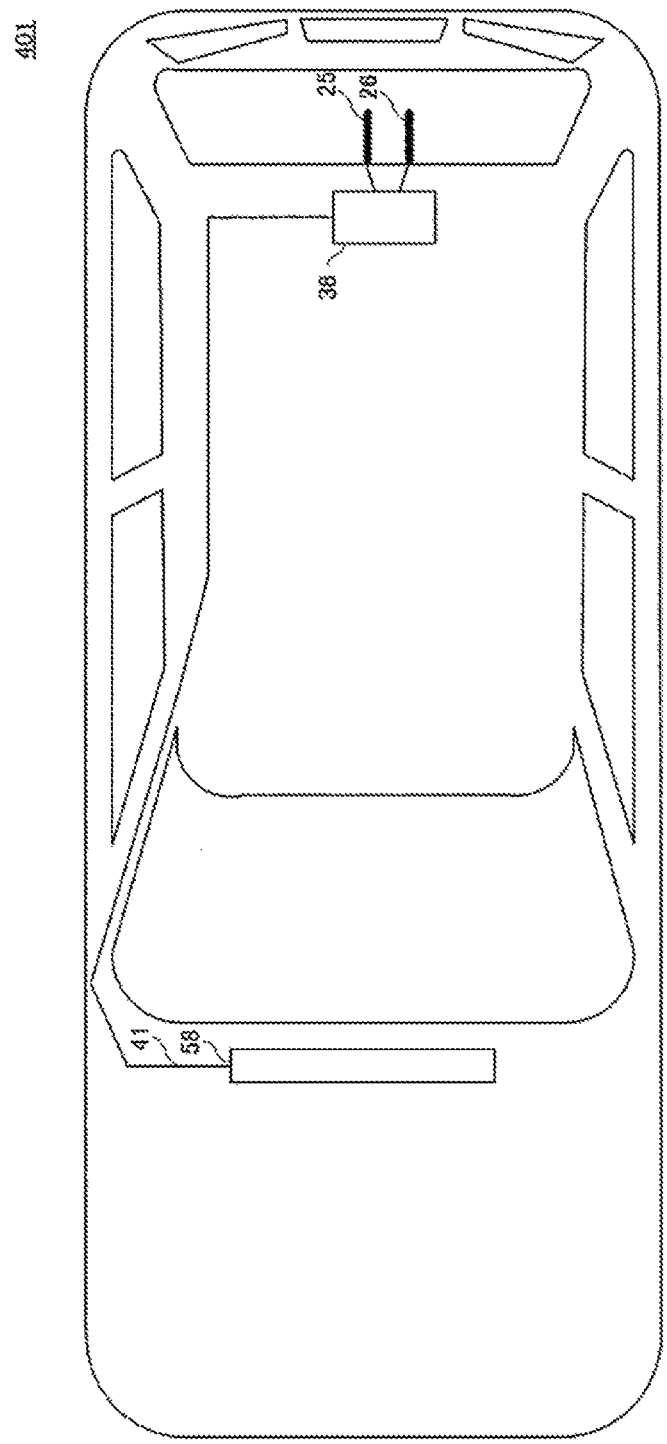
FIG. 33 shows an example of the configuration of an on-vehicle transmission system according to a fourth embodiment of the present invention.

FIG. 33 shows an example of the configuration of the on-vehicle transmission system according to the fourth embodiment of the present invention. FIG. 33 shows an on-vehicle transmission system compatible with communication services in Japan.

With reference to FIG. 33, an on-vehicle transmission system 401 includes antennas 25 and 26, an antenna-side circuit unit 38, a path part 41, and an on-vehicle-device-side circuit unit 58.

Figure 34:
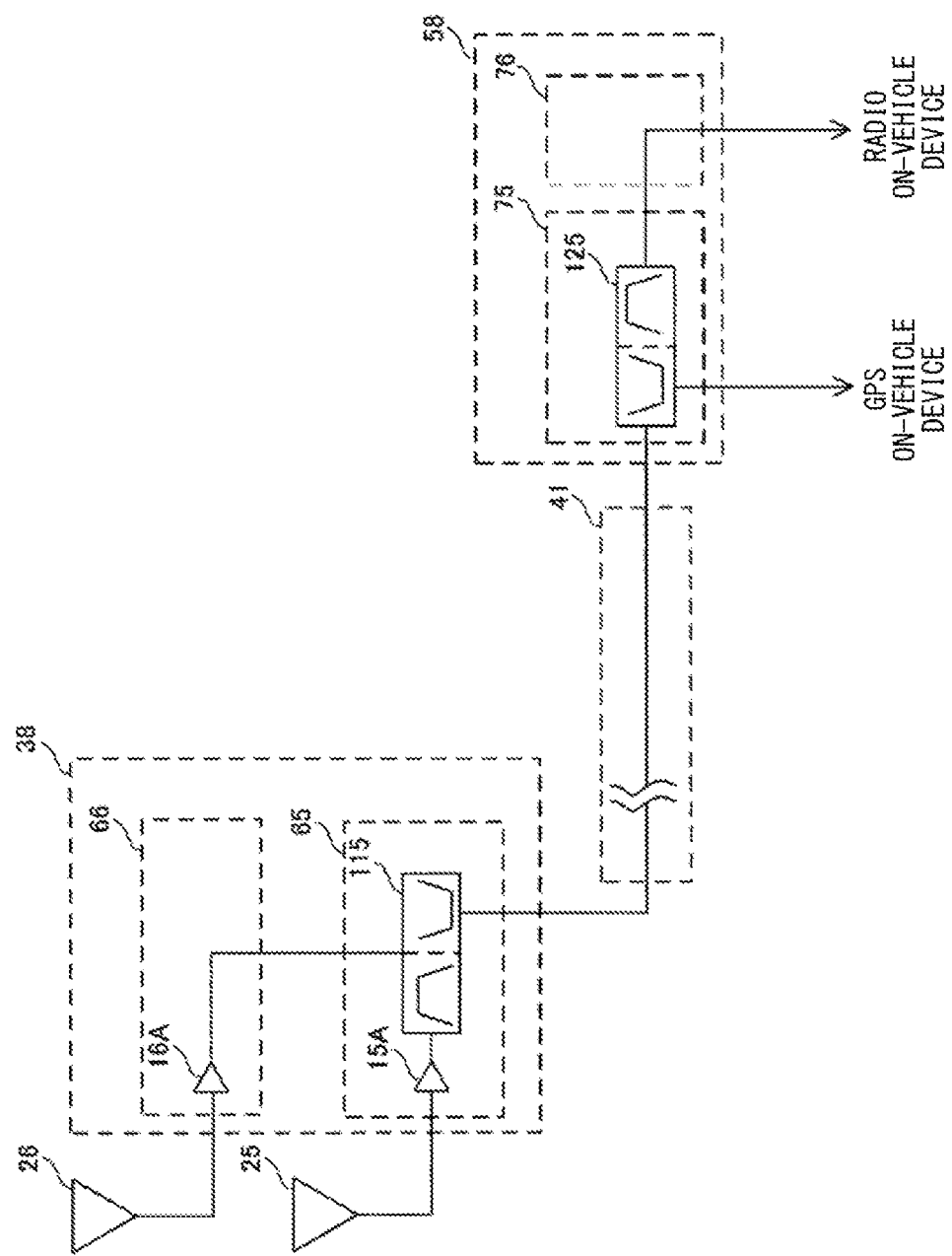
FIG. 34 shows an example of the configurations of an antenna-side circuit unit, a path part, and an on-vehicle-device-side circuit unit in the on-vehicle transmission system according to the fourth embodiment of the present invention.

FIG. 34 shows an example of the configurations of the antenna-side circuit unit, the path part, and the on-vehicle-device-side circuit unit in the on-vehicle transmission system according to the fourth embodiment of the present invention.

With reference to FIG. 34, the antenna-side circuit unit 38 includes wireless circuits 65 and 66. Hereinafter, each of the circuits 65 and 66 is also referred to as a wireless circuit 60.

In the antenna-side circuit unit 38, the wireless circuit 60 compatible with a radio signal in a higher frequency band is connected at a side closer to the path part 41.

Specifically, the wireless circuit 65 which is a wireless reception circuit compatible with GPS using a higher frequency band is connected to the path part 41, and the wireless circuit 66 which is a wireless reception circuit compatible with AM/FM radio is connected to the wireless circuit 65.

The wireless circuit 65 includes a diplexer 115. In addition, the wireless circuit 65 and the wireless circuit 66 include an LNA 15A and an LNA 16A, respectively.

The LNA 15A is connected between the diplexer 115 and the antenna 25.

The diplexer 115 in the wireless circuit 65 receives a radio signal received at the antenna 25 and corresponding to GPS, and outputs the received radio signal to the path part 41. In addition, the diplexer 115 outputs a radio signal received from the wireless circuit 66, to the path part 41. The diplexer 115 combines the radio signal received at the antenna 25 and corresponding to GPS and the radio signal received from the wireless circuit 66, and outputs the resultant radio signal to the path part 41.

The wireless circuit 66 receives a radio signal received at the antenna 26 and corresponding to AM/FM radio, and outputs the received radio signal to the wireless circuit 65 via the LNA 16A.

The on-vehicle-device-side circuit unit 58 includes wireless circuits 75 and 76. Hereinafter, each of the wireless circuits 75 and 76 is also referred to as a wireless circuit 70.

In the on-vehicle-device-side circuit unit 58, the wireless circuit 70 compatible with a radio signal in a higher frequency band is connected at a side closer to the path part 41.

The wireless circuit 75 which is a wireless reception circuit compatible with GPS using a higher frequency band is connected to the path part 41, and the wireless circuit 76 which is a wireless reception circuit compatible with AM/FM radio is connected to the wireless circuit 75.

The wireless circuit 75 includes a diplexer 125. The diplexer 125 receives a radio signal obtained by combining a plurality of frequency components, from the path part 41, and separates a frequency component in a signal band including 1.2 GHz to 1.5 GHz that is a radio signal corresponding to GPS. The diplexer 125 outputs the separated radio signal including the frequency component in the signal band including 1.2 GHz to 1.5 GHz, to the GPS on-vehicle device. The diplexer 125 outputs a radio signal including frequency components other than the frequency component in the signal band including 1.2 GHz to 1.5 GHz, in the radio signal received from the path part 41, to the wireless circuit 76.

The wireless circuit 76 outputs a radio signal received from the wireless circuit 75, to a radio on-vehicle device.

[Modifications]

Figure 35:
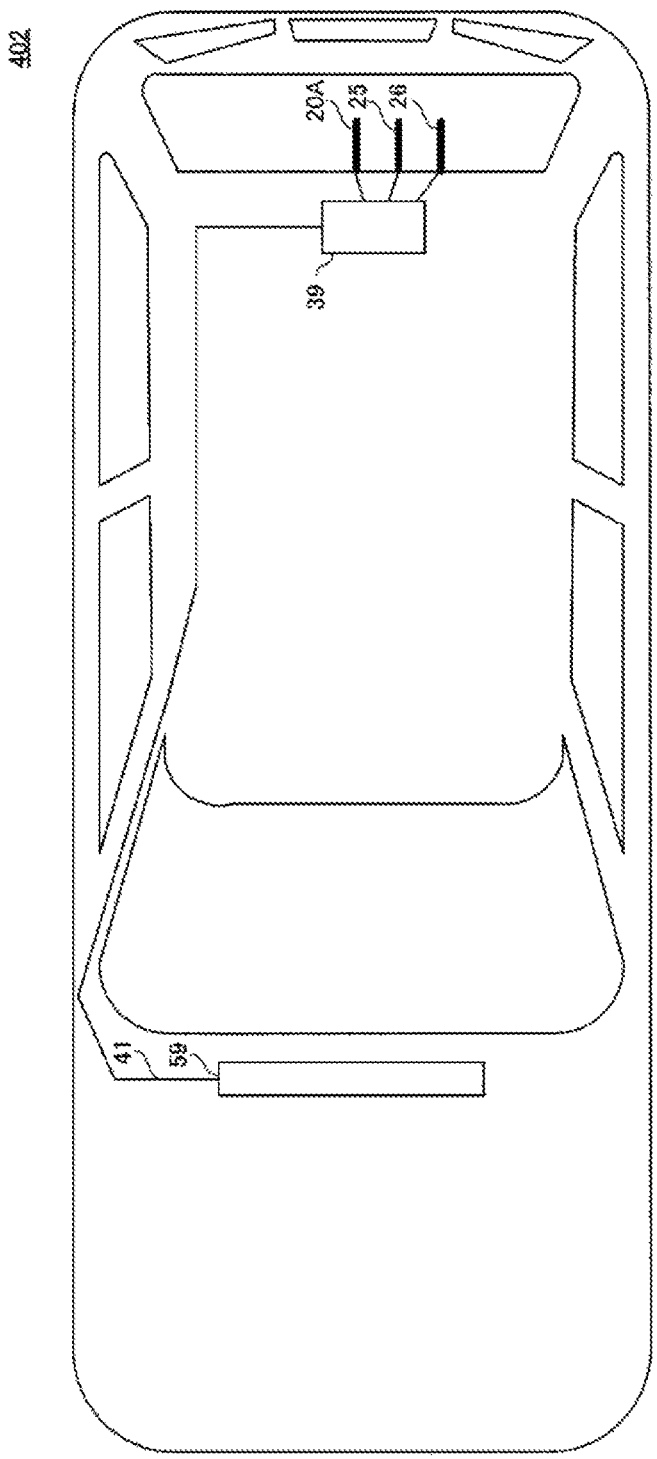
FIG. 35 shows a modification of the configuration of the on-vehicle transmission system according to the fourth embodiment of the present invention.

FIG. 35 shows a modification of the configuration of the on-vehicle transmission system according to the fourth embodiment of the present invention. FIG. 35 shows an on-vehicle transmission system compatible with communication services outside Japan.

With reference to FIG. 35, an on-vehicle transmission system 402 includes antennas 25, 26, and 20A, an antenna-side circuit unit 39, a path part 41, and an on-vehicle-device-side circuit unit 59.

Figure 36:
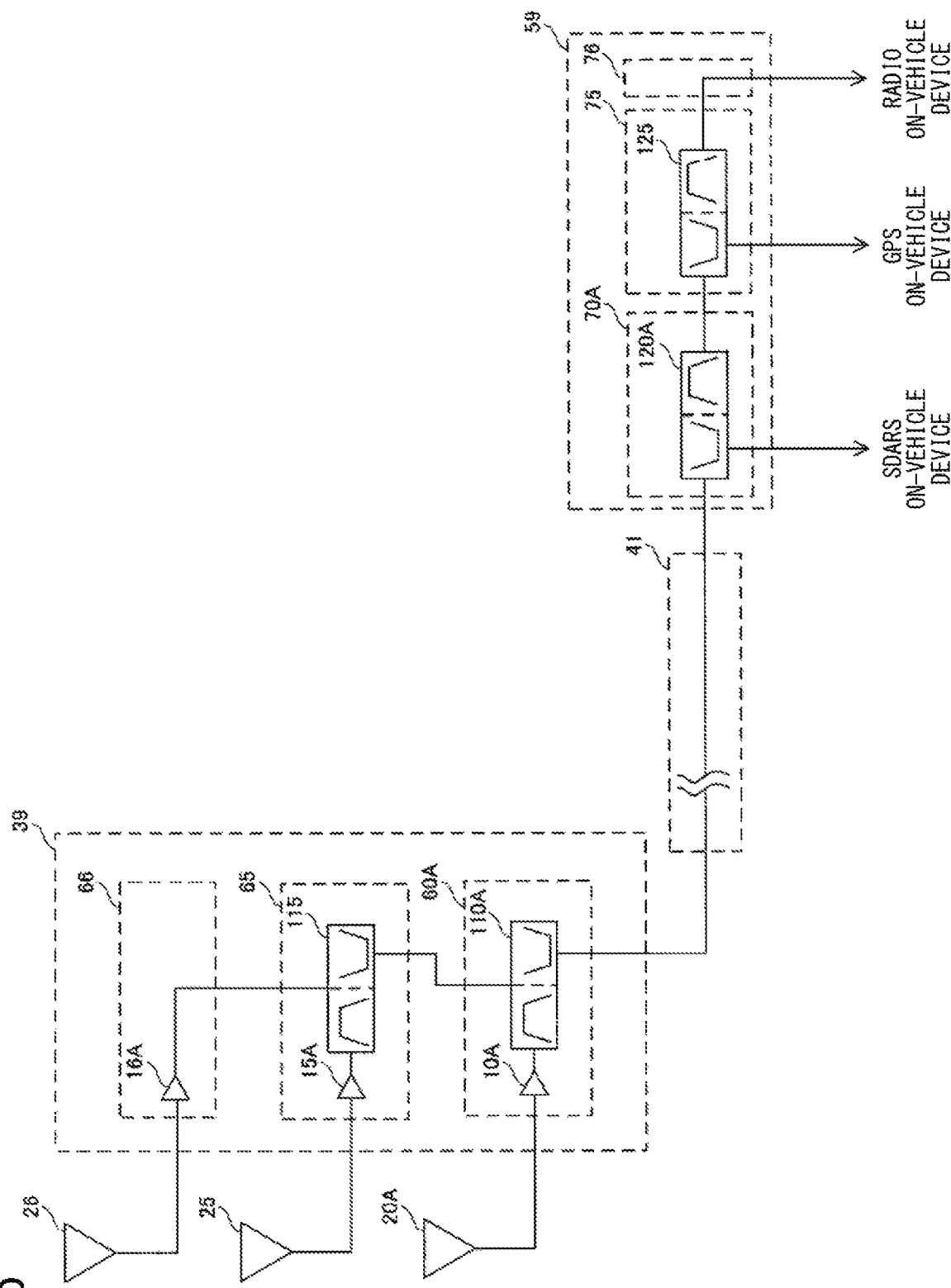
FIG. 36 shows a modification of the antenna-side circuit unit, the path part, and the on-vehicle-device-side circuit unit in the on-vehicle transmission system according to the fourth embodiment of the present invention.

FIG. 36 shows a modification of the antenna-side circuit unit, the path part, and the on-vehicle-device-side circuit unit in the on-vehicle transmission system according to the fourth embodiment of the present invention.

With reference to FIG. 36, the antenna-side circuit unit 39 includes wireless circuits 65, 66, and 60A. Hereinafter, each of the wireless circuits 65, 66, and 60A is also referred to as a wireless circuit 60.

In the antenna-side circuit unit 39, the wireless circuit 60 compatible with a radio signal in a higher frequency band is connected at a side closer to the path part 41.

Specifically, the wireless circuit 60A which is a wireless reception circuit compatible with SDARS using the highest frequency band is connected to the path part 41, the wireless circuit 65 which is a wireless reception circuit compatible with GPS using the next highest frequency band is connected to the wireless circuit 60A, and the wireless circuit 66 which is a wireless reception circuit compatible with AM/FM radio using the lowest frequency band is connected to the wireless circuit 65.

The wireless circuit 65 and the wireless circuit 60A include a diplexer 115 and a diplexer 110A, respectively.

The wireless circuits 65, 66, and 60A include an LNA 15A, an LNA 16A, and an LNA 10A, respectively.

The LNA 10A is connected between the diplexer 110A and the antenna 20A. The LNA 15A is connected between the diplexer 115 and the antenna 25.

The diplexer 110A in the wireless circuit 60A receives a radio signal received at the antenna 20A and corresponding to SDARS, and outputs the received radio signal to the path part 41. In addition, the diplexer 115 outputs a radio signal received from the wireless circuit 65, to the path part 41. The diplexer 110A combines the radio signal received at the antenna 20A and corresponding to SDARS and the radio signal received from the wireless circuit 65, and outputs the resultant radio signal to the path part 41.

The diplexer 115 in the wireless circuit 65 receives a radio signal received at the antenna 25 and corresponding to GPS, and outputs the received radio signal to the wireless circuit 60A. In addition, the diplexer 115 outputs a radio signal received from the wireless circuit 66, to the wireless circuit 60A. The diplexer 115 combines the radio signal received at the antenna 25 and corresponding to GPS and the radio signal received from the wireless circuit 66, and outputs the resultant radio signal to the wireless circuit 60A.

The wireless circuit 66 receives a radio signal received at the antenna 26 and corresponding to AM/FM radio, and outputs the received radio signal to the wireless circuit 65 via the LNA 16A.

The on-vehicle-device-side circuit unit 59 includes wireless circuits 75, 76, and 70A. Hereinafter, each of the wireless circuits 75, 76, and 70A is also referred to as a wireless circuit 70.

In the on-vehicle-device-side circuit unit 59, the wireless circuit 70 compatible with a radio signal in a higher frequency band is connected at a side closer to the path part 41.

Specifically, the wireless circuit 70A which is a wireless reception circuit compatible with SDARS using the highest frequency band is connected to the path part 41, the wireless circuit 75 which is a wireless reception circuit compatible with GPS using the next highest frequency band is connected to the wireless circuit 70A, and the wireless circuit 76 which is a wireless reception circuit compatible with AM/FM radio using the lowest frequency band is connected to the wireless circuit 75.

The wireless circuit 75 and the wireless circuit 76 include a diplexer 125 and a diplexer 126, respectively.

The diplexer 120A in the wireless circuit 70A receives a radio signal obtained by combining a plurality of frequency components, from the path part 41, and separates a frequency component in a signal band including 2.3 GHz that is a radio signal corresponding to SDARS. The diplexer 120A outputs the separated radio signal including the frequency component in the signal band including 2.3 GHz, to the SDARS on-vehicle device. The diplexer 120A outputs a radio signal including frequency components other than the frequency component in the signal band including 2.3 GHz, in the radio signal received from the path part 41, to the wireless circuit 75.

The diplexer 125 in the wireless circuit 75 receives a radio signal obtained by combining a plurality of frequency components, from the wireless circuit 70A, and separates a frequency component in the signal band including 1.2 GHz to 1.5 GHz that is a radio signal corresponding to GPS. The diplexer 125 outputs the separated radio signal including the frequency component in the signal band including 1.2 GHz to 1.5 GHz, to the GPS on-vehicle device. The diplexer 125 outputs a radio signal including frequency components other than the frequency component in the signal band including 1.2 GHz to 1.5 GHz, in the radio signal received from the wireless circuit 70A, to the wireless circuit 76.

The wireless circuit 76 outputs a radio signal received from the wireless circuit 75, to a radio on-vehicle device.

The other configurations and operations are the same as those in the on-vehicle transmission system according to the first embodiment, and thus detailed description thereof is not repeated.

The above embodiments are illustrative in all aspects and should not be recognized as being restrictive. The scope of the present invention is defined by the scope of the claims rather than the above description, and is intended to include meaning equivalent to the scope of the claims and all modifications within the scope.

The above description includes the features in the additional notes below.

[Additional Note 1]

An on-vehicle transmission system mounted on a vehicle, the on-vehicle transmission system comprising:

an antenna-side circuit unit including a plurality of wireless circuits connected in series and configured to receive radio signals in frequency bands different from each other, the antenna-side circuit unit configured to combine the radio signals received by the respective wireless circuits and output a resultant radio signal; and a path part configured to transmit the radio signal resulting from the combination and received from the antenna-side circuit unit, to an on-vehicle device side mounted on the vehicle, wherein in the antenna-side circuit unit, each wireless circuit is connected according to an order determined for each wireless circuit, the plurality of wireless circuits include a plurality of wireless transmission/reception circuits configured to transmit radio signals in frequency bands different from each other, the path part transmits a radio signal outputted from the on-vehicle device side, to the antenna-side circuit unit, and the antenna-side circuit unit splits the radio signal received from the path part.

[Additional Note 2]

An on-vehicle transmission system mounted on a vehicle, the on-vehicle transmission system comprising:

a path part configured to transmit a radio signal received from an antenna side mounted on the vehicle, to an on-vehicle device side mounted on the vehicle; and an on-vehicle-device-side circuit unit including a plurality of wireless circuits connected in series and configured to receive radio signals in frequency bands different from each other, the on-vehicle-device-side circuit unit configured to split the radio signal from the path part and provide resultant radio signals to the respective wireless circuits, wherein in the on-vehicle-device-side circuit unit, each wireless circuit is connected according to an order determined for each wireless circuit, the plurality of wireless circuits include a plurality of wireless transmission/reception circuits configured to transmit radio signals in frequency bands different from each other, the on-vehicle-device-side circuit unit combines the radio signals outputted from the respective wireless transmission/reception circuits, and the path part transmits a radio signal resulting from the combination and received from the on-vehicle-device-side circuit unit, to the antenna side.

REFERENCE SIGNS LIST 10A, 10B, 15A, 15B, 16A, 16B, 18A, 18B, 19A, 19B LNA 20A, 21, 22, 23, 24, 25, 26, 27, 28A, 28B, 28C, 28D antenna
31, 33, 34, 35, 36, 37, 38, 39 antenna-side circuit unit
31A, 33A, 34A, 36A front-side circuit unit
31B, 33B, 34B, 36B rear-side circuit unit
41 path part
42 diversity path part
51, 53, 54, 55, 56, 57, 58, 59 on-vehicle-device-side circuit unit
60A, 61, 62, 63, 64, 65, 66, 67, 68, 69, 70A, 71, 72, 73, 74, 75, 76, 77, 78, 79 wireless circuit
82, 83, 84 diversity wireless circuit unit
101, 102, 103, 104, 105, 201, 202, 301, 302, 401, 402 on-vehicle transmission system
110A, 111, 112, 113, 114, 115, 116, 117, 118, 119, 120A, 121, 122, 123, 124, 125, 126, 127, 128, 129 diplexer
210A, 210B, 211, 212, 213, 214, 215, 221, 222, 223, 224, 225 directional coupling circuit

The invention claimed is:

1. An on-vehicle transmission system mounted on a vehicle, the on-vehicle transmission system comprising:
an antenna-side circuit unit including a plurality of first wireless circuits connected in series and configured to receive radio signals in frequency bands different from each other, the antenna-side circuit unit configured to combine the radio signals received by the respective first wireless circuits and output a resultant radio signal; and
a path part configured to transmit the radio signal resulting from the combination and received from the antenna-side circuit unit, to an on-vehicle device side mounted on the vehicle, wherein
in the antenna-side circuit unit, the first wireless circuit capable of receiving radio signals in a plurality of frequency bands is connected at an end farthest from the path part,
the plurality of first wireless circuits includes other first wireless circuits other than the first wireless circuit connected at the farthest end,
in the antenna-side circuit unit, the higher the frequency band of the radio signal, the closer the other first wireless circuits are connected to the path part,
the path part is connected to an on-vehicle-device-side circuit unit,
the on-vehicle-device-side circuit unit includes a plurality of second wireless circuits connected in series and configured to receive radio signals in frequency bands different from each other, and configures to split the radio signal from the path part and provide resultant radio signals to the respective second wireless circuits,
in the on-vehicle-device-side circuit unit, the second wireless circuit capable of receiving radio signals in a plurality of frequency bands is connected at an end farthest from the path part,
the plurality of second wireless circuits includes other second wireless circuits other than the second wireless circuit connected at the farthest end,
in the on-vehicle-device-side circuit unit, the higher the frequency band of the radio signal, the closer the other second wireless circuits are connected to the path part, and
the other first wireless circuits are connected such that a first sequence order of frequency bands in which the other first wireless circuits can be received is the same as a second sequence order of frequency bands in which the other second wireless circuits can be received, the first sequence order corresponding to an order of connection of the other first wireless circuits when the first wireless circuit closest to the path part is a starting point among the other first wireless circuits, the second sequence order corresponding to an order of connection of the other second wireless circuits when the second wireless circuit closest to the path part is a starting point among the other second wireless circuits.

2. The on-vehicle transmission system according to claim 1, wherein, in the antenna-side circuit unit, the higher the frequency band of the radio signal, the closer the first wireless circuit is connected to the path part.

3. The on-vehicle transmission system according to claim 1, wherein
at least one of the plurality of first wireless circuits in the antenna-side circuit unit is a wireless transmission/reception circuit configured to transmit a radio signal, and
the wireless transmission/reception circuit includes a diplexer.

4. The on-vehicle transmission system according to claim 1, wherein
at least one of the plurality of first wireless circuits in the antenna-side circuit unit is a wireless transmission/reception circuit configured to transmit a radio signal, and
the first wireless circuit other than the wireless transmission/reception circuit includes a directional coupling circuit.

5. The on-vehicle transmission system according to claim 1, wherein
at least one of the plurality of first wireless circuits in the antenna-side circuit unit is a wireless reception circuit configured not to transmit a radio signal, and
the wireless reception circuit includes an LNA (Low Noise Amplifier).

6. The on-vehicle transmission system according to claim 1, further comprising:
a diversity wireless circuit unit connected to a plurality of antennas; and
a diversity path part configured to transmit radio signals at the plurality of antennas, to the on-vehicle device side mounted on the vehicle.

7. The on-vehicle transmission system according to claim 1, further comprising a diversity wireless circuit unit connected to a plurality of antennas, wherein
the antenna-side circuit unit further combines at least one of radio signals at the plurality of antennas.

8. An on-vehicle transmission system mounted on a vehicle, the on-vehicle transmission system comprising:
an antenna-side circuit unit including a plurality of wireless circuits connected in series and configured to receive radio signals in frequency bands different from each other, the antenna-side circuit unit configured to combine the radio signals received by the respective wireless circuits and output a resultant radio signal; and
a path part configured to transmit the radio signal resulting from the combination and received from the antenna-side circuit unit, to an on-vehicle device side mounted on the vehicle, wherein
in the antenna-side circuit unit, each wireless circuit is connected according to an order determined for each wireless circuit,
at least one of the plurality of wireless circuits in the antenna-side circuit unit is a wireless transmission/reception circuit configured to transmit a radio signal, and in the antenna-side circuit unit, the wireless transmission/reception circuit is connected at an end nearest to the path part.

9. The on-vehicle transmission system according to claim 8, wherein
the plurality of wireless circuits includes another wireless circuit other than the wireless circuit connected at the nearest end, and
in the antenna-side circuit unit, the higher the frequency band of the radio signal, the closer the other wireless circuit is connected to the path part.

10. An on-vehicle transmission system mounted on a vehicle, the on-vehicle transmission system comprising:
an antenna-side circuit unit including a plurality of wireless circuits connected in series and configured to receive radio signals in frequency bands different from each other, the antenna-side circuit unit configured to combine the radio signals received by the respective wireless circuits and output a resultant radio signal; and
a path part configured to transmit the radio signal resulting from the combination and received from the antenna-side circuit unit, to an on-vehicle device side mounted on the vehicle, wherein
in the antenna-side circuit unit, each wireless circuit is connected according to an order determined for each wireless circuit,
at least one of the plurality of wireless circuits in the antenna-side circuit unit is a wireless transmission/reception circuit configured to transmit a radio signal, and
in the antenna-side circuit unit, the wireless circuit other than the wireless transmission/reception circuit is connected at an end nearest to the path part.

11. The on-vehicle transmission system according to claim 10, wherein, in the antenna-side circuit unit, the wireless circuit, other than the wireless circuit connected at the nearest end, for which the frequency band of the radio signal is higher is connected at a side closer to the path part.

12. An on-vehicle transmission system mounted on a vehicle, the on-vehicle transmission system comprising:
an antenna-side circuit unit including a plurality of wireless circuits connected in series and configured to receive radio signals in frequency bands different from each other, the antenna-side circuit unit configured to combine the radio signals received by the respective wireless circuits and output a resultant radio signal; and
a path part configured to transmit the radio signal resulting from the combination and received from the antenna-side circuit unit, to an on-vehicle device side mounted on the vehicle, wherein
in the antenna-side circuit unit, each wireless circuit is connected according to an order determined for each wireless circuit,
the on-vehicle transmission system further comprises a diversity wireless circuit unit connected to a plurality of antennas and configured to output a signal generated on the basis of radio signals received at the plurality of antennas; and
the antenna-side circuit unit further combines the signal received from the diversity wireless circuit unit.

13. An on-vehicle transmission system mounted on a vehicle, the on-vehicle transmission system comprising:
a path part configured to transmit a radio signal received from an antenna side mounted on the vehicle, to an on-vehicle device side mounted on the vehicle; and
an on-vehicle-device-side circuit unit including a plurality of second wireless circuits connected in series and configured to receive radio signals in frequency bands different from each other, the on-vehicle-device-side circuit unit configured to split the radio signal from the path part and provide resultant radio signals to the respective wireless circuits, wherein
the path part is connected to an antenna-side circuit unit,
the antenna-side circuit unit includes a plurality of first wireless circuits connected in series and configured to receive radio signals in frequency bands different from each other, and configures to combine the radio signals received by the respective first wireless circuits and output a resultant radio signal,
in the antenna-side circuit unit, the first wireless circuit capable of receiving radio signals in a plurality of frequency bands is connected at an end farthest from the path part,
the plurality of first wireless circuits includes other first wireless circuits other than the first wireless circuit connected at the farthest end,
in the antenna-side circuit unit, the higher the frequency band of the radio signal, the closer the other first wireless circuits are connected to the path part,
in the on-vehicle-device-side circuit unit, the second wireless circuit capable of receiving radio signals in a plurality of frequency bands is connected at an end farthest from the path part,
the plurality of second wireless circuits includes other second wireless circuits other than the second wireless circuit connected at the farthest end,
in the on-vehicle-device-side circuit unit, the higher the frequency band of the radio signal, the closer the other second wireless circuits are connected to the path part, and
the other second wireless circuits are connected such that a first sequence order of frequency bands in which the other first wireless circuits can be received is the same as a second sequence order of frequency bands in which the other second wireless circuits can be received, the first sequence order corresponding to an order of connection of the other first wireless circuits when the first wireless circuit closest to the path part is a starting point among the other first wireless circuits, the second sequence order corresponding to an order of connection of the other second wireless circuits when the second wireless circuit closest to the path part is a starting point among the other second wireless circuits.

14. The on-vehicle transmission system according to claim 13, wherein, in the on-vehicle-device-side circuit unit, the higher the frequency band of the radio signal, the closer the second wireless circuit is connected to the path part.

15. The on-vehicle transmission system according to claim 13, wherein
at least one of the plurality of second wireless circuits in the on-vehicle-device-side circuit unit is a wireless transmission/reception circuit configured to transmit a radio signal, and
the wireless transmission/reception circuit includes a diplexer.

16. The on-vehicle transmission system according to claim 13, wherein
at least one of the plurality of second wireless circuits in the on-vehicle-device-side circuit unit is a wireless transmission/reception circuit configured to transmit a radio signal, and
the wireless circuit other than the wireless transmission/reception circuit includes a directional coupling circuit.

17. The on-vehicle transmission system according to claim 13, wherein at least one of the plurality of wireless circuits in the on-vehicle-device-side circuit unit is a wireless reception circuit configured not to transmit a radio signal, and the wireless reception circuit includes an LNA.

18. An on-vehicle transmission system mounted on a vehicle, the on-vehicle transmission system comprising:

a path part configured to transmit a radio signal received from an antenna side mounted on the vehicle, to an on-vehicle device side mounted on the vehicle; and an on-vehicle-device-side circuit unit including a plurality of wireless circuits connected in series and configured to receive radio signals in frequency bands different from each other, the on-vehicle-device-side circuit unit configured to split the radio signal from the path part and provide resultant radio signals to the respective wireless circuits, wherein in the on-vehicle-device-side circuit unit, each wireless circuit is connected according to an order determined for each wireless circuit, at least one of the plurality of wireless circuits in the on-vehicle-device-side circuit unit is a wireless transmission/reception circuit configured to transmit a radio signal, and in the on-vehicle-device-side circuit unit, the wireless transmission/reception circuit is connected at an end nearest to the path part.

19. On-vehicle transmission system according to claim 18, wherein the plurality of wireless circuits includes another wireless circuit other than the wireless circuit connected at the nearest end, and in the on-vehicle-device-side circuit unit, the higher the frequency band of the radio signal, the closer the other wireless circuit is connected to the path part.

20. An on-vehicle transmission system mounted on a vehicle, the on-vehicle transmission system comprising:

a path part configured to transmit a radio signal received from an antenna side mounted on the vehicle, to an on-vehicle device side mounted on the vehicle; and an on-vehicle-device-side circuit unit including a plurality of wireless circuits connected in series and configured to receive radio signals in frequency bands different from each other, the on-vehicle-device-side circuit unit configured to split the radio signal from the path part and provide resultant radio signals to the respective wireless circuits, wherein in the on-vehicle-device-side circuit unit, each wireless circuit is connected according to an order determined for each wireless circuit, at least one of the plurality of wireless circuits in the on-vehicle-device-side circuit unit is a wireless transmission/reception circuit configured to transmit a radio signal, and in the on-vehicle-device-side circuit unit, the wireless circuit other than the wireless transmission/reception circuit is connected at an end nearest to the path part.

21. The on-vehicle transmission system according to claim 20, wherein, in the on-vehicle-device-side circuit unit, the wireless circuit, other than the wireless circuit connected at the nearest end, for which the frequency band of the radio signal is higher is connected at a side closer to the path part.

22. An on-vehicle transmission system mounted on a vehicle, the on-vehicle transmission system comprising:

an antenna-side circuit unit including a plurality of first wireless circuits connected in series and configured to receive radio signals in frequency bands different from each other, the antenna-side circuit unit configured to combine the radio signals received by the respective first wireless circuits and output a resultant radio signal;

a path part configured to transmit the radio signal resulting from the combination and received from the antenna-side circuit unit, to an on-vehicle device side mounted on the vehicle; and an on-vehicle-device-side circuit unit including a plurality of second wireless circuits connected in series and configured to receive radio signals in frequency bands different from each other, the on-vehicle-device-side circuit unit configured to split the radio signal from the path part and provide resultant radio signals to the respective second wireless circuits, wherein in the antenna-side circuit unit, the first wireless circuit capable of receiving radio signals in a plurality of frequency bands is connected at an end farthest from the path part, the plurality of first wireless circuits includes other first wireless circuits other than the first wireless circuit connected at the farthest end, in the antenna-side circuit unit, the higher the frequency band of the radio signal, the closer the other first wireless circuits are connected to the path part, in the on-vehicle-device-side circuit unit, the second wireless circuit capable of receiving radio signals in a plurality of frequency bands is connected at an end farthest from the path part, the plurality of second wireless circuits includes other second wireless circuits other than the second wireless circuit connected at the farthest end, in the on-vehicle-device-side circuit unit, the higher the frequency band of the radio signal, the closer the other second wireless circuits are connected to the path part, and the other first wireless circuits and the other second wireless circuits are connected such that a first sequence order of frequency bands in which the other first wireless circuits can be received is the same as a second sequence order of frequency bands in which the other second wireless circuits can be received, the first sequence order corresponding to an order of connection of the other first wireless circuits when the first wireless circuit closest to the path part is a starting point among the other first wireless circuits, the second sequence order corresponding to an order of connection of the other second wireless circuits when the second wireless circuit closest to the path part is a starting point among the other second wireless circuits.

* * * * *